(12) United States Patent
Shimezawa et al.

(10) Patent No.: US 11,160,091 B2
(45) Date of Patent: Oct. 26, 2021

(54) TERMINAL DEVICE, BASE STATION DEVICE, AND COMMUNICATION METHOD

(71) Applicant: SHARP KABUSHIKI KAISHA, Sakai (JP)

(72) Inventors: Kazuyuki Shimezawa, Sakai (JP); Naoki Kusashima, Sakai (JP); Wataru Ouchi, Sakai (JP); Takashi Hayashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 11 days.

(21) Appl. No.: 15/749,872

(22) PCT Filed: Aug. 2, 2016

(86) PCT No.: PCT/JP2016/072702
§ 371 (c)(1),
(2) Date: Feb. 2, 2018

(87) PCT Pub. No.: WO2017/022776
PCT Pub. Date: Feb. 9, 2017

(65) Prior Publication Data
US 2018/0234988 A1    Aug. 16, 2018

(30) Foreign Application Priority Data

Aug. 5, 2015  (JP) .............................. JP2015-154654

(51) Int. Cl.
*H04L 12/28* (2006.01)
*H04W 72/08* (2009.01)
(Continued)

(52) U.S. Cl.
CPC ........... *H04W 72/085* (2013.01); *H04L 5/001* (2013.01); *H04L 5/005* (2013.01); *H04L 5/0053* (2013.01);
(Continued)

(58) Field of Classification Search
CPC ... H04W 72/085; H04W 16/14; H04W 48/12; H04W 72/04; H04W 72/042; H04L 72/085; H04L 5/005
See application file for complete search history.

(56) References Cited

U.S. PATENT DOCUMENTS

| 2013/0003533 A1* | 1/2013 | Barbieri | H04W 36/06 370/225 |
| 2014/0086173 A1* | 3/2014 | Sadeghi | H04L 5/005 370/329 |

(Continued)

FOREIGN PATENT DOCUMENTS

| JP | 2015-133635 A | 7/2015 |
| JP | 2015-142372 A | 8/2015 |
| WO | 2015/018005 A1 | 2/2015 |

OTHER PUBLICATIONS

Source: Ericsson; Title: On RRM Measurements and Reporting for LAA; R1-153138; 3GPP TSG RAN WG1 #81 Fukuoka, Japan, May 25-29, 2015.

(Continued)

*Primary Examiner* — Stephen M D Agosta
(74) *Attorney, Agent, or Firm* — ScienBiziP, P.C.

(57) ABSTRACT

A cell using an allocated frequency band, a non-allocated frequency band, or a shared frequency band is controlled efficiently. A higher layer processing unit configured to configure a first configuration for monitoring an Enhanced Physical Downlink Control CHannel (EPDCCH) and a second configuration for measuring a Discovery Signal (DS); a reception processing unit configured to monitor a candidate of the EPDCCH, based on the first configuration; and a detection unit configured to detect the DS in a prescribed subframe to be determined, based on the second configuration are provided. In a case that simultaneous transmissions on the EPDCCH and the DS occur in a (Continued)

Licensed Assisted Access (LAA) cell, the EPDCCH is mapped onto a resource element different from a resource element corresponding to the DS in the prescribed subframe.

3 Claims, 10 Drawing Sheets

(51) Int. Cl.
*H04W 16/14* (2009.01)
*H04L 5/00* (2006.01)
*H04W 48/12* (2009.01)
*H04W 72/04* (2009.01)

(52) U.S. Cl.
CPC .......... *H04W 16/14* (2013.01); *H04W 48/12* (2013.01); *H04W 72/042* (2013.01)

(56) References Cited

U.S. PATENT DOCUMENTS

| | | | | |
|---|---|---|---|---|
| 2014/0133395 A1* | 5/2014 | Nam | ...................... | H04L 5/0023 370/328 |
| 2014/0192740 A1* | 7/2014 | Ekpenyong | ........... | H04L 5/0094 370/329 |
| 2014/0204851 A1* | 7/2014 | Chen | ...................... | H04L 5/0048 370/329 |
| 2014/0307645 A1* | 10/2014 | Ji | ............................ | H04L 1/203 370/329 |
| 2014/0313985 A1* | 10/2014 | Nimbalker | ............ | H04L 1/0061 370/329 |
| 2014/0328260 A1* | 11/2014 | Papasakellariou | .... | H04L 1/1887 370/329 |
| 2014/0328329 A1* | 11/2014 | Novlan | ............... | H04W 72/042 370/336 |
| 2014/0334337 A1* | 11/2014 | Li | ......................... | H04W 8/005 370/254 |
| 2014/0334399 A1* | 11/2014 | Xu | ..................... | H04W 72/1273 370/329 |
| 2015/0071256 A1* | 3/2015 | Hwang | ................. | H04W 76/14 370/336 |
| 2015/0223156 A1* | 8/2015 | Park | ....................... | H04L 5/0073 370/252 |
| 2015/0257130 A1* | 9/2015 | Lee | ....................... | H04L 5/1469 370/336 |
| 2015/0280878 A1* | 10/2015 | Lee | ....................... | H04L 5/0048 370/252 |
| 2015/0359004 A1* | 12/2015 | Xu | .................... | H04W 74/0833 370/329 |
| 2015/0365931 A1* | 12/2015 | Ng | ........................ | H04L 1/1812 370/329 |
| 2016/0021632 A1* | 1/2016 | Sun | ....................... | H04W 24/10 370/350 |
| 2016/0345364 A1 | 11/2016 | Uchino et al. | | |
| 2016/0381680 A1 | 12/2016 | Yasukawa et al. | | |
| 2017/0311286 A1* | 10/2017 | Yi | ............................ | H04J 11/00 |
| 2018/0198495 A1* | 7/2018 | Davydov | ............ | H04J 13/0003 |

OTHER PUBLICATIONS

Source: Ericsson, Qualcomm, Huawei, Alcatel-Lucent; Title: Study on Licensed-Assisted Access using LTE; RP-141664; 3GPP TSG RAN Meeting #65 Edinburgh, Scotland. Sep. 9-12, 2014.
3rd Generation Partnership Project; Technical Specification Group Radio Access Network; Evolved Universal Terrestrial Radio Access (E-UTRA); Physical layer procedures (Release 12); 3GPP TS 36.213 V12.4.0 (Dec. 2014).
Ericsson: "Initial discussion on solutions for identified LAA functionalities", R1-144267, 3GPP TSG RAN WG1 Meeting #78bis, Ljubljana, Slovenia, Oct. 6-10, 2014.

* cited by examiner

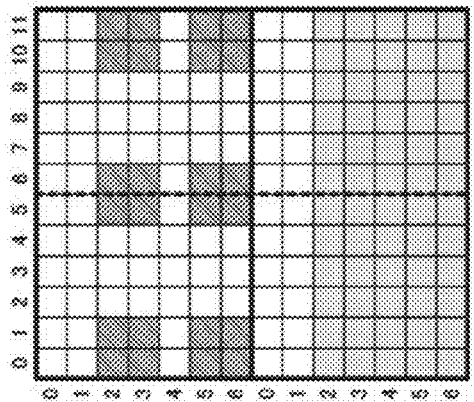
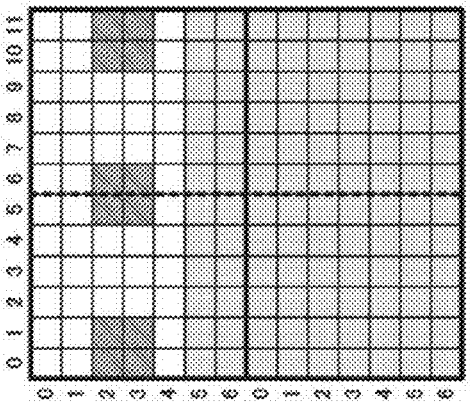
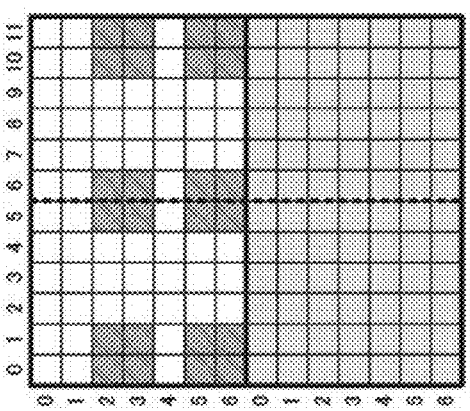
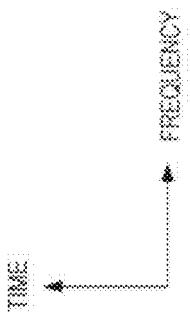

TERMINAL DEVICE, BASE STATION DEVICE, AND COMMUNICATION METHOD

CROSS-REFERENCE TO RELATED APPLICATION

The present application claims benefit of priority to JP 2015-154654 filed on Aug. 5, 2015, the entire content of which is incorporated herein by reference.

TECHNICAL FIELD

Embodiments of the present invention relate to a technology of a terminal device, a base station device, and a communication method that enable efficient communication.

BACKGROUND ART

The 3rd Generation Partnership Project (3GPP), which is a standardization project, standardized the Evolved Universal Terrestrial Radio Access (hereinafter, referred to as E-UTRA), in which high-speed communication is realized by adopting an Orthogonal Frequency-Division Multiplexing (OFDM) communication scheme and flexible scheduling using a unit of prescribed frequency and time called resource block.

Moreover, the 3GPP discusses Advanced E-UTRA, which realizes higher-speed data transmission and has upper compatibility with E-UTRA. E-UTRA relates to a communication system based on a network in which base station devices have substantially the same cell configuration (cell size); however, regarding Advanced E-UTRA, discussion is made on a communication system based on a network (different-type radio network, Heterogeneous Network) in which base station devices (cells) having different configurations coexist in the same area. In this regard, E-UTRA is also referred to as "LTE (Long Term Evolution)", and Advanced E-UTRA is also referred to as "LTE-Advanced". Furthermore, LTE may be a collective name including LTE-Advanced.

A Carrier Aggregation (CA) technique and a Dual Connectivity (DC) technique are specified, in which, in a communication system where cells (macro cells) having large cell radii and cells (small cells) having smaller cell radii than those of the macro cells coexist as in a heterogeneous network, a terminal device performs communication by connecting to a macro cell and a small cell simultaneously (NPL 1).

Meanwhile, NPL 2 studies Licensed-Assisted Access (LAA). According to LAA, a non-allocated frequency band (Unlicensed spectrum) used by a wireless Local Area Network (LAN) is used as LTE. More specifically, the non-allocated frequency band is configured as a secondary cell (secondary component carrier). Connection, communication, and/or a configuration of the secondary cell(s) used as LAA are assisted by a primary cell (primary component carrier) configured to an allocated frequency band (Licensed spectrum). LAA widens a frequency band that is available for LTE, and thus wide band transmission is enabled. In this regard, LAA is used in a shared frequency band (shared spectrum) shared between prescribed operators.

Furthermore, latency in radio communication is one of substantial factors in a system which intends safety and security. Further reducing the latency is demanded for LTE including the LTE which uses LAA and the LTE which uses allocated frequency bands in the related art.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 12), 3GPP TS 36.213 V12.4.0 (2014-12).

NPL 2: RP-141664, Ericsson, Qualcomm, Huawei, Alcatel-Lucent, "Study on Licensed-Assisted Access using LTE," 3GPP TSG RAN Meeting #65, September 2014.

SUMMARY OF INVENTION

Technical Problem

According to LAA, in a case that the non-allocated frequency band or the shared frequency band is used, the frequency band is shared between other systems and/or other operators. However, LTE is designed assuming use in an allocated frequency band or a non-shared frequency band. Therefore, the LTE in the related art may not be used in the non-allocated frequency band or the shared frequency band. Furthermore, the LTE including LTE which uses LAA and the LTE which uses an allocated frequency band in the related art is demanded to reduce latency in radio communication.

Some aspects of the present invention have been made in view of the above-described circumstances, and an object is to provide a terminal device, a base station device, and a communication method that can efficiently control a cell using an allocated frequency band, a non-allocated frequency band, or a shared frequency band.

Solution to Problem (1) In order to accomplish the above-described object, according to some aspects of the present invention, the following measures are provided. Specifically, a terminal device, according to an aspect of the present invention, for communicating with a base station device includes: a higher layer processing unit configured to configure a first configuration for monitoring an Enhanced Physical Downlink Control CHannel (EPDCCH) and a second configuration for measuring a Discovery Signal (DS); a reception processing unit configured to monitor a candidate of the EPDCCH, based on the first configuration; and a detection unit configured to detect the DS in a prescribed subframe to be determined, based on the second configuration. In a case that simultaneous transmissions oil the EPDCCH and the DS occur in a Licensed Assisted Access (LAA) cell, the EPDCCH is mapped onto a resource element different from a resource element corresponding to the DS in the prescribed subframe.

(2) Moreover, a base station device, according to an aspect of the present invention, for communicating with a terminal device includes: a higher layer processing unit configured to configure, for the terminal device, a first configuration for monitoring an Enhanced Physical Downlink Control CHannel (EPDCCH) and a second configuration for measuring a Discovery Signal (DS); a control channel processing unit configured to map the EPDCCH onto a candidate of the EPDCCH, based on the first configuration; and a discovery signal processing unit configured to map the DS in a prescribed subframe to be determined, based on the second configuration. In a case that simultaneous transmissions on the EPDCCH and the DS occur in a Licensed Assisted Access (LAA) cell, the EPDCCH is mapped onto a resource element different from a resource element corresponding to the DS in the prescribed subframe.

(3) Moreover, a communication method, according to an aspect of the present invention, to be used by a terminal device for communicating with a base station device includes; configuring a first configuration for monitoring an Enhanced Physical Downlink Control CHannel (EPDCCH) and a second configuration for measuring a Discovery Signal (DS); monitoring a candidate of the EPDCCH, based on the first configuration; and detecting the DS in a prescribed subframe to be determined, based on the second configuration. In a case that simultaneous transmissions on the EPDCCH and the DS occur in a Licensed Assisted Access (LAA) cell, the EPDCCH is mapped onto a resource element different from a resource element corresponding to the DS in the prescribed subframe.

(4) Moreover, a communication method, according to an aspect of the present invention, to be used by a base station device for communicating with a terminal device includes: configuring, for the terminal device, a first configuration for monitoring an Enhanced Physical Downlink Control CHannel (EPDCCH) and a second configuration for measuring a Discovery Signal (DS); mapping the EPDCCH onto a candidate of the EPDCCH, based on the first configuration; and mapping the DS in a prescribed subframe to be determined, based on the second configuration. In a case that simultaneous transmissions on the EPDCCH and the DS occur in a Licensed Assisted Access (LAA) cell, the EPDCCH is mapped onto a resource element different from a resource element corresponding to the DS in the prescribed subframe.

Advantageous Effects of Invention

According to some aspects of the present invention, in a radio communication system, in which a base station device and a terminal device communicate, transmission efficiency is improved.

BRIEF DESCRIPTION OF DRAWINGS

FIG. 10A to FIG. 10E are diagrams illustrating configuration examples of DMRSs associated with the second EPDCCHs used in a second partial sub frame.

DESCRIPTION OF EMBODIMENTS

First Embodiment

A first embodiment of the present invention will be described below. A description will be given by using a communication system (cellular system) in which a base station device (base station, NodeB, or eNodeB (eNB)) and a terminal device (terminal, mobile station, a user device, or a User equipment (UE)) communicate in a cell.

Note that a description on downlink in the description of the present embodiment includes descriptions for downlink in normal cells and downlink in LAA cells. For example, a description on downlink subframes includes descriptions for downlink subframes in the normal cells, full subframes in the LAA cells, and partial subframes in the LAA cells.

A physical channel and a physical signal substantially used in EUTRA and Advanced EUTRA will be described. The "channel" refers to a medium used to transmit a signal, and the "physical channel" refers to a physical medium used to transmit a signal. In the present embodiment, the physical channel may be used synonymously with "signal". In the future EUTRA and Advanced EUTRA, the physical channel may be added or its constitution and format type may be changed or added; however, the description of the present embodiment will not be affected even if the channel is changed or added.

In EUTRA and Advanced EUTRA, scheduling of a physical channel or a physical signal is managed by using a radio frame. One radio frame is 10 ms in length, and one radio frame is constituted of 10 subframes. In addition, one subframe is constituted of two slots (i.e., one subframe is 1 ms in length, and one slot is 0.5 ms in length). Moreover, scheduling is managed by using a resource block as a minimum unit of scheduling for allocating a physical channel. The "resource block" is defined by a given frequency domain constituted of a set of multiple subcarriers (e.g., 12 subcarriers) on a frequency axis and a domain constituted of a specific transmission time slot (one slot).

Figure 1:
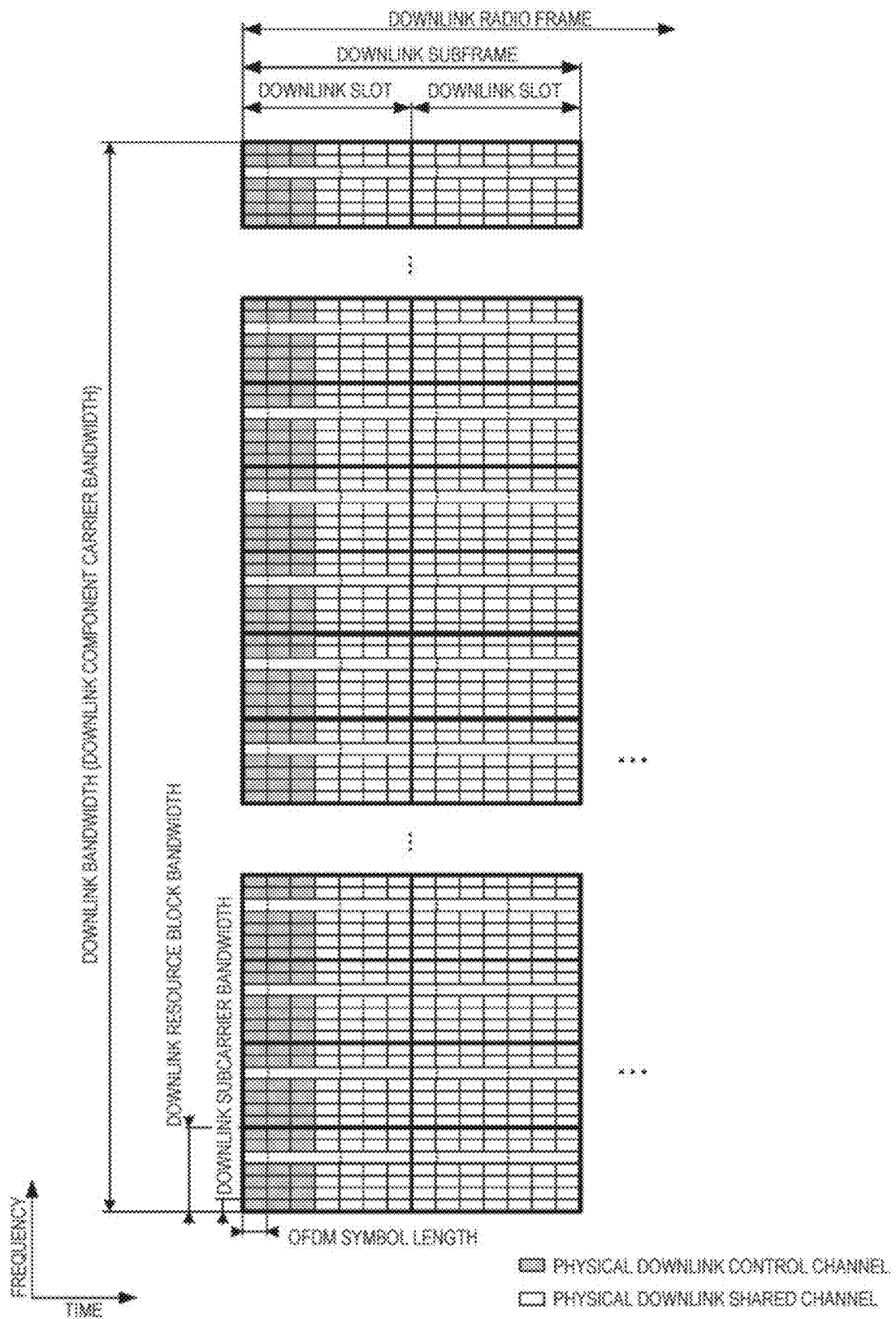
FIG. 1 is a diagram illustrating an example of a downlink radio frame configuration according to a present embodiment.

FIG. 1 is a diagram illustrating an example of a downlink radio frame configuration according to the present embodiment. In the downlink, an OFDM access scheme is used. In the downlink, a PDCCH, an EPDCCH, a Physical Downlink Shared CHannel (PDSCH), and the like are allocated. A downlink radio frame is constituted by a downlink Resource Block (RB) pair. This downlink RB pair is a unit for allocation of a downlink radio resource and the like and is based on the frequency band of a predefined width (RB bandwidth) and a time duration (two slots=1 subframe). Each of the downlink RB pairs is constituted of two downlink RBs (RB bandwidth×slot) that are contiguous in time domain. Each of the downlink RBs is constituted of 12 subcarriers in frequency domain. In the time domain, the downlink RB is constituted of seven OFDM symbols in a case that a normal cyclic prefix is added, while the downlink RB is constituted of six OFDM symbols in a case that a cyclic prefix that is longer than the normal cyclic prefix is added. A region defined by a single subcarrier in the frequency domain and a single OFDM symbol in the time domain is referred to as "Resource Element (RE)". A physical downlink control channel is a physical channel on which downlink control information such as a terminal device identifier, physical downlink shared channel scheduling information, physical uplink shared channel scheduling information, and a modulation scheme, coding rate, and retransmission parameter are transmitted. Note that although a downlink subframe in a single Component Carrier (CC) is described here, a downlink subframe is defined for each CC and downlink subframes are approximately synchronized between the CCs.

Although not illustrated here, Synchronization Signals may be assigned, a physical broadcast information channel may be allocated, and a downlink Reference Signal (RS) may be assigned, to a downlink subframe. Examples of a downlink reference signal are a Cell-specific Reference Signal (CRS: Cell-specific RS), which is transmitted through the same transmission port as that for a PDCCH, a Channel State Information Reference Signal (CST-RS), which is used to measure Channel State Information (CSI), a User Equipment-specific Reference Signal (URS: UE-specific RS)), which is transmitted through the same transmission port as that of one or some PDSCHs, and a Demodulation Reference Signal (DMRS), which is transmitted through the same transmission port as that for an EPDCCH. Moreover, carriers on which no CRS is mapped may be used. In this case, a similar signal (referred to as "enhanced synchronization signal") to a signal corresponding to one or some transmission ports (e.g., only transmission port 0) or all the transmission ports for the CRSs can be inserted into one or some subframes (e.g., the first and sixth subframes in the radio frame) as time and/or frequency tracking signals. The terminal-specific reference signals transmitted at the same transmission port as part of PDSCHs are also referred to as terminal-specific reference signals or DMRSs associated with PDSCHs. The demodulation reference signals transmitted at the same transmission port as the EPDCCHs are also referred to as DMRSs associated with the EPDCCHs.

Although not illustrated, Discovery Signals (DSs) may be arranged in downlink subframes. A Discovery signal Measurement Timing Configuration (DMTC) is set up (configured) to the terminal based on parameters configured via RRC signaling. A DMTC Occasion is six milliseconds, and is constituted of contiguous six subframes. This terminal assumes that a DS is not transmitted to subframes outside the DMTC Occasion.

In a certain cell, a DS (DS Occasion) is constituted of a time period (DS period) of a prescribed number of contiguous subframes. The prescribed number is one to five according to FDD (Frame structure type 1) and two to five according to TDD (Frame structure type 2). The prescribed number is configured by the RRC signaling. Furthermore, the DS period or a configuration of the DS period will also be referred to as a Discovery signals Measurement Timing Configuration (DMTC). The terminal assumes that the DS is transmitted (is mapped or occurs) per subframe configured by a parameter dmtc-Periodicity configured by the RRC signaling. The terminal assumes a presence of the DS configured to include following signals in downlink subframes.

(1) A CRS of antenna port 0 in a DwPTS of all downlink subframes and all special subframes in the DS period.

(2) A PSS in a first subframe of the DS period according to FDD. A PSS in the second subframe of the DS period according to TDD.

(3) A SSS in the first subframe of the DS period.

(4) A non-zero power CSI-RS in a zero or more subframes of the DS period. This non-zero power CSI-RS is configured by the RSS signaling.

The terminal performs measurements based on the configured DS. The measurements are performed by using the CRS of the DS or the non-zero power CSI-RS of the DS. The configuration related to the DS can configure multiple non-zero power CSI-RSs.

The DS and the DMTC in the LAA cells can be the same as the DS and the DMTC according to FDD. For example, in the LAA cells, the DS period is any of one to five as in FDD, and the PSS is present in the first subframe of the DS period. Note that the DS in the LAA cells may be configured differently from the DS in the normal cells. For example, the DS in the LAA cells does not include the CRS. The DS in the LAA cells includes the PSS and the SSS which can be shifted in the frequency direction.

In the LAA cells, a control signal and/or a control channel including control information can be transmitted in subframes in the DS Occasion or subframes in the DMTC Occasion. The control information can include information of the LAA cells. For example, the control information is information regarding a frequency, a load, degree of congestion, an interference, transmit power, a channel occupation time and/or a buffer status for transmission data in the LAA cells.

The control signal and/or control channel can be demodulated or detected by the DMRS in the DS Occasion. That is, the control signal and/or control channel is transmitted from an antenna port used to transmit the DMRS in the DS Occasion. More specifically, the DMRS in the DS Occasion is a DMRS (demodulation reference signal) to be associated with the control signal and/or control channel, and can be configured similar to the DMRS associated with the PDSCH or the EPDCCH.

A scramble sequence used for the DMRS associated with the control signal and/or control channel may be generated differently from a scramble sequence used for the DMRS associated with the PDSCH or the EPDCCH. In this regard, the scramble sequence used for the DMRS is generated as an initial value which is a value calculated based on a slot number (subframe number), a first parameter and a second parameter. For example, in the scramble sequence used for the DMRS associated with the PDSCH, the first parameter is a value configured by a cell identifier (cell ID) or a higher layer, and the second parameter is zero or one given by the DCI. The second parameter is fixed to zero in a case that the value is not given by the DCI. In the scramble sequence used for the DMRS associated with the EPDCCH, the first parameter takes a value configured by the higher layer per EPDCCH set, and the second parameter is fixed to two.

In the scramble sequence used for the DMRS associated with the control signal and/or control channel, the first parameter takes a value configured by the higher layer, and is a cell identifier of a corresponding LAA cell or a cell identifier associated with the non-zero power CSI-RS in the DS Occasion. In the scramble sequence used for the DMRS associated with the control signal and/or control channel, the second parameter takes a value fixed to a prescribed value or a value configured by the higher layer. In a case that the second parameter is fixed to the prescribed value, the second parameter takes any value of zero, one and two as with the second parameter used for the scramble sequence used for the DMRS associated with the PDSCH or the EPDCCH, or a value (e.g., 3) different from the second parameter used for the scramble sequence used for the DMRS associated with the PDSCH or the EPDCCH. In a case that the second parameter is configured by the higher layer, any value can be configured to the second parameter, and an operator-specific value can be configured to the second parameter, for example.

The control signal and/or control channel can be demodulated or detected by the CRS in the DS Occasion. In other words, the control signal and/or control channel are transmitted via the antenna port used to transmit the CRS in the DS Occasion. Note that the scramble sequence used for the CRS in the DS Occasion can be generated based on the first parameter and/or the second parameter described with reference to the scramble sequence used for the DMRS associated with the control signal and/or control channel.

Figure 2:
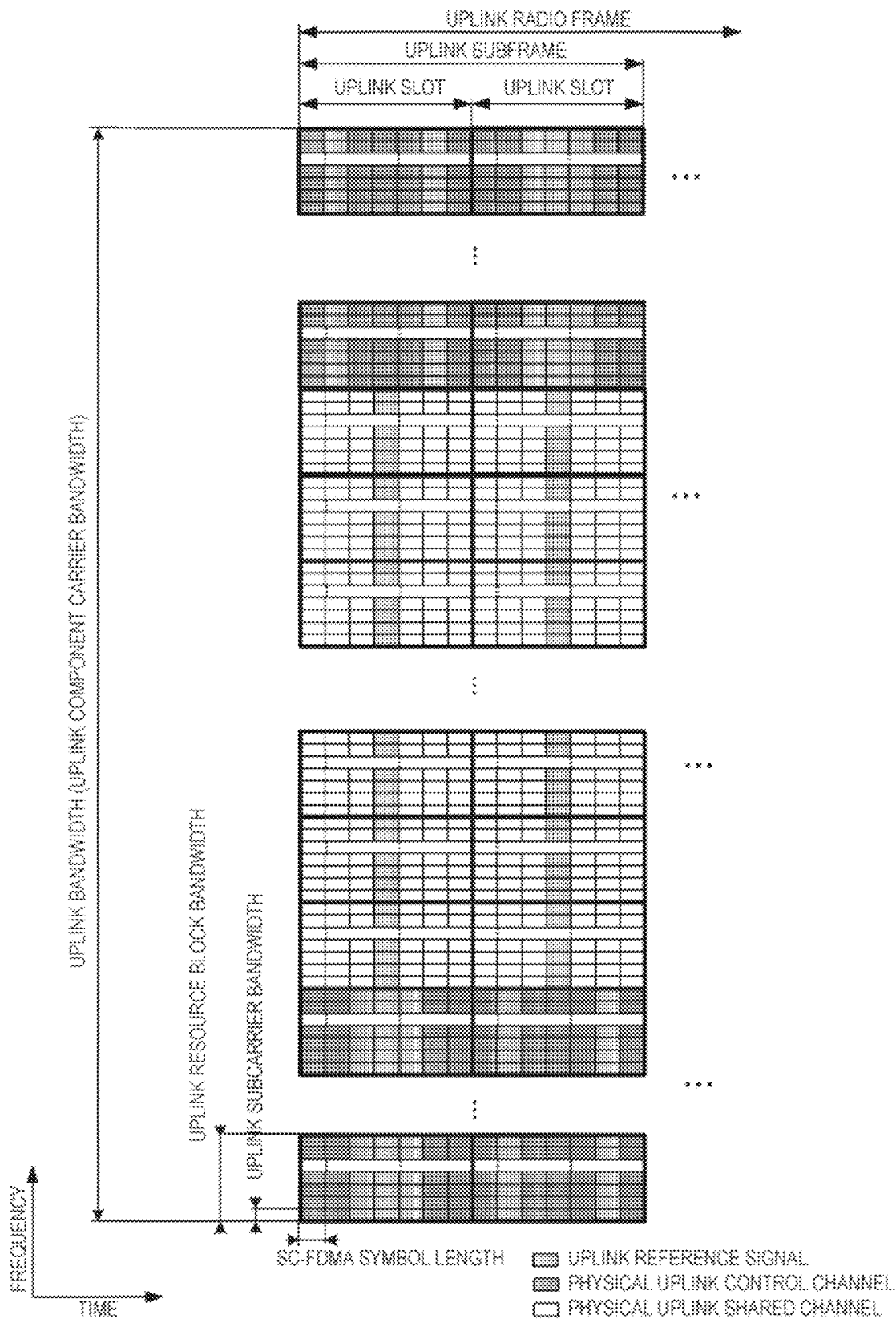
FIG. 2 is a diagram illustrating an example of an uplink radio frame configuration according to the present embodiment.

FIG. 2 is a diagram illustrating an example of an uplink radio frame configuration according to the present embodiment. An SC-FDMA scheme is used in the uplink. In the uplink, a Physical Uplink Shared CHannel (PUSCH), a PUCCH, and the like are allocated. An uplink reference signal is assigned to one or some of PUSCHs and PUCCHs. An uplink radio frame is constituted of uplink RB pairs. This uplink RB pair is a unit for allocation of uplink radio resources and the like and is constituted by the frequency band of a predefined width (RB bandwidth) and a predetermined time duration (two slots=1 subframe). Each of the uplink RB pairs is constituted of two uplink RBs (RB bandwidth×slot) that are contiguous in the time domain. Each of the uplink RB is constituted of 12 subcarriers in the frequency domain. In the time domain, the uplink RB is constituted of seven SC-FDMA symbols in a case that a normal cyclic prefix is added, while the uplink RB is constituted of six SC-FDMA symbols in a case that a cyclic prefix that is longer than the normal cyclic prefix is added. Note that although an uplink subframe in a single CC is described here, an uplink subframe is defined for each CC.

A synchronization signal is constituted by three types of primary synchronization signals and secondary synchronization signals constituted by 31 types of codes that are interleaved in the frequency region. 504 patterns of cell identifiers (Physical Cell Identities; PCIs) for identifying base station devices, and frame timing for radio synchronization are indicated by the combinations of the primary synchronization signals and the secondary synchronization signals. The terminal device identifies the physical cell ID of a received synchronization signal by cell search.

The Physical Broadcast CHannel (PBCH) is transmitted for the notification (configuration) of a control parameter (broadcast information i.e., system information) commonly used among the terminal devices within the cell. The radio resource in which broadcast information is transmitted is announced on the physical downlink control channel to the terminal devices in the cell. Broadcast information not announced on the physical broadcast information channel is transmitted, as a layer-3 message (system information) for announcing the broadcast information of the physical downlink shared channel, by the announced radio resource.

Broadcast information to be notified includes, for example, a Cell Global Identifier (CGI), which indicates a cell-specific identifier, a Tracking Area Identifier (TAI) for managing standby areas in paging, random access configuration information (such as a transmission timing timer), and shared radio resource configuration information, neighboring cell information and uplink access control information of the cell.

A downlink reference signal is classified into a plurality of types according to its use. For example, cell-specific RSs (Cell-specific reference signals) are pilot signals transmitted with prescribed power from each cell and are downlink reference signals periodically repeated in the frequency domain and the time domain under a prescribed rule. The terminal device receives the cell-specific RS and thus measures the reception quality of each cell. The terminal device also uses a cell-specific RS as a reference signal for demodulation of a physical downlink control channel or a physical downlink shared channel transmitted at the same time as a cell-specific RS. A sequence distinguishable among the cells can be used for a sequence for a cell-specific RS.

The downlink reference signal is also used for estimation of downlink channel fluctuation. A downlink reference signal used for estimation of downlink channel fluctuations is referred to as "Channel State Information Reference Signal (CSI-RS)". A downlink reference signal individually configured for the terminal device is referred to as UE-specific Reference signal (URS), a Demodulation Reference Signal (MARS), or a Dedicated RS (DRS), and is referred to for a channel compensation process for demodulating an enhanced physical downlink control channel or a physical downlink shared channel.

The Physical Downlink Control CHannel (PDCCH) occupying one or several OFDM symbols (e.g., 1 to 4 OFDM symbols) from the start of each subframe is transmitted. The Enhanced Physical Downlink Control CHannel (EPDCCH) is a physical downlink control channel allocated to the OFDM symbols to which the physical downlink shared CHannel (PDSCH) is allocated. The PDCCH or EPDCCH is used for notifying each terminal device of radio resource allocation information according to scheduling determined by the base station device and information indicating an adjustment amount for an increase or decrease in transmit power. In the following, even in a case that the Physical Downlink Control CHannel (PDCCH) alone is described, both physical channels that is, the PDCCH and the EPDCCH, are included unless otherwise noted.

The terminal device needs to monitor a physical downlink control channel addressed to the terminal device itself, and receive the physical downlink control channel addressed to the terminal device itself, before transmitting and/or receiving downlink data or a layer-2 message or layer-3 message, which is higher-layer control information (such as a paging or handover command), and thereby acquire, from the physical downlink control channel, radio resource allocation information called uplink grant in a case of transmission and downlink grant (downlink assignment) in a case of reception. Note that it is also possible to constitute the physical downlink control channel so that the physical downlink control channel is to be transmitted in the dedicated resource block domain allocated to each terminal device by the base station device, instead of transmission through OFDM symbols described above.

The Physical Uplink Control CHannel (PUCCH) is used for an acknowledgment in response to reception of downlink data transmitted on the physical downlink shared channel (HARQ-ACK; Hybrid Automatic Repeat reQuest-Acknowledgment or ACK/NACK; Acknowledgment/Negative Acknowledgment), downlink channel (Channel State) Information (CSI), and uplink radio resource allocation request (radio resource request, Scheduling Request (SR)).

CSI includes a Channel Quality Indicator (CQI), a Precoding Matrix Indicator (PMI), a Precoding Type Indicator (PTI), and a Rank Indicator (RI), which can be used respectively for specifying (representing) a preferable modulation scheme and coding rate, a preferable precoding matrix, a preferable PMI type, and a preferable rank. Indication may be used as a notation for each indicator. Moreover, the CQI and the PMI are classified into wideband CQI and PMI assuming transmission using all the resource blocks in a single cell, and subband CQI and PMI assuming transmission using some contiguous resource blocks (subbands) in a single cell. Moreover, PMI may include a type of PMI, which represents a single preferable precoding matrix using two types of PMIs, which are a first PMI and a second PMI, in addition to a normal type of PMI, which represents a single preferable precoding matrix using a single PMI.

The Physical Downlink Shared CHannel (PDSCH) is also used to notify the terminal device of broadcast information (system information) that is not notified by paging or on the physical broadcast information channel, in addition to downlink data, as a layer-3 message. Radio resource allocation information of the physical downlink shared channel is indicated by a physical downlink control channel. The physical downlink shared channel is allocated to OFDM symbols other than the OFDM symbols used to transmit a physical downlink control channel and is transmitted. In other words, the physical downlink shared channel and the physical downlink control channel are time division multiplexed in a single subframe.

The Physical Uplink Shared CHannel (PUSCH) mainly transmits uplink data and uplink control information which may also include uplink control information such as CSI and ACK/NACK. Moreover, the physical uplink shared channel is also used such that the terminal device notifies the base station device of uplink data as well as a layer-2 message and a layer-3 message, which are higher-layer control information. Radio resource allocation information of the physical uplink shared channel is provided by a physical downlink control channel, as in a case of downlink.

An uplink reference signal (also referred to as "uplink pilot signal" or "uplink pilot channel") includes a Demodulation Reference Signal (DMRS) to be used by the base station device to demodulate the physical uplink control CHannel PUCCH and/or physical uplink shared CHannel PUSCH, and a Sounding Reference Signal (SRS) to be mainly used by the base station device to estimate an uplink channel state. Moreover, sounding reference signals are categorized into a periodic sounding reference signal (Periodic SRS), which is transmitted periodically, or an aperiodic sounding reference signal (Aperiodic SRS), which is transmitted in a case that transmission is instructed by the base station device.

A Physical Random Access CHannel (PRACH) is a channel used for the notification (configuration) of a preamble sequence and includes a guard time. The preamble sequence is configured such that multiple sequences are sued for notifying information to the base station device. For example, in a case that 64 sequences are available, 6-bit information can be provided to the base station device. A physical random access channel is used by the terminal device as a means for accessing the base station device.

The terminal device uses the physical random access channel to request an uplink radio resource in a case that no physical uplink control channel is configured for an SR or to request the base station deice for a transmission timing adjustment information (also referred to as Timing Advance (TA) command) necessary for matching uplink transmission timing to a reception timing window of the base station device, for example. Moreover, the base station device can request the terminal device to start a random access procedure, by using a physical downlink control channel.

A layer-3 message is a message exchanged between the Radio Resource Control (RRC) layers of the terminal device and the base station device and handled in a protocol for a Control-plane (C-Plane), and may be used synonymly with RRC signaling or RRC message. A protocol handling user data (uplink data and downlink data) is referred to as "User-plane (UP (U-Plane))" in contrast to "control plane". Here, a transport block that is transmission data in the physical layer includes C-Plane messages and U-Plane data in higher layers. Detailed descriptions of other physical channels are omitted.

A communicable range (communication area) at each frequency controlled by a base station device is regarded as a cell. Here, the communication area covered by the base station device may be different in size and shape for each frequency. Moreover, the covered area may be different for each frequency. A radio network, in which cells having different types of base station devices or different cell radii are located in a mixed manner in the area with the same frequency and/or different frequencies to form a single communication system, is referred to as a heterogeneous network.

The terminal device operates by regarding the inside of a cell as a communication area. In a case that the terminal device moves from a cell to a different cell, the terminal device moves to an appropriate different cell through a cell reselection procedure at the time of having no radio connection (during no communication) and through a handover procedure at the time of having radio connection (during communication). A suitable cell in general indicates a cell that is determined that access from the terminal device is not prohibited based on information specified by the base station device, and that has a downlink reception quality satisfying a predefined condition.

Moreover, the terminal device and the base station device may employ a technique for aggregating the frequencies (component carriers or frequency band) of a plurality of different frequency bands through Carrier Aggregation and treating the resultant as a single frequency (frequency band). A component carrier is categorized as an uplink component carrier corresponding to the uplink and a downlink component carrier corresponding to the downlink. In this specification, "frequency" and "frequency band" may be used synonymously.

For example, in a case that each of five component carriers having frequency bandwidths of 20 MHz are aggregated through Carrier Aggregation, a terminal device capable of performing Carrier Aggregation performs transmission and/or reception by assuming that the aggregated carriers have a frequency bandwidth of 100 MHz. Note that component carriers to be aggregated may have contiguous frequencies or frequencies some or all of which are discontiguous. For example, assuming that available frequency bands include an 800 MHz band, a 2 GHz band, and a 3.5 GHz band, a component carrier may be transmitted in the 800 MHz band, another component carrier may be transmitted in the 2 GHz band, and yet another component carrier may be transmitted in the 3.5 GHz band.

It is also possible to aggregate multiple contiguous or discontiguous component carriers of the same frequency bands. The frequency bandwidth of each component carrier may be narrower (e.g., 5 MHz or 10 MHz) than the receivable frequency bandwidth (e.g., 20 MHz) of the terminal device, and the frequency bandwidth of component carriers to be aggregated may be different from each other. Each frequency bandwidth may be equal to any of the frequency bandwidth of known cells in consideration of backward compatibility, but may be a frequency bandwidth different from any of the frequency bands of the known cells.

Moreover, component carriers (carrier types) without backward compatibility may be aggregated. Note that the number of uplink component carriers to be allocated to (configured for or added for) the terminal device by the base station device may be the same as or may be fewer than the number of downlink component carriers.

A cell constituted of an uplink component carrier in which an uplink control channel is configured for a radio resource request and a downlink component carrier having a cell-specific connection with the uplink component carrier is referred to as "Primary cell (PCell)". A cell constituted of component carriers other than those of the primary cell is referred to as "Secondary cell (SCell)". The terminal device receives a paging message, detects update of broadcast information, carries out an initial access procedure, configures security information, and the like in a primary cell, and need not perform these operations in secondary cells.

Although a primary cell is not a target of activation and deactivation controls (in other words, considered as being activated at any time), a secondary cell has activated and deactivated states, the change of which is explicitly specified by the base station device or is made based on a tinier configured for the terminal device for each component carrier. The primary cell and secondary cell are collectively referred to as "serving cell".

Carrier Aggregation achieves communication using multiple component carriers (frequency bands) using multiple cells, and is also referred to as cell aggregation. The terminal device may have radio connection with the base station device via a relay station device (or repeater) for each frequency. In other words, the base station device of the present embodiment may be replaced with a relay station device.

The base station device manages a cell, which corresponds to an area where terminal devices can communicate with the base station device, for each frequency. A single base station device may manage multiple cells. Cells are classified into multiple types of cells depending on the size of the area (cell size) that allows for communication with terminal devices. For example, cells are classified into macro cells and small cells. Moreover, small cells are classified into femto cells, pico cells, and nano cells depending on the size of the area. In a case that a terminal device can communicate with a certain base station device, the cell configured so as to be used for the communication with the terminal device is referred to as "Serving cell" while the other cells not used for the communication are referred to as "Neighboring cell", among the cells of the base station device.

In other words, in Carrier Aggregation, a plurality of serving cells thus configured include one primary cell and one or a plurality of secondary cells.

A primary cell is a serving cell in which an initial connection establishment procedure has been carried out, a serving cell in which a connection re-establishment procedure has been started, or a cell indicated as a primary cell during a handover procedure. The primary cell operates at a primary frequency. At the point of time when a connection is (re)established, or later, a secondary cell may be configured. Each secondary cell operates at a secondary frequency. The connection may be referred to as an RRC connection. For the terminal device supporting CA, a single primary cell and one or more secondary cells are aggregated.

In the present embodiment, Licensed Assisted Access (LAA) is used, According to LAA, an allocated frequency is configured to (used for) the primary cell, and a non-allocated frequency is configured to at least one of secondary cells. The secondary cell(s) to which the non-allocated frequency is configured is assisted by the primary cell or the secondary cell(s) to which the allocated frequency is configured. For example, the primary cell(s) or the secondary cell to which the allocated frequency is configured performs the configuration and/or announces control information by the RRC signaling, MAC signaling and/or PDCCH signaling to the secondary cell(s) to which the non-allocated frequency is configured. In the present embodiment, a cell assisted by the primary cell or the secondary cell(s) is also referred to as "LAA cell". The LAA cell can be aggregated (assisted) with the primary cell and/or the secondary cell(s) by carrier aggregation. The primary cell or the secondary cell(s) which assists the LAA cell is also referred to as "assist cell". A cell to which the allocated frequency is configured is also referred to as "normal cell (typical cell)", and subframe in the normal cell is also referred as "normal subframe (typical subframe)". The normal subframe includes the downlink subframe, the uplink subframe, and the special subframe. In the present embodiment, the normal subframe will be distinguished from the subframes used for the LAA cells, and described.

The LAA cell may be aggregated (assisted) by the primary cell and/or the secondary cell(s) by dual connectivity.

A basic configuration (architecture) of dual connectivity will be described below. For example, the description will be given in a case that a terminal device 1 connects to multiple base stations 2 (for example, a base station device 2-1 and a base station device 2-2) at the same time. The base station device 2-1 is a base station device constituting a macro cell, and the base station device 2-2 is a base station device constituting a small cell. The terminal device 1 connecting to the base station devices 2 at the same time by using the plurality of cells belonging to the plurality of base station devices 2 as described above is referred to as "dual connectivity". The cells belonging to the respective base station devices 2 may be operated at the same frequency or different frequencies.

Note that Carrier Aggregation is different from dual connectivity in that a single one of the base station devices 2 manages a plurality of cells and the frequencies of the respective cells are different from each other. In other words, Carrier Aggregation is a technique for connecting the single terminal device 1 and a single one of the base station device 2 via a plurality of cells having different frequencies, while dual connectivity is a technique for connecting the single terminal device 1 and the plurality of base station devices 2 via a plurality of cells having the same frequency or different frequencies.

The terminal device 1 and base station devices 2 can apply a technique used for Carrier Aggregation, to dual connectivity. For example, the terminal device 1 and base station devices 2 may apply a technique of allocation of a primary cell and secondary cells or activation/deactivation, to cells connected through dual connectivity.

In dual connectivity, the base station device 2-1 or base station device 2-2 is connected to MME and SGW via a backbone network. The MME is a host control station device corresponding to a Mobility Management Entity (MME) and has the functions of managing mobility and performing authentication control (security control) for the terminal device 1, and configuring routes for user data to the base station devices 2. The SGW is a host control station device corresponding to a serving gateway (S-GW) and has the functions of transmitting user data according to the route for user data to the terminal device 1 configured by the MME.

Moreover, in dual connectivity, the connection route between the base station device 2-1 or base station device 2-2 and the SGW is referred to as an "SGW interface". Moreover, the connection route between the base station device 2-1 or base station device 2-2 and the MME is referred to as "MME interface". Moreover, the connection route between the base station device 2-1 and base station device 2-2 is referred to as "base station interface". The SGW interface is also referred to as an S1-U interface in EUTRA. Moreover, the MME interface is also referred to as "S1-MME interface" in EUTRA. Moreover, the base station interface is also referred to as "X2 interface" in EUTRA.

An example of an architecture for enabling dual connectivity will be described. In dual connectivity, the base station device 2-1 and the MME are connected via the MME interface. Moreover, the base station device 2-1 and the SGW are connected via the SGW interface. Moreover, the base station device 2-1 provides, to the base station device 2-2, the communication route to the MME and/or SGW via the base station interface. In other words, the base station device 2-2 is connected to the MME and/or the SGW via the base station device 2-1.

Moreover, another example of another architecture for enabling dual connectivity will be described. In dual connectivity, the base station device 2-1 and the MME are connected via the MME interface. Moreover, the base station device 2-1 and the SGW are connected via the SGW interface. The base station device 2-1 provides, to the base station device 2-2, the communication route to the MME via the base station interface. In other words, the base station device 2-2 is connected to the MME via the base station device 2-1. Moreover, the base station device 2-2 is connected to the SGW via the SGW interface.

Note that a constitution in which the base station device 2-2 and the MME are directly connected via the MME interface may be employed.

Based on description from a different point of view, dual connectivity is an operation whereby a prescribed terminal device consumes radio resources provided from at least two different network points (master base station device (MeNB or Master eNB) and secondary base station device (SeNB or Secondary eNB)). In other words, in dual connectivity, a terminal device is configured to establish an RRC connection to at least two network points. In dual connectivity, the terminal device may be connected via a non-ideal backhaul in RRC connected (RRC_CONNECTED) state.

In dual connectivity, a base station device that is connected to at least the S1-MME and that acts as the mobility anchor of the core network is referred to as "master base station device". Additionally, a base station device that is not the master base station device and that provides supplemental radio resources to the terminal device is referred to as "secondary base station device". A group of serving cells that is associated with the master base station device may be referred to as "Master Cell Group" (MCG), and a group of serving cells that is associated with the secondary base station device may be referred to as "Secondary Cell Group" (SCG). Note that the cell groups may be serving cell groups.

In dual connectivity, the primary cell belongs to the MCG. Moreover, in the SCG, the secondary cell corresponding to the primary cell is referred to as "Primary Secondary Cell" (pSCell). Note that the pSCell may be referred to as "special cell" or "Special Secondary Cell" (Special SCell). Some of the functions (for example, functions for transmitting and/or receiving a PUCCH) of the PCell (the base station device constituting the PCell) may be supported by the Special SCell (the base station device constituting the Special SCell). Additionally, some of the functions of the PCell may be supported in the pSCell. For example, the function for transmitting a PDCCH may be supported by the pSCell. Additionally, the function for performing a PDCCH transmission may be supported in the pSCell using a search space different from a CSS or USS. For example, the search space different from a USS is a search space determined based on a value defined in the specification, a search space determined based on an RNTI different from a C-RNTI, a search space determined based on a value configured by a higher layer that is different from the RNTI, or the like. Moreover, the pSCell may constantly be in a starting state. Moreover, the pSCell is a cell capable of receiving the PUCCH.

In dual connectivity, the Data Radio Bearer (DRB) may be individually allocated to the MeNB and the SeNB. On the other hand, the Signalling Radio Bearer (SRB) may be allocated only to the MeNB. In dual connectivity, a duplex mode may be configured individually for the MCG and the SCG or the PCell and the pSCell. In dual connectivity, the MCG and the SCG or the PCell and the pSCell need not necessarily be synchronized with each other. In dual connectivity, a plurality of parameters for timing adjustment (TAG or Timing Advance Group) may be configured for each of the MCG and the SCG. In other words, the terminal device is capable of performing uplink transmission at a plurality of different timings in each CG.

In dual connectivity, the terminal device is allowed to transmit UCI corresponding to the cells in the MCG only to the MeNB (the PCell) and to transmit UCI corresponding to the cells in the SCG to SeNB (the pSCell) only. For example, the UCI is an SR, HARQ-ACK, and/or CSTI. Additionally, in each UCI transmission, a transmission method using the PUCCH and/or the PUSCH is applied to each cell group.

All signals can be transmitted and/or received in the primary cell, but some signals may not be transmitted and/or received in the secondary cell. For example, a Physical Uplink Control CHannel (PUCCH) is transmitted only in the primary cell. Additionally, unless a plurality of Timing Advance Groups (TAGs) are configured between the cells, a Physical Random Access CHannel (PRACH) is transmitted only in the primary cell. Additionally, a Physical Broadcast CHannel (PBCH) is transmitted only in the primary cell. Additionally, a Master Information Block (MIB) is transmitted only in the primary cell. Signals that can be transmitted and/or received in the primary cell are transmitted and/or received in the primary secondary cell. For example, the PUCCH may be transmitted in the primary secondary cell. Additionally, the PRACH may be transmitted in the primary secondary cell, regardless of whether a plurality of TAGs are configured. Additionally, the PBCH and the MIB may be transmitted in the primary secondary cell.

In the primary cell, Radio Link Failure (RLF) is detected. In the secondary cell, even if conditions for the detection of RLF are in place, the detection of the RLF is not recognized. However, in the primary secondary cell, the RLF is detected if the conditions are in place. In a case that an RLF is detected in the primary secondary cell, the higher layer of the primary secondary cell announces, to the higher layer of the primary cell, that the RLF has been detected. Semi-Persistent Scheduling (SPS) or Discontinuous Reception (DRX) may be used in the primary cell. The same DRX as in the primary cell may be used in the secondary cell. Fundamentally, in the secondary cell, the MAC configuration information/parameters are shared with the primary cell/primary secondary cell of the same call group. Some of the parameters (for example, STAG-Id) may be configured for each secondary cell. Some of the timers or counters may be applied only to the primary cell and/or the primary secondary cell. A timer or counter to be applied may be configured only to the secondary cell.

In an example where dual connectivity is applied to the LAA cell, the MCG (base station device 2-1) is a base station device which constitutes the primary cell. The SCG (base station device 2-2) is a base station device which constitutes the LAA cell. In other words, the LAA cell is configured as pSCell of the SCG.

In another example where dual connectivity is applied to the LAA the MCG is the base station device which constitutes the primary cell, and the SCG is the base station device which constitutes the pSCell and the LAA cell. In other words, the LAA cell is assisted by the pSCell in the SCG. Note that in a case that the secondary cell is further configured to the SCG, the LAA cell may be assisted by the secondary cell.

In still another example where dual connectivity is applied to the LAA cell, the MCG is the base station device which constitutes the primary cell and the LAA cell, and the SCG is the base station device which constitutes the pSCell. In other words, the LAA cell is assisted by the primary cell in the MCG. Note that in a case that the secondary cell is further configured to the MCG, the LAA cell may be assisted by the secondary cell.

Figure 3:
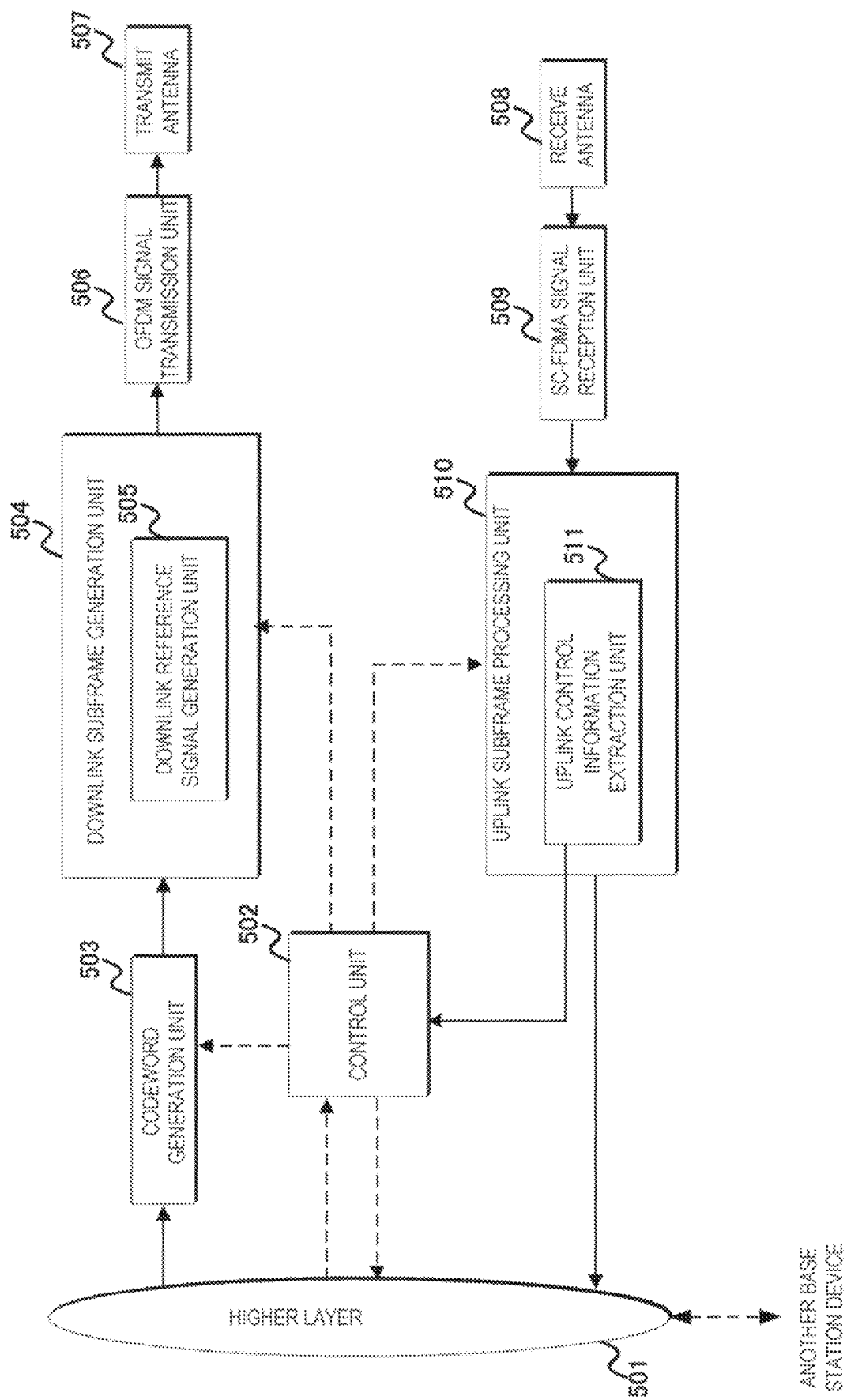
FIG. 3 is a schematic diagram illustrating an example of a block configuration of a base station device 2 according to the present embodiment.

FIG. 3 is a schematic diagram illustrating an example of a block configuration of a base station device 2 according to the present embodiment. The base station device 2 includes a higher layer (higher-layer control information notification unit, higher layer processing unit) 501, a control unit (base station control unit) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (CSI reception unit) 509, and an uplink subframe processing unit 510. The downlink subframe generation unit 504 includes a downlink reference signal generation unit 505. Moreover, the uplink subframe processing unit 510 includes an uplink control information extraction unit (CSI acquisition unit) 511. The downlink subframe generation unit 504 includes a control channel processing unit which maps downlink control channel such as the PDCCH and/or the EPDCCH, and a discovery signal processing unit which maps discovery signal.

Figure 4:
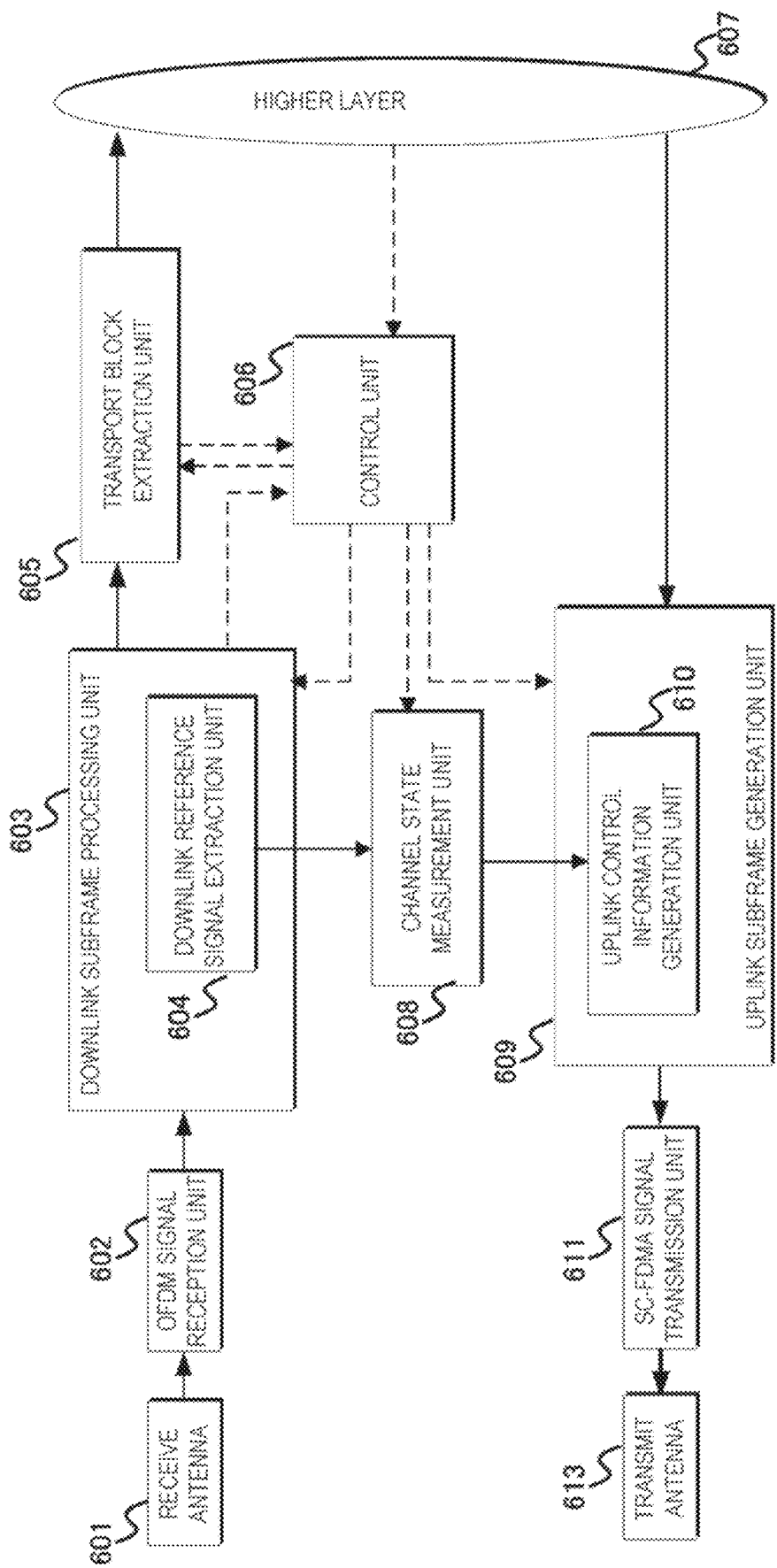
FIG. 4 is a schematic diagram illustrating an example of a block configuration of a terminal device 1 according to the present embodiment.

FIG. 4 is a schematic diagram illustrating an example of a block configuration of a terminal device 1 according to the present embodiment. The terminal device 1 includes a receive antenna (terminal receive antenna) 601, an OFDM signal reception unit (downlink reception unit) 602, a downlink subframe processing unit 603, a transport block extraction unit (data extraction unit) 605, a control unit (terminal control unit) 606, a higher layer (higher-layer control information acquisition unit, higher layer processing unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink subframe processing unit 603 includes a downlink reference signal extraction unit 604. Moreover, the uplink subframe generation unit 609 includes an uplink control information generation unit (UCI generation unit) 610. The downlink subframe processing unit 603 includes a control channel processing unit which monitors downlink control channels such as the PDCCH and/or the EPDCCH, and a discovery signal processing unit which detects (monitors) discovery signal.

First, a flow of downlink data transmission and/or reception will be described with reference to FIG. 3 and FIG. 4. In the base station device 2, the control unit 502 holds a Modulation and Coding Scheme (MCS) indicating a modulation scheme, a coding rate, and the like in the downlink, a downlink resource allocation indicating RBs to be used for data transmission, and information to be used for HARQ control (a redundancy version, an HARQ process number, and a new data indicator) and controls the codeword generation unit 503 and the downlink subframe generation unit 504, based on these elements. Downlink data (also referred to as a downlink transport block) transmitted from the higher layer 501 is processed through error correction coding, rate matching, and the like in the codeword generation unit 503 under the control of the control unit 502 and then, a codeword is generated. Two codewords at maximum are transmitted at the same time in a single subframe of a single cell. The control unit 502 instructs the downlink subframe generation unit 504 to generate a downlink subframe. First, a codeword generated in the codeword generation unit 503 is converted into a modulation symbol sequence through a modulation process, such as Phase Shift Keying (PSK) modulation or Quadrature Amplitude Modulation (QAM). Moreover, a modulation symbol sequence is mapped onto REs of some RBs, and a downlink subframe for each antenna port is generated through a precoding process. In this operation, the transmission data sequence transmitted from the higher layer 501 includes higher-layer control information, which is control information of the higher layer (e.g., dedicated (individual) Radio Resource Control (RRC) signaling). Moreover, the downlink reference signal generation unit 505 generates a downlink reference signal. The downlink subframe generation 504 maps the downlink reference signal onto the REs in the downlink subframes in accordance with an instruction from the control unit 502. The OFDM signal transmission unit 506 modulates the downlink subframe generated by the downlink subframe generation unit 504 to an OFDM signal, and then transmits the OFDM signal through the transmit antenna 507. Although a configuration of including one OFDM signal transmission unit 506 and one transmit antenna 507 is illustrated as an example here, a configuration of including multiple OFDM signal transmission units 506 and multiple transmit antennas 507 may be employed for transmitting downlink subframes through multiple antenna ports. Moreover, the downlink subframe generation unit 504 may also have a capability of generating physical-layer downlink control channels, such as a PDCCH and an EPDCCH to map the channels onto REs in downlink subframes. Multiple base station devices (base station device 2-1 and base station device 2-2) transmit separate downlink subframes.

In the terminal device 1, an OFDM signal is received by the OFDM signal reception unit 602 through the receive antenna 601, and an OFDM demodulation process is performed on the signal. The downlink subframe processing unit 603 first detects physical-layer downlink control channels, such as a PDCCH and an EPDCCH. More specifically, the downlink subframe processing unit 603 decodes the signal by assuming that a PDCCH and an EPDCCH have been transmitted in the regions to which the PDCCH and the EPDCCH can be allocated, and checks CRC bits added in advance (blind decoding). In other words, the downlink subframe processing unit 603 monitors a PDCCH and an EPDCCH. In a case that the CRC bits match an TD (a single terminal-specific identifier assigned to a single terminal, such as a Cell-Radio Network Temporary Identifier (C-RNTI) or a Semi Persistent Scheduling-C-RNTI (SPS- C-RNTI), or a Temporary C-RNTI) assigned by the base station device beforehand, the downlink subframe processing unit 603 recognizes that a PDCCH or an EPDCCH has been detected and extracts a PDSCH by using control information included in the detected PDCCH or EPDCCH. The control unit 606 holds an MCS indicating a modulation scheme, a coding rate, and the like in the downlink based on the control information, a downlink resource allocation indicating RBs to be used for downlink data transmission, and information to be used for HARQ control, and controls the downlink subframe processing unit 603, the transport block extraction unit 605, and the like, in accordance with these elements. More specifically, the control unit 606 performs control so as to carry out an RE mapping process in the downlink subframe generation unit 504, an RE demapping process and demodulation process corresponding to the modulation process, and the like. The PDSCH extracted from the received downlink subframe is transmitted to the transport block extraction unit 605. Furthermore, the downlink reference signal extraction unit 604 in the downlink subframe processing unit 603 extracts the downlink reference signal from the downlink subframe. The transport block extraction unit 605 extracts a transport block that has been subjected to a rate matching process, a rate matching process corresponding to error correction coding, error correction decoding, and the like in the codeword generation unit 503, and transmits the extracted transport block to the higher layer 607. The transport block includes higher-layer control information, and the higher layer 607 notifies the control unit 606 of a necessary physical-layer parameter, based on the higher-layer control information. The plurality of base station devices 2 (base station device 2-1 and base station device 2-2) transmit separate downlink subframes, and the terminal device 1 receives the downlink subframes. Hence, the above-described processes may be carried out for the downlink subframe of each of the plurality of base station devices 2. In this situation, the terminal device 1 may recognize or may not necessarily recognize that multiple downlink subframes have been transmitted from the multiple base station devices 2. In a case that the terminal device 1 does not recognize the subframes, the terminal device 1 may simply recognize that multiple downlinks subframes have been transmitted in multiple cells. Moreover, the transport block extraction unit 605 determines whether the transport block has been detected correctly, and transmits a determination result to the control unit 606.

Next, a flow of uplink signal transmission and/or reception will be described. In the terminal device 1, the control unit 606 instructs a downlink reference signal extracted by the downlink reference signal extraction unit 604 to be transmitted to the channel state measurement unit 608, and then instructs the channel state measurement unit 608 to measure the channel state and/or interference, and further to calculate CSI based on the measured channel state and/or interference. The control unit 606 instructs the uplink control information generation unit 610 to generate an HARQ-ACK (DTX (not transmitted yet), ACK (detection success), or NACK (detection failure)) and to map the HARQ-ACK onto a downlink subframe, based on a determination result of whether the transport block is correctly detected. The terminal device 1 performs these processes on the downlink subframe of each of multiple cells. In the uplink control information generation unit 610, a PUCCH including the calculated CSI and/or HARQ-ACK is generated. In the uplink subframe generation unit 609, the PUSCH including the uplink data transmitted from the higher layer 607 and the PUCCH generated by the uplink control information generation unit 610 are mapped onto RBs in an uplink subframe, and an uplink subframe is generated. The uplink subframe is subjected to the SC-FDMA modulation to generate an SC-FDMA signal, and the SC-FDMA signal is transmitted via the transmit antenna 613 by the SC-FDMA signal transmission unit 611.

Details of the LAA cell will be described below.

The frequency used by the LAA cell is shared with other communication systems and/or other LTE operators. To share the frequency, the LAA cell needs fairness with the other communication systems and/or the other LTE operators. For example, a communication method used by the LAA cell needs a fair frequency sharing technique (method). In other words, the LAA cell is a cell which performs a communication method (communication procedure) to which the fair frequency sharing technique is applicable (used).

An example of the fair frequency sharing technique is Listen-Before-Talk (LBT). In LBT, before a certain base station or a certain terminal transmits a signal by using a frequency (a component carrier or a cell), interference power (an interference signal, receive power, a receive signal, noise power and a noise signal) or the like of such a frequency is measured to identify (detect, assume or determine) whether the frequency is in an idle state (a free state, a non-congested state, Absence, or Clear) or a busy state (an occupied state, a congested state, Presence, or Occupied). In a case that the frequency being in the idle state is identified based on LBT, the LAA cell can transmit a signal at a prescribed timing of the frequency. In a case that the frequency is identified as the busy state, the LAA cell does not transmit a signal at the prescribed timing of the frequency. LBT controls and prevents an interference with signals to be transmitted by other communication systems and/or other base stations including other LTE operators and/or terminals.

An LBT procedure is defined as a mechanism to which a CCA check is applied before a certain base station or terminal uses the frequency (channel). The CCA performs power detection or signal detection for determining presence of absence of another signal in the channel to identify whether the frequency is in the idle state or the busy state. Note that in the present embodiment, a definition of CCA may be equivalent to a definition of LBT.

CCA can use various methods as a method for determining the presence or absence of another signal. For example, CCA makes the determination based on whether the interference power at a certain frequency exceeds a certain threshold. Moreover, for example, CCA makes the determination based on whether the receive power of a prescribed signal or channel at a certain frequency exceeds a certain threshold. The threshold may be defined in advance. The threshold may be configured by a base station or another terminal. The threshold may be determined (configured) based on at least another value (parameter) such as transmit power (maximum transmit power).

Note that CCA in the LAA cell does not need to be recognized by the terminal connected with (configured to) the LAA cell.

The LAA cell may be defined as a cell different from a secondary cell which uses the allocated frequency. For example, the LAA cell is configured differently from the configuration of the secondary cell which uses the allocated frequency. Part of parameters configured to the LAA cell is not configured to the secondary cell which uses the allocated frequency. Part of the parameters configured to the secondary cell which uses the allocated frequency is not configured to the LAA cell. In the present embodiment, the LAA cell is described as a cell different from the primary cell and the secondary cell(s), but the LAA cell may be defined as one of the secondary cells. Secondary cells of the related art are also referred to as "first secondary cells", and the LAA cell is also referred to as "second secondary cell". A primary cell and secondary cell(s) of the related art are also referred to as "first serving cells", and the LAA cell is also referred to as "second serving cell".

The LAA cell may be different from a frame structure type of the related art. For example, a first frame structure type (FDD, frame structure type 1) or a second frame structure type (TDD, frame structure type 2) are used for (configured to) the serving cells in the related art, and a third frame structure type (frame structure type 3) is used for (configured to) the LAA cell.

Here, the non-allocated frequency is a frequency different from the allocated frequency that is allocated as a dedicated frequency to a prescribed operator. For example, the non-allocated frequency is a frequency used by a wireless LAN. For example, the non-allocated frequency is a frequency which is not configured to the LTE in the related art, and the allocated frequency is a frequency which can be configured by the LTE in the related art. In the present embodiment, the frequency configured to the LAA cell is described as the non-allocated frequency, but is not limited to this. In other words, the non-allocated frequency can be replaced with a frequency configured to the LAA cell. For example, the non-allocated frequency is a frequency which cannot be configured to the primary cell, and is a frequency which can be configured only to the secondary cell(s). For example, the non-allocated frequency includes a frequency shared with multiple operators. For example, the non-allocated frequency is a frequency which is configured only to a cell configured, assumed and/or processed differently from the primary cell or secondary cell(s) of the related art.

The LAA cell may be a cell which uses a different method from the method of the related art for structures of radio frames, physical signals and/or physical channels according to LTE, and a communication procedure.

For example, in the LAA cell, prescribed signals and/or channels configured (transmitted) by the primary cell and/or the secondary cell(s) are not configured (transmitted). The prescribed signals and/or channels include the CRS, the DS, the PDCCH, the EPDCCH, the PDSCH, the PSS, the SSS, the PBCH, a PHICH, a PCFICH, the CSI-RS and/or an SIB, or the like. For example, the signals and/or the channels that are not configured in the LAA cell are as follows. In addition, the signals and/or the channels described below may be used in combination. Note that in the present embodiment, the signals and/or the channels that are not configured in the LAA cell may also be read as signals and/or channels whose the transmissions from the LAA cell are not expected by the terminal.

(1) In the LAA cell, control information of a physical layer is not transmitted on the PDCCH, but is transmitted only on the EPDCCH.

(2) In the LAA cell, the CRS, the DMRS, the URS, the PDCCH, the EPDCCH and/or the PDSCH are not transmitted in subframes which are activated (on-state) or all subframes, and the terminal does not assume this transmission in all subframes.

(3) In the LAA cell, the terminal assumes transmission of the DRSs, the PSSs and/or the SSSs in subframes which are activated (on-state).

(4) In the LAA cell, information of CRS mapping is announced to the terminal for each subframe, and the terminal assumes the CRS mapping based on the information. For example, according to the assumption of the CRS mapping, the CRS is not mapped onto all resource elements of the corresponding subframe. According to the assumption of the CRS mapping, the CRS is not mapped onto part of resource elements (e.g., all resource elements in two head OFDM symbols) of the corresponding subframe. According to the assumption of the CRS mapping, the CRSs are mapped onto all resource elements of the corresponding subframe. For example, the information of the CRS mapping is announced from the corresponding LAA cell or a cell different from the corresponding LAA cell. The information of the CRS mapping is included in the DCI and is announced on the PDCCH or the EPDCCH.

For example, in the LAA cell, the prescribed signals and/or channels which is not configured (transmitted) by the primary cell and/or the secondary cell(s) is configured (transmitted).

For example, in the LAA cell, only downlink component carrier or subframe is defined, and only downlink signal and/or channel are transmitted. In other words, in the LAA cell, uplink component carrier or subframe is not defined, and uplink signal and/or channel is not transmitted.

For example, in the LAA cell, a Downlink Control Information (DCI) format which can be supported is different from a DCI format which can support the primary cell and/or the secondary cell(s). The DCI format which supports only the LAA cell is defined. The DCI format which supports the LAA cell includes control information which is only valid for the LAA cell.

For example, in the LAA cell, the assumption of the signals and/or channels is different from the secondary cells in the related art.

First, the assumption of the signals and/or channels in the secondary cells of the related art will be described. A terminal that satisfies part or all of the following conditions assumes that the PSS, the SSS, the PBCH, the CRS, the PCFICH, the PDSCH, the PDCCH, the EPDCCH, the PHICH, the DMRS and/or the CSI-RS may not be transmitted by the secondary cell except transmission of the DS. The terminal assumes that the DS is always transmitted by the secondary cell. The assumption continues to a subframe in which an activation command (a command for activation) is received by the terminal in the secondary cell at a certain carrier frequency.

(1) The terminal supports a configuration (parameter) associated with the DS.

(2) RRM measurements based on the DS is configured to the terminal in the secondary cell.

(3) The secondary cell deactivated (deactivated state).

(4) Reception of the MBMS by a higher layer is not configured to the terminal in the secondary cell.

Furthermore, in a case that the secondary cell is activated (activated state), the terminal assumes that the PSS, the SSS, the PBCH, the CRS, the PCFICH, the PDSCH, the PDCCH, the EPDCCH, the PHICH, the DMRS and/or the CSI-RS are transmitted by the secondary cell in a configured prescribed subframe or all subframes.

Next, an example of the assumption of the signals and/or channels in the LAA cell will be described. A terminal that satisfies part or all of the following conditions assumes that the PSS, the SSS, the PBCH, the CRS, the PCFICH, the PDSCH, the PDCCH, the EPDCCH, the PHICH, the DMRS and/or the CSI-RS may not be transmitted together with transmission of the DS by the LAA cell. The assumption continues to a subframe in which an activation command (a command for activation) is received by the terminal in the secondary cell at a certain carrier frequency.

(1) The terminal supports a configuration (parameter) associated with the DS.

(2) RRM measurements based on the DS is configured to the terminal in the LAA cell.

(3) The LAA cell is deactivated (deactivated state).

(4) Reception of the MBMS by a higher layer is not configured to the terminal in the LAA cell.

Furthermore, another example of the assumption of the signals and/or channels in the LAA cell will be described. In a case that the LAA cell is deactivated (deactivated state), the assumption of the signals and/or channels in the LAA cell is the same as the assumption of the signals and/or channels in the secondary cells in the related art. In a case that the LAA cell is activated (activated state), the assumption of the signals and/or channels in the LAA cell is different from the assumption of the signals and/or channels in the secondary cells in the related art. In a case that, for example, the LAA cell is activated (activated state), the terminal assumes that the LAA cell may not transmit the PSS, the SSS, the PBCH, the CRS, the PCFICH, the PDSCH, the PDCCH, the EPDCCH, the PHICH, the DMRS and/or the CSI-RS except a prescribed subframe configured to the LAA cell. Details will be described below.

Next, details of a communication procedure of the LAA cell will be described. The LAA cell can initiate transmission of the channels and/or the signals at a timing that does not depend on a Subframe boundary based on LBT. Furthermore, the LAA cell can terminate the transmission of the channels and/or the signals at a timing that does not depend on a Subframe boundary based on LBT and a transmissible maximum burst length. In other words, the channels and/or the signals can be transmitted in partial subframe. The partial subframe can be defined as follows, for example. In the present embodiment, transmissible OFDM symbols indicated by the partial subframes are defined such that the terminal assumes transmission of each or all of the channels and/or the signals.

(1) In a certain subframe, a region from an intermediate OFDM symbol of the subframe to a last OFDM symbol (subframe boundary) of the subframe can be transmitted. In the present embodiment, such partial subframe is also referred to as "first partial subframe".

(2) In a certain subframe, a region from a first OFDM symbol (subframe boundary) of the subframe to an intermediate OFDM symbol of the subframe can be transmitted. In the present embodiment, such partial subframe is also referred to as "second particle subframe".

(3) In a certain subframe, a region from an intermediate OFDM symbol of th3 subframe to an intermediate OFDM symbol of the subframe can be transmitted. In the present embodiment, such partial subframe is also referred to as "third partial subframe".

Furthermore, intermediate OFDM symbols of the subframe cart be limited to a prescribed number in the partial subframe. For example, the prescribed number is two, three and/or four.

Furthermore, in a case that the prescribed number is two, one slot or one subframe (two slots) can be used. In other words, a time direction unit of second EPDCCHs is one slot or one subframe. In a case that the time direction unit of the second EPDCCH is one slot, a time direction unit of the PDSCH scheduled by the second EPDCCH can be also one slot. In other words, a communication method (scheme) that uses one subframe as a unit as in the LTE of the related art, and a communication method that uses one slot, which is half the LTE of the related art, as a unit are switched and used. The one slot is used as a unit, so that it is possible to reduce latency of radio communication. This configuration enables a communication method that achieves the same communication method as in the LTE in the related art, and also enables the communication method that reduces latency of radio communication. This configuration is also applicable to not only the LAA cell but also the LTE used in the allocated frequency band in the related art. In other words, all methods and constitutions described in the present embodiment are applicable not only to the LAA cells but also to the LTE used in the allocated frequency band in the related art.

For the LAA cell, a period in which the LAA cell can perform transmission in a case that transmission of a channel and/or a signal becomes possible is defined based on LBT. This period is also referred to as a "maximum burst length", and channels and/or signals transmitted in this period are also referred to as "bursts". For example, the maximum burst length is four milliseconds (four subframe lengths). Hence, in each burst, a head subframe of the burst is the first partial subframe, and a last subframe of the burst is the second partial subframe. In this regard, the partial subframe is also referred to as a "floating subframe". Furthermore, the partial subframe may be a subframe including symbols/subframe in which the channels and/or signals described in the present embodiment are not transmitted (cannot be transmitted).

Furthermore, in a certain subframe, a subframe in which a region from the first OFDM symbol (subframe boundary) of the subframe to the last OFDM symbol (subframe boundary) of the subframe can be transmitted is also referred to as "full subframe". The full subframe is a subframe other than the partial subframe. In each burst, the full subframe is a subframe other than the head subframe of the burst or the last subframe of the burst. The full subframe may be a subframe not including symbols/subframe in which the channels and/or signals described in the present embodiment are not transmitted (cannot be transmitted). Furthermore, the full subframe in the LAA cell may be a subframe that has the same structure as the normal subframe in the normal cell and/or performs the same processing as the normal subframe.

Figure 5:
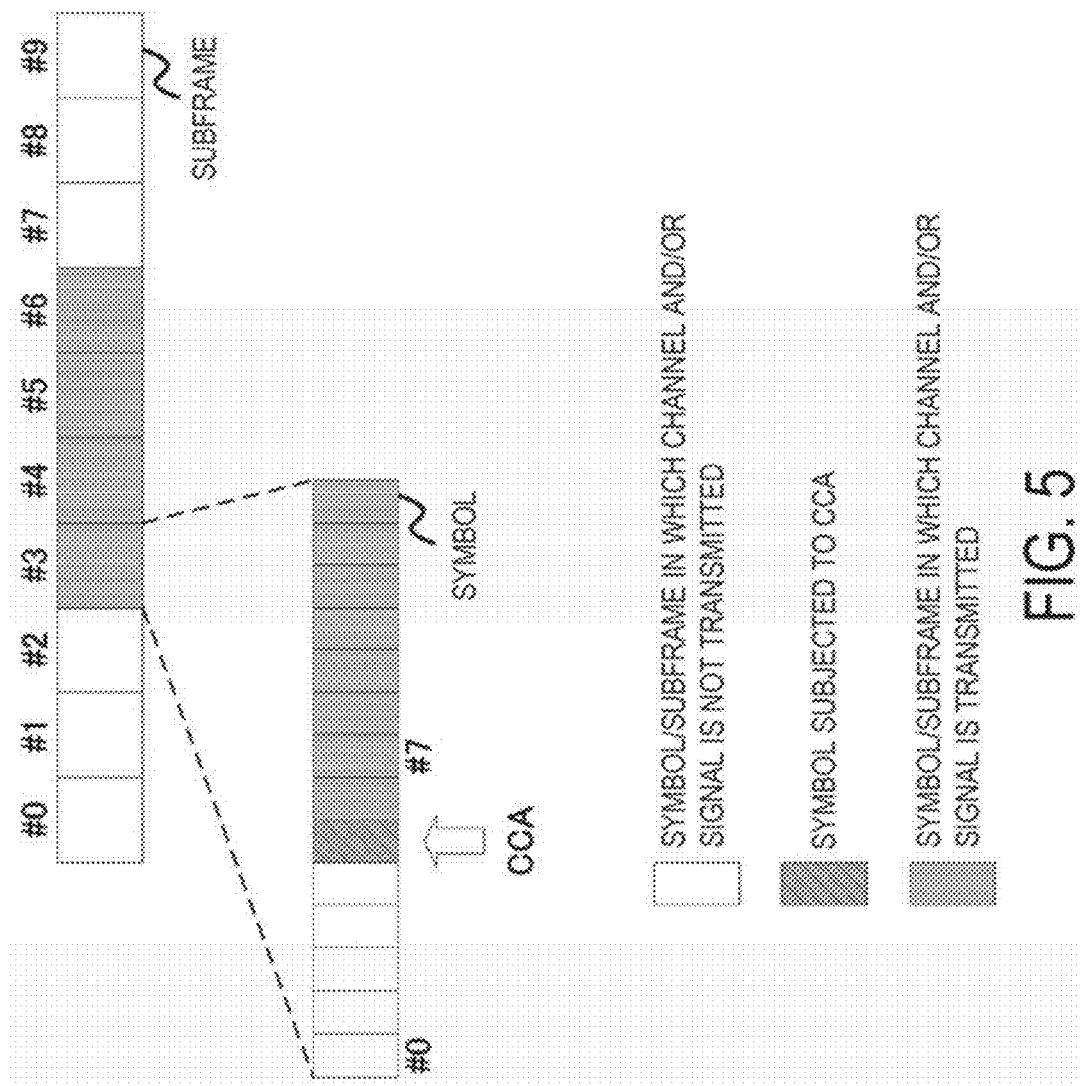
FIG. 5 is a diagram illustrating an example of a communication procedure in an LAA cell according to the present embodiment.

FIG. 5 is a diagram illustrating an example of a communication procedure in a certain LAA cell. FIG. 5 illustrates 10 subframes indicated by subframes #0 to 9, and 14 symbols (OFDM symbols) of symbols #0 to 13 in subframe #3. In this example, the LAA cell can transmit signals of four milliseconds at maximum (corresponding to four subframes), and CCA is performed on symbol #5 in subframe #3. Furthermore, during this CCA, the LAA cell identifies that the frequency is in the idle state, and assumes a case where a signal can be transmitted from a symbol immediately subsequent to the frequency. In FIG. 5, the LAA cell transmits signals by using symbols from symbol #6 in subframe #3 to a prescribed symbol in subframe #6.

FIG. 5 illustrates that the LAA does not transmit anything in symbols or subframes indicated by the symbols/subframes in which the channels and/or signals are not transmitted (cannot be transmitted). Furthermore, FIG. 5 illustrates that, in symbols or subframes indicated by the symbols/subframes in which the channels and/or signals are transmitted (can be transmitted), the LAA transmits at least the PDSCH and the terminal-specific reference signal associated with the PDSCH. Furthermore, the PDSCH is mapped (scheduled) for each terminal by using resource block pair as a unit. Information of such mapping (scheduling) is announced on the PDCCH or the EPDCCH transmitted on each subframe. The mapping information of the PDSCH in a certain subframe may be announced by using the same subframe or may be announced by using separate subframes.

In FIG. 5, in a case that the LAA cell transmits the PDSCH by using symbols #6 to #13 in subframe #3, the terminal that receives the PDSCH needs to recognize that the PDSCH is mapped onto symbols #6 to #13 in subframe #3.

In an example of a method for this recognizing, a prescribed subframe (e.g., subframe #3) of the LAA cell uses information for recognizing symbols in which channels and/or signals are transmitted. For example, this information is one of the following information or a combination of these pieces of information.

(1) This information is information indicating a start symbol of the symbol in which the channel and/or signal is transmitted in the prescribed subframe. The information indicating the start symbol indicates one of 0 to 13, and each value indicates a symbol number for the start symbol.

(2) This information is information indicating a start symbol of the symbol in which the channel and/or signal is transmitted in the prescribed subframe. The information indicating the start symbol is index information obtained by indexing a value defined in advance from the value of 0 to 13.

(3) This information is information of a bitmap indicating the symbol in which the channel and/or signal is transmitted in the prescribed subframe. The information of the bitmap is constituted of 14 bits. The information of the bitmap indicates the symbol in which the channel and/or signal is transmitted in a case that each bit is in one state (e.g., 1), and indicates the symbol in which the channel and/or signal are not transmitted in a case that each bit is in the other state (e.g., 0).

(5) This information is information indicating a last symbol of the symbols in which the channel and/or signal is not transmitted in the prescribed subframe, or is information indicating the number of symbols in which the channel and/or signal are not transmitted. For example, the last symbol is one of 0 to 13, and each value indicates a symbol number for the last symbol. For example, the information indicating the number of symbols is one of 1 to 14, and each value indicates the number of symbols.

(6) This information is information indicating the last symbol of the symbols in which the channel and/or signal is not transmitted in the prescribed subframe, or information indicating the number of symbols in which the channel and/or signal is not transmitted. For example, the last symbol is index information obtained by indexing a value defined in advance from the value of 0 to 13. For example, the information indicating the number of symbols is index information obtained by indexing the value defined in advance from the value of 1 to 14.

Furthermore, as a method for announcing information for recognizing the symbol in which the channel and/or signal is transmitted, the following method is used, for example.

(1) This information is announced as a parameter configured (announced) to the LAA cell via the RRC signaling or the MAC signaling. In a case that a certain serving cell is the LAA cell, in the certain subframe, the channel and/or signal is not transmitted in the configured symbols, and the channel and/or signal is transmitted in other symbols. For example, the symbols in which the channel and/or signal is not transmitted are configured as symbols #0 and 1 in a certain subframe. The symbols in which the channel and/or signal is not transmitted are configured as symbols #2 to 13 in a certain subframe. Furthermore, this configuration may be different (independent) per channel and/or signal. For example, in a certain subframe, the terminal is configured such that the EPDCCHs are mapped onto symbols #2 to 13, and the PDSCHs are mapped onto symbols #1 to 13. Furthermore, for example, a range (available values) of the start symbol of the PDSCH configured to the LAA cell may be different from a range (1 to 4) of the start symbol of the PDSCH, which can be configured to the secondary cells in the related art. The range of the start symbol of the PDSCH and/or the EPDCCH configured to the LAA cell is 0 to 13.

(2) This information is announced by the PDCCH or the EPDCCH transmitted from the corresponding LAA cell or a serving cell (an assist cell, a primary cell or secondary cell(s)) different from the LAA cell. The DCI carried (transmitted) on the PDCCH or the EPDCCH includes this information.

(3) This information is announced via a channel or signal for announcing this information. The channel or signal for announcing this information is transmitted only to the LAA cell. The channel or the signal for announcing this information is transmitted from the corresponding LAA cell or the serving cell (the assist cell, the primary cell or the secondary cell(s)) different from the LAA cell.

(4) Candidates of this information are configured (announced) to the LAA cell via the RRC signaling or the MAC signaling. A candidate is selected from the candidates of this information based on information included in the DCI carried (transmitted) on the PDCCH or the EPDCCH. For example, information indicating four start symbols is configured via the RRC signaling or the MAC signaling, and 2-bit information indicating one of these symbols is announced by PDCCH or EPDCCH signaling.

(5) This information is announced via the channel or signal mapped onto prescribed resource elements of a certain subframe. For example, the prescribed resource elements are multiple resource elements in the prescribed symbol. For example, the prescribed symbol is a last symbol of the subframe. The subframe in which the channel or signal for announcing this information is mapped may be all subframes in the LAA cell or may be a predetermined subframe or a subframe configured by the RRC signaling.

(6) This information is defined in advance. In a case that a certain serving cell is the LAA cell, in the certain subframe, the channel and/or signal is not transmitted in the prescribed symbols, and the channel and/or signal is transmitted in other symbols. For example, the symbols in which the channel and/or signal is not transmitted are symbols #0 and 1 in a certain subframe. The symbols in which the channel and/or signal is not transmitted are symbols #2 to 13 in a certain subframe. Furthermore, this definition may be different (independent) per channel and/or signal. For example, in a certain subframe, the terminal assumes that the EPDCCHs are mapped onto symbols #2 to 13, and the PDSCHs are mapped onto symbols #1 to 13.

In another example of a method for this recognizing, the terminal detects symbols in which the channels and/or signals are transmitted, in a prescribed subframe (e.g., subframe #3) of the LAA cell. Furthermore, the terminal may be configured with assist information for performing the detection. For example, the following methods are used as the detecting method.

(1) This detection is performed based on a prescribed signal mapped onto the prescribed subframe. The terminal detects symbols in which channels and/or signals are transmitted, based on whether a predetermined signal or a configured signal is detected in the prescribed subframe. In a case that the predetermined signal or the configured signal is detected in a certain symbol of the prescribed subframe, the terminal recognizes symbols subsequent to the certain symbol as symbols in which the channels and/or signals are transmitted in the prescribed subframe. For example, the predetermined signal or the configured signal is the CRS, the DMRS and/or the URS.

(2) This detection is performed based on a prescribed channel mapped onto the prescribed subframe. The terminal detects symbols in which channels and/or signals are transmitted, based on whether a predetermined channel or a configured channel is detected in the prescribed subframe. In a case that the predetermined channel or the configured channel is detected in a certain symbol of the prescribed subframe, the terminal recognizes symbols subsequent to the certain symbol as symbols in which the channels and/or signals are transmitted in the prescribed subframe. For example, the predetermined channel or the configured channel is the EPDCCH. More specifically, the terminal assumes that EPDCCHs are mapped onto the symbols subsequent to the certain symbol in the prescribed subframe to monitor (perform detection processing or blind detection of) the EPDCCHs. In this regard, the terminal may perform blind detection on the start symbol onto which the EPDCCH is assumed to be mapped. Furthermore, the start symbol or a start symbol candidate on which the EPDCCH is assumed to be mapped may be defined in advance or configured.

Furthermore, a mapping method for the PDCCH, the EPDCCH and/or the PDSCH onto resource elements in subframe #3 in FIG. 5 may be different from mapping methods for other subframes.

For example, the following methods can be used as the mapping method. Note that the following mapping methods (mapping order) are also applicable to other signals such as reference signals and synchronization signals.

(1) According to the mapping method, the PDCCH, the EPDCCH and/or the PDSCH are mapped from the last symbol in the subframe. In other words, the PDCCH, the EPDCCH and/or the PDSCH are mapped onto resource elements (k, l) which are allocated physical resource blocks. In resource elements available for mapping, OFDM symbols are mapped in order from an OFDM symbol (in other words, a last symbol of a slot) whose OFDM symbol number 1 is maximum. Furthermore, mapping is performed in order from the last slot (second slot) of the subframe. Furthermore, in each OFDM symbol, these channels are mapped in order from a subcarrier whose subcarrier number k is minimum.

(2) According to the mapping method, the PDCCH, the EPDCCH and/or the PDSCH are mapped onto resource elements in symbols in which the channels and/or signals are transmitted by skipping symbols in which the channels and/or signals are not transmitted. In other words, in the mapping of the PDCCH, the EPDCCH and/or the PDSCH, rate matching is performed onto the resource elements of the symbols in which the channels and/or signals are not transmitted.

(3) According to the mapping method, the PDCCH, the EPDCCH and/or the PDSCH are mapped onto resource elements in symbols in which the channels and/or signals are transmitted without skipping symbols in which the channels and/or signals are not transmitted. In other words, the PDCCH, the EPDCCH and/or the PDSCH are mapped without distinguishing between the symbols in which the channels and/or signals are transmitted, and the symbols in which the channels and/or signals are not transmitted. However, channels are not transmitted, the channels being mapped onto the symbols in which the channels and/or signals are not transmitted, whereas channels are transmitted, the channels being mapped onto the symbols in which the channels and/or the signals are transmitted. In other words, in the mapping of the PDCCH, the EPDCCH and/or the PDSCH, puncturing is performed on the resource elements of the symbols in which the channels and/or signals are not transmitted.

Figure 6:
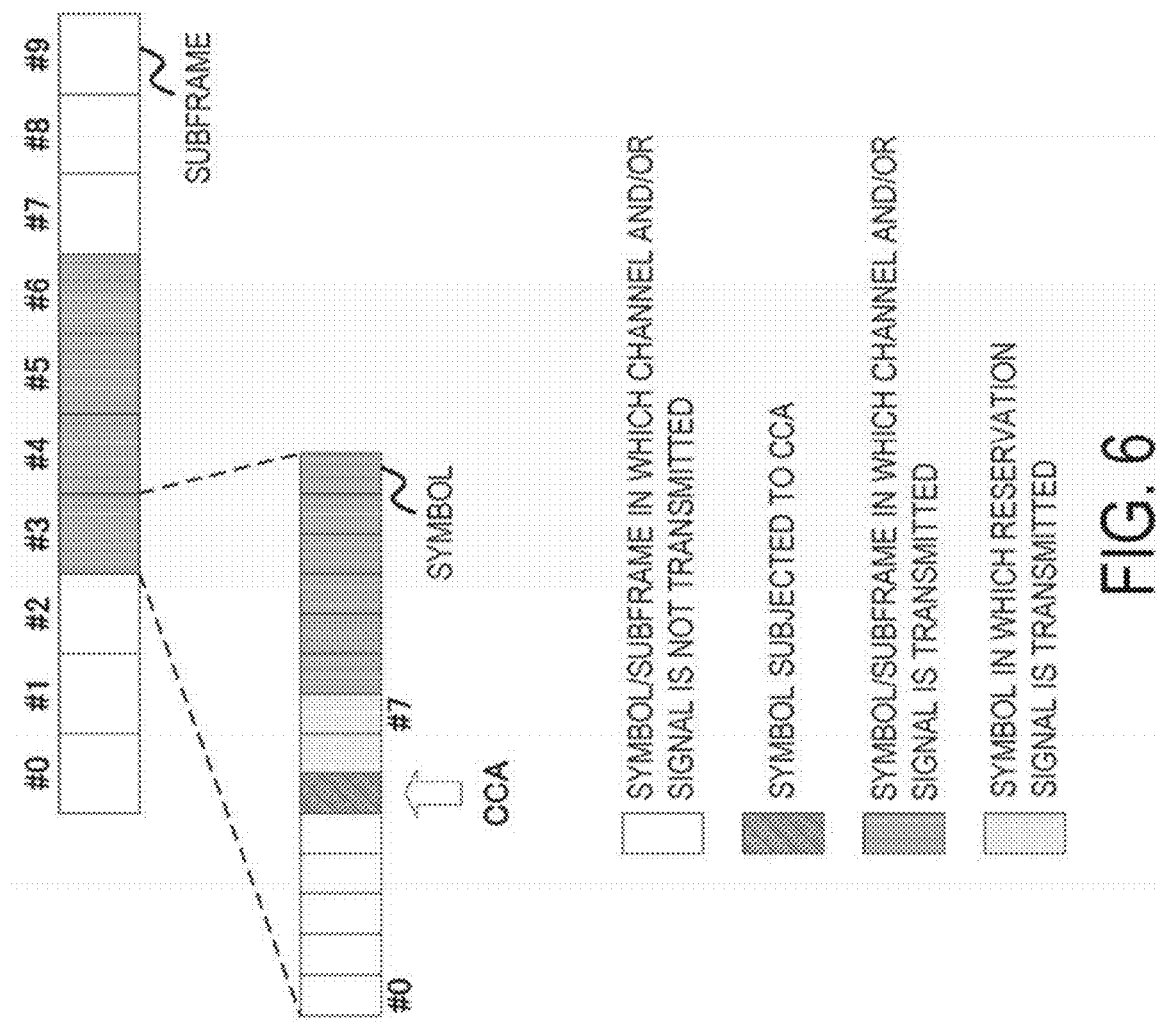
FIG. 6 is a diagram illustrating an example of the communication procedure in the LAA cell according to the present embodiment.

FIG. 6 is a diagram illustrating an example of communication procedure of a certain LAA cell. Differences from the contents described with reference to FIG. 5 will be described below. In this example, CCA is performed on symbol #5 in subframe #3. Furthermore, during this CCA, the LAA cell identifies that the frequency is in the idle state, and assumes a case where a signal can be transmitted from a symbol immediately subsequent to the frequency. The LAA cell transmits signals by using symbols from symbol #5 in subframe #3 to a prescribed symbol in subframe #6.

In the example in FIG. 6, symbols #6 and 7 in subframe #3 are symbols in which reservation signals are transmitted. The reservation signals are transmitted immediately after the symbol (i.e., symbol #5) subjected to CCA to a symbol (i.e., symbol #6) in which the channel and/or signal are transmitted. The reservation signals provide the following effect. As described with reference to FIG. 5, even in a case that candidates of symbols in which the channels acid/or signals are transmitted are defined in advance or configured, the LAA cell can flexibly perform CCA without depending on the number of candidates.

The reservation signals may not be received (recognized) by a terminal that receives the channels and/or signals transmitted from the LAA cell. In other words, in a case that the channel and/or signal cannot be transmitted after CCA is performed, the LAA cell that has performed CCA transmits the reservation signals to secure (reserve) the frequency.

Channels and/or signals different from the channels and/or signals transmitted in the symbols in which the channels and signals are transmitted may be mapped onto symbols in which the reservation signals are transmitted. In other words, the channels and/or signals mapped onto the symbols in which the reservation signals are transmitted are recognized (received) by the terminal. For example, the terminal distinguishes the symbols in which the channels and/or signals are transmitted, based on the channels and/or signals mapped onto the symbols in which the reservation signals are transmitted. Furthermore, for example, the terminal synchronizes (identifies) with the LAA cell by using the channels and/or signals mapped onto the symbols in which the reservation signals are transmitted.

Furthermore, the reservation signal according to the present embodiment will be also referred to as an initial signal. The initial signal is a signal transmitted at a head of burst, and can be distinguished from the PDSCH, the EPDCCH, the PDCCH and/or the reference signal in the burst. Furthermore, the initial signal can include control information of the burst, control information of the channel and/or signal in the burst, or control information of a cell that transmits the burst.

Figure 7:
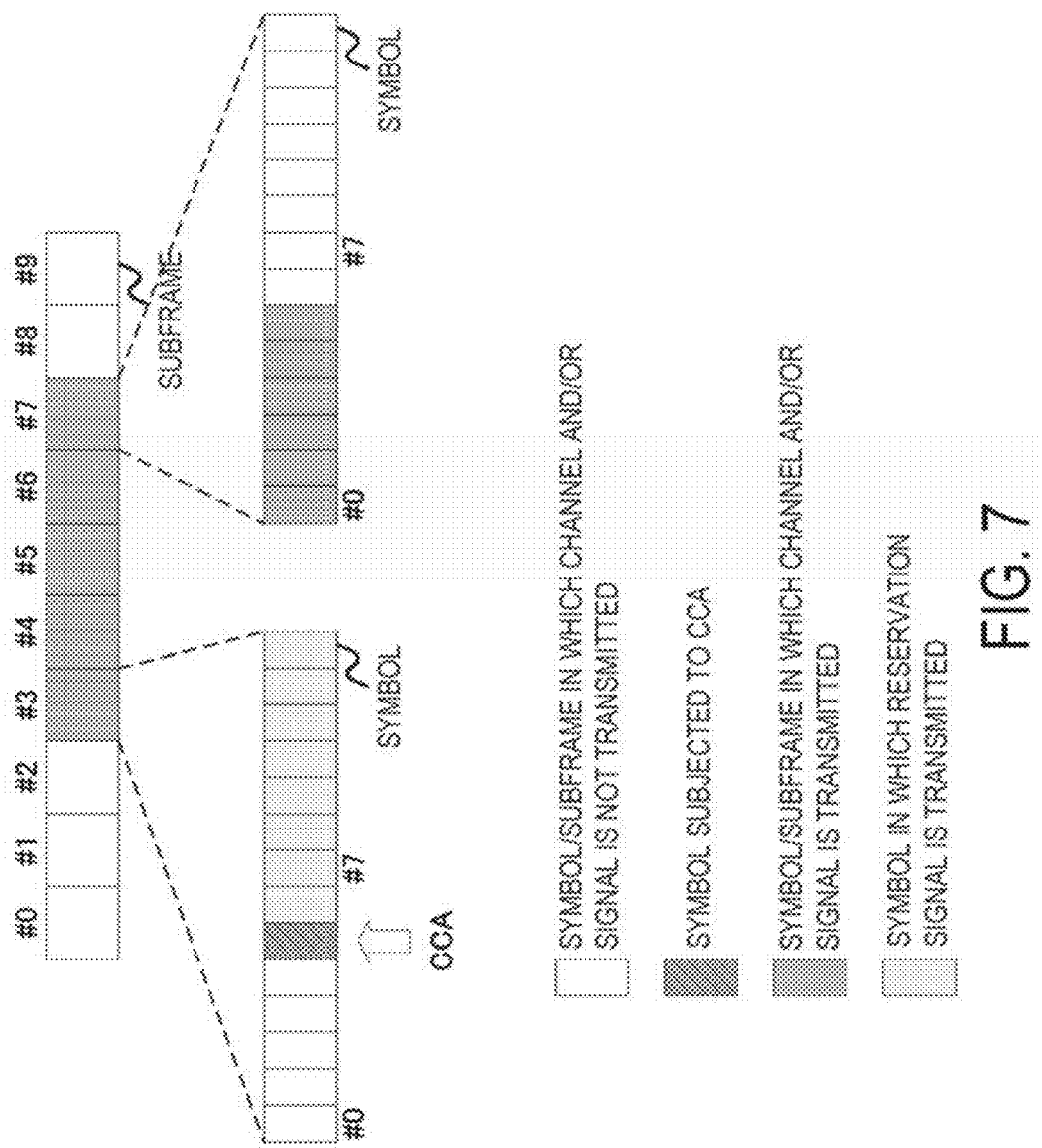
FIG. 7 is a diagram illustrating an example of the communication procedure in the LAA cell according to the present embodiment.

FIG. 7 is a diagram illustrating an example of a communication procedure of a certain LAA cell. Differences from the contents described with reference to FIG. 5 will be described below. Similar to the example in FIG. 5, in this example, CCA is performed on symbol #5 in subframe #3. Furthermore, during this CCA, the LAA cell identifies that the frequency is in the idle state, and assumes a case where a signal can be transmitted from a symbol immediately subsequent to the frequency. In FIG. 7, the LAA cell transmits signals by using symbols from symbol #6 in subframe #3 to symbol #5 in subframe #7 which comes four milliseconds after.

In an example in FIG. 7, the LAA cell transmits the reservation signals from a symbol immediately after the symbol subjected to CCA to the last symbol in a subframe including the symbol subjected to CCA. Furthermore, the LAA cell transmits the channels and/or signals from the subframe next to the subframe including the symbol subjected to CCA. Furthermore, reservation signals in FIG. 7 include the reservation signals described with reference to FIG. 6.

For example, in FIG. 7, the terminal can assume that the channels and/or signals are transmitted in subframes subsequent to subframe #4. Thus, the terminal assumes that the channels and/or signals are transmitted from the first symbol of the subframe. Hence, the base station including the LAA cell can use the same method as the method of the related art for transmission of the channels and/or signals and announce of control information of the channels and/or signals to the terminal.

Further, in FIG. 7, the LAA cell can transmit the channels and/or signals from the first symbol to symbol #5 in subframe #7. For example, the LAA cell can transmit to the terminal the PDSCH and/or the EPDCCH mapped onto resources from a prescribed symbol to symbol #5 in subframe #7. Furthermore, the LAA cell can transmit the PDCCH mapped onto resources from the first symbol to a prescribed symbol in subframe #7. For example, the prescribed symbol is information transmitted on the PCFICH, and is determined based on information of the number of OFDM symbols used to transmit the PDCCH. Furthermore, for example, the prescribed symbol is control information configured by the RRC signaling, and is determined based on information indicating an OFDM start symbol for the EPDCCH, the PDSCH scheduled by the PDCCH, and the PDSCH scheduled by the EPDCCH.

Furthermore, in FIG. 7, the LAA cell can announce or configure the last symbol in which the channel and/or signal is transmitted in subframe #7 to the terminal. As information for the terminal to recognize the last symbol in a certain subframe of the LAA cell, and a method for announcing the information, the method described in the example in FIG. 5 can be used. The method described in the example in FIG. 5 relates to the information for recognizing symbols in which the channels and/or signals in FIG. 5 are transmitted, and the method for announcing the information. For example, the LAA cell includes information of the last symbol in the DCI announced on the PDCCH or EPDCCH transmitted in subframe #7. Consequently, in a case that the LAA cell can transmit the channels and/or signals in symbols up to intermediate symbol of the subframe as in subframe #7 in FIG. 7, the LAA cell can efficiently use resources. Furthermore, for example, the LAA cell includes the information of the last symbol in the information configured by the RRC signaling or the MAC signaling.

Furthermore, the method using the transmission method of subframe and the transmission method of subframe #7 in combination has been described with reference to FIG. 7, but is not limited to this. The transmission method of subframe #3 and the transmission method of subframe #7 may be used independently. Furthermore, part or all of each of methods described with reference to FIGS. 5 to 7 may be used in combination.

Furthermore, a mapping for the PDCCH, the EPDCCH and/or the PDSCH onto resource elements in subframe #7 in FIG. 7 may be different from mapping for other subframes.

Furthermore, the LAA cell may recognize, configure or announce subframes (i.e., the subframes #4 to 6 in FIGS. 5 to 7) in which the channels and/or signals can be transmitted in all OFDM symbols in one subframe as subframes different from subframes (i.e., subframe #3 in FIGS. 5 to 7 and subframe #7 in FIG. 7) in which the channels and/or signals cannot be transmitted in part of OFDM symbols in one subframe. For example, the subframe in which the channels and/or signals can be transmitted in all OFDM symbols in one subframe is same as a subframe in the serving cell in the related art.

In the present embodiment, the subframe in which the channels and/or signals cannot be transmitted in all OFDM symbols in one subframe will be also referred to as "first LAA subframe". The subframe in which the channels and/or signals cannot be transmitted in part of OFDM symbols in one subframe will be also referred to as "second LAA subframe". The subframe in which the channels and/or signals can be transmitted in all OFDM symbols in one subframe will be also referred to as "third LAA subframe". Furthermore, the second LAA subframe will be also referred to as "partial subframe", and the third LAA subframe will be also referred to as "full subframe". In addition, the second LAA subframe include the first partial subframe, the second partial subframe and/or the third partial subframe.

Furthermore, as a method of the terminal for recognizing the first LAA subframe, the second LAA subframe and the third LAA subframe, the method described in the present embodiment can be used. For example, the method for recognizing the subframes uses information for recognizing the symbol in which the channels and/or signals are transmitted, and the method for announcing the information.

Furthermore, the method of the terminal for recognizing the first LAA subframe, the second LAA subframe and the third LAA subframe may be explicitly announced or configured by the PDCCH or RRC signaling.

Furthermore, the method of the terminal for recognizing the first LAA subframe, the second LAA subframe and the third LAA subframe may be implicitly announced or configured based on the information (parameters) announced or configured by the PDCCH or RRC signaling. For example, the terminal recognizes the first LAA subframe, the second LAA subframe and the third LAA subframe based on the information of mapping of the CRS.

Furthermore, in a case that the terminal recognizes a certain subframe as the second LAA subframe, the terminal recognizes a prescribed number of subframes including the subframe next to the certain subframe and subsequent subframe(s) as the third LAA subframes. Furthermore, the terminal recognizes, as the first LAA subframes, a subframe next to the last subframe recognized as the third LAA and subsequent subframe(s), until any of the subframes is recognized as the second LAA subframe. Furthermore, the prescribed number (i.e., the number of subframes recognized as the third LAA subframes) may be defined in advance. The prescribed number may be configured by the LAA cell. The prescribed number may be announced via the channel and/or signal mapped onto the second LAA subframe.

Furthermore, start symbols of the PDSCH and/or EPDCCH are independently defined or configured to the second LAA subframe and the third LAA subframe.

Furthermore, in FIGS. 5 to 7, CCA is performed on one subframe, but a time (period) for performing CCA is not limited to this. The period for performing CCA may vary per LAA cell, per CCA timing, or per execution of CCA. For example, CCA is performed at a time based on a prescribed time slot (a time interval or a time domain). This prescribed time slot may be defined or configured based on a time obtained by dividing one subframe by the prescribed number. The prescribed time slot may be determined or configured by the prescribed number of subframes.

Furthermore, in the present embodiment, a field size in the time domain such as a time (time slot) for performing CCA or a time in which the channel and/or signal are transmitted (can be transmitted) in a certain subframe can be expressed by using a prescribed time unit. For example, the field size in the time domain is expressed by some time units Ts. Ts is 1/(15000×2048) seconds. For example, one subframe time is 30720×Ts (one millisecond).

Furthermore, whether the LAA cell can transmit the channel and/or signal (including the reservation signal) from an intermediate symbol in a certain subframe as in subframe #3 in FIGS. 5 to 7 may be configured to the terminal or the LAA cell. For example, information indicating whether such transmission is possible in the configuration on the LAA cell is configured to the terminal by the RRC signaling. The terminal switches processing associated with reception (monitoring, recognition and decoding) at the LAA cell based on the information.

Furthermore, subframes in which symbols can be transmitted from an intermediate symbol (also including subframes in which symbols up to the intermediate symbol can be transmitted) may be all subframes in LAA cell. Furthermore, subframes in which symbols can be transmitted from the intermediate symbol may be subframes defined in advance for the LAA cell or configured subframes.

Furthermore, subframes in which symbols can be transmitted from the intermediate symbol (also including subframes in which symbols up to the intermediate symbol can be transmitted) can be configured, announced or determined based on an uplink/downlink configuration (UL/DL configuration) according to TDD. For example, such subframes are subframes announced (designated) as special subframes by the UL/DL configuration. Each of the special subframes in the LAA cell is a subframe including at least one of the three fields, a Downlink Pilot Time Slot (DwPTS), a Guard Period (GP), and an Uplink Pilot Time Slot (UpPTS). The configuration on the special subframe in the LAA cell may be configured or announced by the RRC signaling or PDCCH or EPDCCH signaling. This configuration configures a length in time of at least one of the DwPTS, the GP and the UpPTS. Furthermore, this configuration is index information indicating candidates of the predetermined length in time. Furthermore, for this configuration, the same length in time as the DwPTS, the GP and the UpPTS used for the special subframe configuration configured to the TDD cells in the related art can be used. In other words, the length in time in which transmission is possible in a certain subframe is determined based on one of the DwPTS, the GP and the UpPTS.

Further, in the present embodiment, the reservation signal may be a signal that can be received by a LAA cell different from the LAA cell that transmits the reservation signal. For example, the LAA cell different from the LAA cell that transmits the reservation signal is the LAA cell (neighboring LAA cell) neighboring to the LAA cell that transmits the reservation signal. For example, the reservation signal includes information of a transmission state (use state) of a prescribed subframe and/or symbol in the LAA cell. In a case that the LAA cell different from the LAA cell that transmits a certain reservation signal receives the reservation signal, the LAA cell having received the reservation signal recognizes the transmission state of the prescribed subframe and/or symbol, based on the reservation signal, and performs scheduling according to the state.

Furthermore, the LAA cell having received the reservation signal may perform LBT before transmitting a channel and/or signal. This LTB is performed based on the received reservation signal. For example, during this LBT, the channels and/or the signals transmitted (assumed to be transmitted) from the LAA cell having transmitted the reservation signal are taken into consideration, scheduling including resource allocation and MCS selection is performed.

Furthermore, in a case that the LAA cell having received the reservation signal performs scheduling of transmitting the channels and/or signals based on the reservation signal, it is possible to announce information of such scheduling to one or more LAA cells including the LAA cell having transmitted this reservation signal according to a prescribed method. For example, the prescribed method is a method for transmitting the prescribed channel and/or signal including the reservation signal. Furthermore, for example, the prescribed method is a method for performing announcement via a backhaul such as an X2 interface.

Furthermore, according to carrier aggregation and/or dual connectivity, a terminal of the related art can configure up to five serving cells. However, the terminal according to the present embodiment can extend a maximum number of serving cells that can be configured. In other words, the terminal according to the present embodiment can configure more than five serving cells. For example, the terminal according to the present embodiment can configure up to 16 or 32 serving cells. For example, the more than five serving cells configured by the terminal according to the present embodiment include the LAA cell. Furthermore, all of the more than five serving cells configured by the terminal according to the present embodiment may be the LAA cell.

Furthermore, in a case that the more than five serving cells can be configured, a configuration on part of the serving cells may be different from the configuration of the serving cells in the related art (i.e., the secondary cell(s) in the related art). For example, differences of this configuration are as follows. The configurations described below may be used in combination.

(1) To the terminal, up to five serving cells in the related art are configured, and up to 11 or 27 serving cells different from serving cells in the related art are configured. In other words, to the terminal, in addition to a primary cell of the related art, up to four secondary cells of the related art are configured, and up to 11 or 27 secondary cells different from the secondary cells of the related art are configured.

(2) The configuration on the serving cells (secondary cells) different from the serving cells of the related art includes configurations on an LAA cell. For example, to the terminal, in addition to the primary cell in the related art, up to four secondary cells that do not include the configuration on the LAA cell are configured, and up to 11 or 27 secondary cells different from the secondary cells in the related art are configured.

Furthermore, in a case that the more than five serving cells can be configured, the base station (including the LAA cell) and/or the terminal can perform different processing or assumption compared to the case that up to five serving cells are configured. For example, differences of the processing and assumption are as follows. The processing or the assumption described below may be used in combination.

(1) Even in the case that the more than five serving cells are configured, the terminal assumes that the PDCCH, the EPDCCH and/or the PDSCH are simultaneously transmitted (received) from the five serving cells at maximum. Consequently, the terminal can use the same method as the method of the related art, for reception of the PDCCH, the EPDCCH and/or the PDSCH and transmission of HARQ-ACK for the PDSCH.

(2) In the case that the more than five serving cells are configured, a combination (group) of cells for bundling of HARQ-ACKs for the PDSCHs in these serving cells are configured to the terminal. For example, all serving cells, all secondary cells, all LAA cells or all secondary cells different from the secondary cells in the related art include information (configuration) on bundling of HARQ-ACKs between the serving cells. For example, the information of the bundling of HARQ-ACKs between the serving cells is an identifier (an index or an ID) for performing the bundling. For example, the bundling is performed on the HARQ-ACKs over cells having the same identifier to be bundled. This bundling is performed according to a logical AND operation for the target HARQ-ACKs. Furthermore, the maximum number of identifiers to be bundled can be five. Furthermore, the maximum number of identifiers to be bundled can be five including the number of cells that does not perform bundling. In other words, the number of groups to perform bundling over the serving cells can be five at maximum. Consequently, the terminal can use the same method as the method of the related art, for reception of the PDCCH, the EPDCCH and/or the PDSCH and transmission of HARQ-ACK for the PDSCH.

(3) In the case that the more than five serving cells are configured, a combination (group) of cells for multiplexing of HARQ-ACKs for the PDSCHs in these serving cells are configured to the terminal. In the case that the combination (group) of the cells for multiplexing of the HARQ-ACKs for the PDSCHs is configured, the multiplexed HARQ-ACKs are transmitted on the PUCCH or the PUSCH based on the group. The maximum number of serving cells to be multiplexed is defined or configured for each group. The maximum number is defined or configured based on the maximum number of serving cells configured to the terminal. For example, the maximum number is the same as the maximum number of serving cells configured to the terminal, or half the maximum number of serving cells configured to the terminal. Furthermore, the maximum number of PUCCHs to be simultaneously transmitted is defined or configured based on the maximum number of serving cells to be multiplexed in each group and the maximum number of serving cells configured to the terminal.

In other words, the number of configured first serving cells (i.e., the primary cell and/or the secondary cell(s)) is a prescribed number (i.e., five) or less. A total of the configured first serving cells and second serving cell (i.e., LAA cell) exceeds the prescribed number.

Next, terminal capability associated with LAA will be described. The terminal announces (transmits) information (terminal capability) on capability of the terminal to the base station by the RRC signaling, based on a command from the base station. The terminal capability of a certain function (feature) is announced (transmitted) in a case that the function (feature) is supported, and is not announced (transmitted) in a case that the function (feature) is not supported. Furthermore, the terminal capability of the certain function (feature) may be information indicating whether testing and/or mounting this function (feature) has been finished. For example, the terminal capability according to the present embodiment is as follows. The terminal capability described below may be used in combination.

(1) The terminal capability associated with support of the LAA cell, and the terminal capability associated with support of a configuration of more than five serving cells are independently defined. For example, the terminal that supports the LAA cell supports the configuration of the more than five serving cells. In other words, the terminal that does not support the configuration of the more than five serving cells does not support the LAA cell. In this case, the terminal that supports the configuration of the more than five serving cells may or may not support the LAA cell.

(2) The terminal capability associated with support of the LAA cell, and the terminal capability associated with support of a configuration of more than five serving cells are independently defined. For example, the terminal that supports the configuration of the more than five serving cells supports the LAA cell. In other words, the terminal that does not support the LAA cell does not support the configuration of the more than five serving cells. In this case, the terminal that supports the LAA cell may or may not support the configuration of the more than five serving cells.

(3) The terminal capability associated with downlink in the LAA and the terminal capability associated with uplink in the LAA cell are independently defined. For example, the terminal that supports the uplink in the LAA cell supports the downlink in the LAA cell. In other words, the terminal that does not support the downlink in the LAA cell does not support the uplink in the LAA cell. In this case, the terminal that supports the downlink in the LAA cell may or may not support the uplink in the LAA cell.

(4) The terminal capability associated with support of the LAA cell includes support of a transmission mode configured only to the LAA cell.

(5) The terminal capability associated with the downlink according to the configuration of the more than five serving cells, and the terminal capability associated with the uplink according to the configuration of the more than five serving cells serving cells are independently defined. For example, the terminal that supports the uplink according to the configuration of the more than five serving cells supports the downlink according to the configuration of the more than five serving cells. In other words, the terminal that does not support the downlink according to the configuration of the more than five serving cells does not support the uplink according to the configuration of the more than five serving cells. In this case, the terminal that supports the downlink according to the configuration of the more than five serving cells may or may not support the uplink according to the configuration of the more than five serving cells.

(6) Regarding the terminal capability according to the configuration of the more than five serving cells, terminal capability that supports a configuration of 16 downlink serving cells (component carriers) at maximum, and terminal capability that supports a configuration of 32 downlink serving cells at maximum are independently defined. Furthermore, the terminal that supports the configuration of 16 downlink serving cells at maximum supports the configuration of at least one uplink serving cell. The terminal that supports the configuration of 32 downlink serving cells at maximum supports the configuration of at least two uplink serving cells. That is, the terminal that supports the configuration of 16 downlink serving cells at maximum may not support the configuration of two or more uplink serving cells.

(7) The terminal capability associated with the support of the LAA cell is announced based on a frequency (band) used by the LAA cell. In a case that, for example, the terminal announces a supported frequency or a frequency combination, and the announced frequency or frequency combination includes at least one frequency used by the LAA cell, the terminal implicitly announces that this terminal supports the LAA cell. In other words, in a case that the announced frequency or frequency combination does not include the frequency used by the LAA cell at all, the terminal implicitly announces that this terminal does not support the LAA cell.

Next, terminal capability associated with the second EPDCCH will be described. In an example of the terminal capability according to the present embodiment, a field of the terminal capability associated with the second EPDCCH defines whether the terminal can receive the USS of the second EPDCCH and/or the DCI of the CSS. In other words, in a case that the terminal can receive the USS of the second EPDCCH and/or the DCI of the CSS, the terminal announces information indicating supported, by the field of the terminal capability associated with the second EPDCCH. Furthermore, in a case that the terminal cannot receive the USS of the second EPDCCH and/or the DCI of the CSS, the terminal does not announce the field of the terminal capability associated with the second EPDCCH.

Furthermore, in a case that the terminal can receive the USS of the second EPDCCH and/or the DCI of the CSS, the terminal has capability for receiving the DCI in the USS of the first EPDCCH. In other words, in a case that the terminal announces the information indicating supported, by the field of the terminal capability associated with the second EPDCCH, the terminal announces information indicating supported, by the field of the terminal capability associated with the first EPDCCH. Furthermore, in a case that the terminal announces information indicating supported, by the field of the terminal capability associated with the second EPDCCH, the terminal may indicate that the terminal has the capability for receiving the DCI in the USS of the first EPDCCH.

Furthermore, in a case that the terminal can receive the USS of the second EPDCCH and/or the DCI of the CSS, the terminal also has capability (e.g., including the capability described above) associated with the LAA. In other words, in a case that the terminal announces information indicating supported, by the field of the terminal capability associated with the second EPDCCH, the terminal announces information indicating supported, by the field of the terminal capability associated with LAA. Furthermore, in a case that the terminal announces information indicating supported, by the field of the terminal capability associated with the second EPDCCH, the terminal may indicate that the terminal also has the capability associated with the LAA.

Furthermore, the present embodiment has described a case where the LAA cell transmits the PDCCH or the EPDCCH for announcing the DCI for the PDSCH transmitted from this LAA cell (i.e., a case of self scheduling), but is not limited to this. The method described in the present embodiment is applicable also in a case that, for example, a serving cell different from the LAA cell transmits the PDCCH or the EPDCCH for announcing the DCI for the PDSCH transmitted from the LAA cell (i.e., a case of cross carrier scheduling).

Furthermore, in the present embodiment, the information for recognizing the symbols in which the channels and/or signals are transmitted may be based on the symbols in which the channels and/or signals are not transmitted. For example, this information is information indicating the last symbol of the symbols in which the channels and/or signals are not transmitted. Furthermore, the information for recognizing the symbols in which the channels and/or signals are transmitted may be determined based on other information or parameters.

Furthermore, in the present embodiment, the symbols in which the channels and/or signals are transmitted may be independently configured (announced or defined) to the channels and/or signals. In other words, the information for recognizing the symbols in which the channels and/or signals are transmitted, and the announcement method of the information can be independently configured (announced or defined) to the channels and/or signals. For example, the information for recognizing the symbols in which the channels and/or signals are transmitted, and the announcement method of the information may be independently configured (announced or defined) for the PDSCH and the EPDCCH.

Furthermore, in the present embodiment, symbols/subframes in which the channels and/or signals are not transmitted (cannot be transmitted) may be symbols/subframes in which the channels and/or signals are not assumed to be transmitted (be able to be transmitted) from a viewpoint of the terminal. That is, the terminal can regard that the LAA cell does not transmit the channels and/or signals in the symbols/subframes.

Furthermore, in the present embodiment, the symbols/subframes in which the channels and/or signals are transmitted (can be transmitted) may be symbols/subframes in which the channels and/or signals may be assumed to be transmitted from the viewpoint of the terminal. In other words, the terminal can regard that the LAA cell may or may not transmit the channels and/or signals in the symbols/subframes.

Furthermore, in the present embodiment, the symbols/subframes in which the channels and/or signals are transmitted (can be transmitted) may be symbols/subframes in which the channels and/or signals are assumed to be surely transmitted from the viewpoint of the terminal. That is, the terminal can regard that the LAA cell surely transmits the channels and/or signals in the symbols/subframes.

Furthermore, in the present embodiment, the LAA cell may be a serving cell that uses a prescribed frequency band.

Next, an Enhanced Physical Downlink Control CHannel (EPDCCH) will be described. Note that the EPDCCH is transmitted and/or received by using Resource Elements (REs) as in the PDSCH and other physical channels. Each element (an element associated with one subcarrier and one OFDM symbol) of a resource grid of the antenna port P (signals to be transmitted are described as a grid of subcarriers and OFDM symbols per slot) is referred to as an "RE", and is uniquely identified based on k (an index in ascending order in a frequency axis direction, starting from 0) and l (an index in ascending order in a time axis direction, starting from 0), which are an index pair in one slot.

The structures and/or processing of the EPDCCHs may be different from each other in the normal subframe in the normal cell, the partial subframe in the LAA cell and/or the full subframe in the LAA cell. For example, the EPDCCH constituted of a smaller number of OFDM symbols than the number of OFDM symbols of the EPDCCH used in the normal subframe and/or the full subframe is used in the partial subframe. In the present embodiment, the EPDCCH used in the normal subframe is also referred to as "first EPDCCH", and the EPDCCH used in the partial subframe is also referred to as "second EPDCCH". Note that the first EPDCCH and/or the second EPDCCH may be used in the full subframe.

Figure 8:
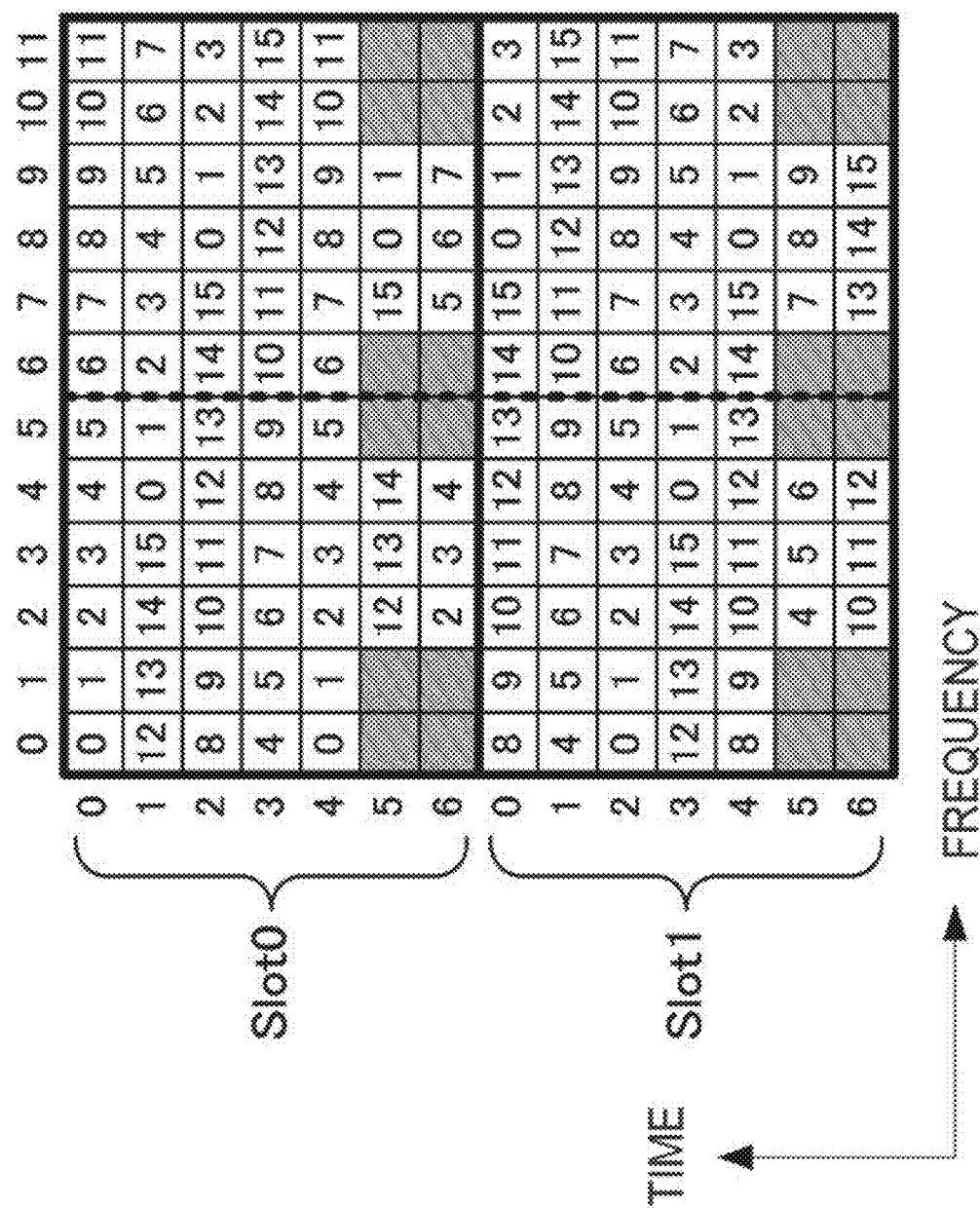
FIG. 8 illustrates an example of an EREG configuration of one RB pair.

FIG. 8 illustrates an example of an EREG configuration of one RB pair. The Enhanced RE Group (EREG) is used to define mapping of the EPDCCH onto the REs. Each resource block pair includes 16 EREGs assigned numbers 0 to 15. In one PRB pair, all REs, except REs for carrying the DMRSs for antenna ports 107 and 108 for enhanced Cyclic Prefixes (CP) for antenna ports 107, 108, 109 and 110 for normal CPs, are cyclically assigned with numbers 0 to 15 in ascending order such that the frequency comes first and the time comes next. In FIG. 8, the diagonally shaded resource elements are used to carry the DMRSs. All REs assigned numbers i in the PRB pair constitute the EREG assigned the number i. In this regard, the CP is a signal added to a front of valid symbol section of downlink OFDM symbol (SC-FDMA symbol in a case of the uplink), and is a signal in which a part of the valid symbol section (generally a last portion) is copied. The CP length include two types of a normal CP with the normal length (e.g., 160 samples or 144 samples for the valid symbol length, 2048 samples), and an enhanced CP longer than the normal CP (e.g., 512 samples or 1024 samples for the valid symbol length, 2048 samples).

Here, the EREG configurations can be identical irrespectively of the first EPDCCH or the second EPDCCH. In other words, the EREGs of the first EPDCCH or the second EPDCCH are defined for all REs except REs which carry the DMRSs for the antenna ports 107 and 108 for the enhanced Cyclic Prefixes (CP), for the antenna ports 107, 108, 109 and 110 for the normal CPs per resource block pair. Thus, even in a case that the DMRS configurations are different from each other, REs for constituting the EREGs are different, but the definitions for constituting the EREGs are the same.

As illustrated in FIG. 8, one RB pair is constituted of two RBs. Each RB is constituted of seven OFDM symbols in the time direction, and resource elements indicated by 12 sub-carriers in the frequency direction. In FIG. 8, the DMRSs are mapped onto the diagonally shaded resource elements. Furthermore, each DMRS is constituted of orthogonal codes of two chips, and up to two DMRSs can be code-division-multiplexed. The DMRSs of the antenna ports 107 and 108 are mapped onto REs of OFDM symbol numbers 5 and 6 in each slot and the subcarrier numbers 0, 5 and 10. The DMRSs of the antenna ports 109 and 110 are mapped onto REs of the OFDM symbol numbers 5 and 6 in each slot and the subcarrier numbers 1, 6 and 11. In this regard, the DMRSs described with reference to FIG. 8 can be used as the DMRSs associated with the first EPDCCHs.

The DMRSs described with reference to FIG. 8 can be used as an example of the DMRSs associated with the second EPDCCHs. In other words, the DMRSs associated with the second EPDCCHs can use the same configuration as the DMRSs associated with the first EPDCCHs. However, in a case that OFDM symbols which cannot be transmitted on the second EPDCCHs include the DMRSs, these DMRSs are not transmitted. For example, the DMRSs associated with the second EPDCCHs in the partial subframe of OFDM symbols #0 to 6 in slot 1 are mapped only onto OFDM symbols #5 and 6 in slot 1, and are not mapped only onto OFDM symbols #5 and 6 in slot 0. Furthermore, in a case that one of the two OFDM symbols onto which the orthogonal codes of the two chips are mapped cannot be transmitted, it is assumed that the DMRSs are not transmitted.

In another example, the DMRSs associated with the second EPDCCHs are determined according to OFDM symbols used to transmit the second EPDCCHs. Specifically, according to the configurations of the OFDM symbols used to transmit the second EPDCCHs, REs onto which the DMRSs associated with the second EPDCCHs are mapped are defined. A prescribed number of patterns of the configurations of the OFDM symbols used to transmit the second EPDCCHs can be defined in advance. In other words, the prescribed number of patterns of the configurations of the DMRSs associated with the second EPDCCHs can be defined in advance likewise.

Figure 9A:
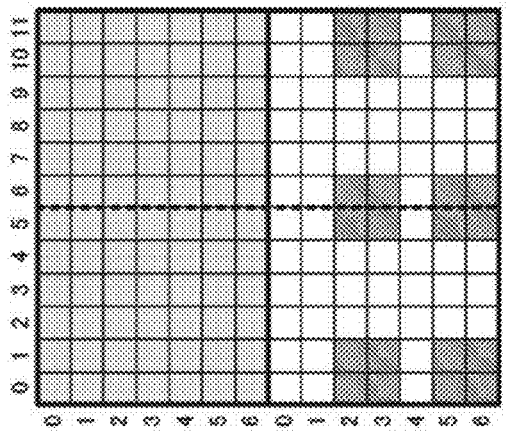
FIG. 9A to FIG. 9E are diagrams illustrating configuration examples of DMRSs associated with second EPDCCHs used in a first partial subframe.
Figure 9C:
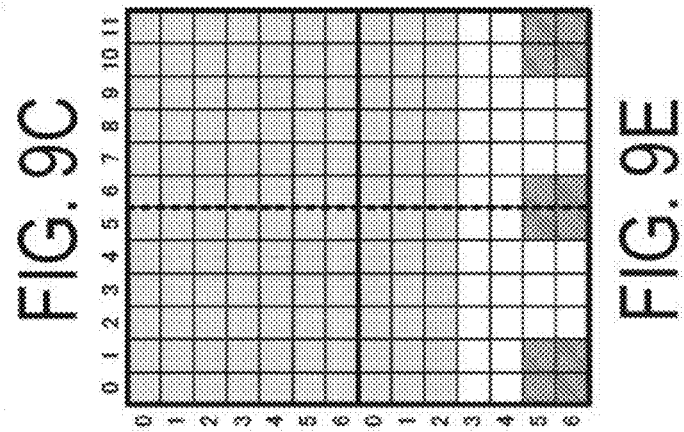
Figure 9B:
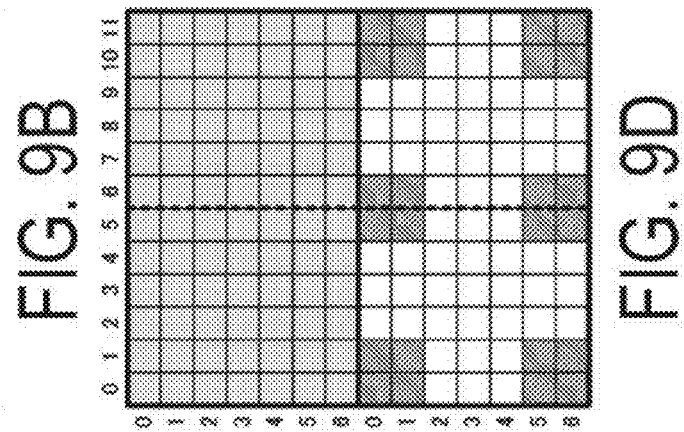
Figure 9E:
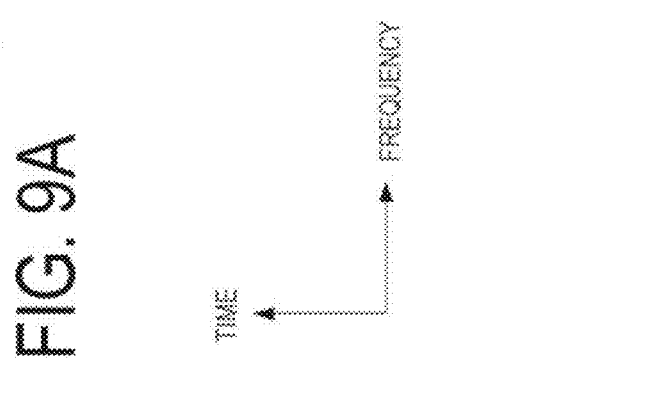
Figure 9D:
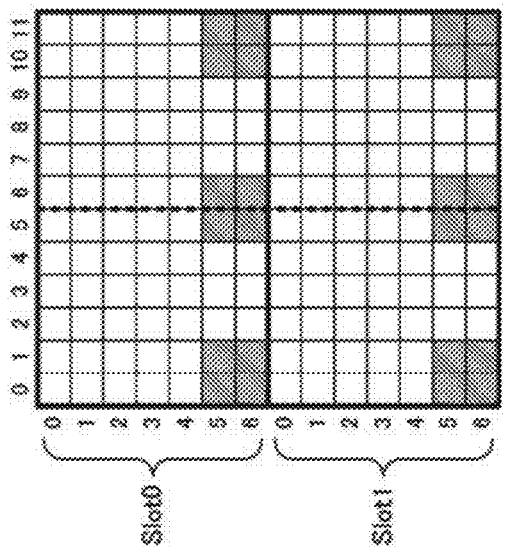

FIG. 9A to FIG. 9E are diagrams illustrating configuration examples of the DMRSs associated with the second EPDCCHs used for the first partial subframe. In FIG. 9A to FIG. 9E, the diagonally shaded REs indicate REs onto which the DMRSs associated with the second EPDCCHs are mapped. The dotted REs indicate REs (OFDM symbols) which are not used to transmit the second EPDCCHs. In other words, in FIG. 9A, OFDM symbol #0 of slot 0 is a start symbol of the second EPDCCH. In FIG. 9B, OFDM symbol #3 of slot 0 is the start symbol of the second EPDCCH. In FIG. 9C, OFDM symbol #0 of slot 1 is the start symbol of the second EPDCCH. In FIG. 9D, OFDM symbol #0 of slot 1 is the start symbol of the second EPDCCH. In FIG. 9E, OFDM symbol #3 of slot 1 is the start symbol of the second EPDCCH. As illustrated in FIG. 9A to FIG. 9E, the configurations of the DMRSs associated with the second EPDCCHs can be defined according to the start symbols of the second EPDCCHs.

FIG. 10A to FIG. 10E are diagrams illustrating configuration examples of the DMRSs associated with the second EPDCCHs used in the second partial subframe. In FIG. 10A to FIG. 10E, the diagonally shaded REs indicate REs onto which the DMRSs associated with the second EPDCCHs are mapped. The dotted REs indicate REs (OFDM symbols) which are not used to transmit the second EPDCCHs. In other words, in FIG. 10A, OFDM symbol #6 of slot 1 is an end symbol of the second EPDCCH. In FIG. 10B, OFDM symbol #3 of slot 1 is the end symbol of the second EPDCCH. In FIG. 10C, OFDM symbol #1 of slot 1 is the end symbol of the second EPDCCH. In FIG. 10D, OFDM symbol #6 of slot 0 is the end symbol of the second EPDCCH. In FIG. 10E, OFDM symbol #4 of slot 0 is the end symbol of the second EPDCCH. As illustrated in FIG. 10A to FIG. 10E, the configurations of the DMRSs associated with the second EPDCCHs can be defined according to the end symbols of the second EPDCCHs. Furthermore, the configurations of the DMRSs associated with the second EPDCCHs used for the second partial subframe may be the same as the configuration of the DMRSs used for the DwPTS.

The EPDCCH carries scheduling allocation. One EPDCCH is transmitted by using an aggregation of one or some contiguous Enhanced Control Channel Elements (ECCEs). In addition, each ECCE is constituted of multiple EREGs. The number of ECCEs used for one EPDCCH depends on a format of the EPDCCH, and the number of EREGs of each ECCE. Both of localized transmission and distributed transmission are supported. One EPDCCH can be transmitted by using one of the localized transmission and the distributed transmission which uses different mapping onto the EREGs of the ECCEs and the PRB pair.

Furthermore, one of the localized transmission and the distributed transmission can be configured per EPDCCH set via the RRC signaling for the first EPDCCH. One of the localized transmission and the distributed transmission can be defined in advance for all EPDCCH sets for the second EPDCCH. For example, the distributed transmission can be defined in advance for all EPDCCH sets of the second EPDCCH.

The terminal device monitors multiple EPDCCHs as described below. Installation of the one or two PRB pairs in which EPDCCH transmission is monitored by the terminal device can be configured. As is configured by the higher layer, only the localized transmission or only the distributed transmission is used for all EPDCCH candidates of an EPDCCH set $X_m$. The ECCEs available for the EPDCCH transmission among the EPDCCH set $X_m$ of the subframe i are assigned number 0 to $N_{ECCE,\,m,\,i}-1$. In this regard, $N_{ECCE,\,m,\,i}$ is the number of ECCEs available for EPDCCH transmission in the EPDCCH set $X_m$ of the subframe i. The ECCE of the number n corresponds to, in a case of localized mapping, an EREG assigned the number (n mod $N^{RB}_{ECCE}$)+ $jN^{RB}_{ECCE}$ in a PRB, an index of which is floor (n/$N^{RB}_{ECCE}$), and corresponds to, in a case of localized mapping, an EREG assigned the number, floor $(n/N^{Xm}_{RB})+jN^{RB}_{ECCE}$ among PRBs, index of which is $(n+j\max(1, N^{Xm}_{RB}/N^{ECCE}_{EREG}))$ mod $N^{Xm}_{RB}$. In this regard, $j=0, 1, \ldots, N^{ECCE}_{EREG}-1$, and $N^{ECCE}_{EREG}$ the number of EREGs per ECCE. Furthermore, $N^{RB}_{ECCE}$ is equal to $16/N^{ECCE}_{EREG}$, and is the number of ECCEs per PRB pair. Furthermore, floor, mod, and max are a floor function, a remainder function (mod function), and a maximum value function (max function), respectively. Not that, the PRB pairs which constitute the EPDCCH sets $X_m$ are assigned numbers in ascending order from 0 to $N^{Xm}_{RB}-1$.

$N^{ECCE}_{EREG}$ of the first EPDCCH is determined based on a CP and a subframe type. More specifically, in a case of a normal CP and a normal subframe (normal downlink subframe) or in a case of the normal CP and a special subframe with special subframe configuration 3, 4 or 8, $N^{ECCE}_{EREG}$ is 4. In a case of the normal CP and a special subframe with special subframe configuration 1, 2, 6, 7 or 9 (i.e., a special subframe in which DwPTS is constituted of six or more and 10 or less OFDM symbols, in a case of an extended CP and the normal subframe, or in a case of the extended CP and a special subframe with special subframe configuration is 1, 3, 5, or 6 (i.e., a special subframe in which DwPTS is constituted of six or more and 10 or less OFDM symbols), $N^{ECCE}_{EREG}$ is 8. Note that details of the special subframe configuration will be described below.

In an example of $N^{ECCE}_{EREG}$ of the second EPDCCH, $N^{ECCE}_{EREG}$ is a value defined in advance. For example $N^{ECCE}_{EREG}$ of the second EPDCCH is the same as a case of the normal CP and a special subframe with special subframe configuration 1, 2, 6, 7 or 9 in the first EPDCCH, and is 8. Furthermore, for example, $N^{ECCE}_{EREG}$ of the second EPDCCH has the same number as the number of EREGs constituted of one resource block pair, and is 16.

In another example of $N^{ECCE}_{EREG}$ of the second EPDCCH, $N^{ECCE}_{EREG}$ is determined depending on $n_{EPDCCH}$ (described below) of the second EPDCCH to be detected (assumed or monitored). Specifically, in a case that $n_{EPDCCH}$ of the second EPDCCH is a prescribed number or more, $N^{ECCE}_{EREG}$ is 4 (or 8). In a case that $n_{EPDCCH}$ is smaller than the prescribed number, $N^{ECCE}_{EREG}$ is 8 (or 16). The prescribed number may be determined in advance, or may be configured in a cell-specific or terminal-specific manner via the RRC signaling. For example, the prescribed number is the same as a prescribed number used for the first EPDCCH, and is 104. Furthermore, for example, the prescribed number may be different from the prescribed number used for the first EPDCCH.

Furthermore, multiple prescribed numbers for $n_{EPDCCH}$ may be defined or configured. More specifically, in a case that $n_{EPDCCH}$ of the second EPDCCH is a first prescribed number, $N^{ECCE}_{EREG}$ is 4. In a case that $n_{EPDCCH}$ is a second prescribed number or more and is smaller than the first prescribed number, $N^{ECCE}_{EREG}$ is 8. In a case that $n_{EPDCCH}$ is smaller than the second prescribed number, $N^{ECCE}_{EREG}$ is 16. For example, the first prescribed number is the same as a prescribed number used for the first EPDCCH, and is 104. The second prescribed number is a value smaller than the first prescribed number.

In another example of $N^{ECCE}_{EREG}$ of the second EPDCCH, $N^{ECCE}_{EREG}$ is determined depending on the number of OFDM symbols of the second EPDCCH to be detected (assumed or monitored). Specifically, in a case that the number of OFDM symbols of the second EPDCCH is the prescribed number or more, $N^{ECCE}_{EREG}$ is 4 (or 8). In a case that the number of OFDM symbols is smaller than the prescribed number, $N^{ECCE}_{EREG}$ is 8 (or 16). The prescribed number may be determined in advance or may be configured in a cell-specific or terminal-specific manner via the RRC signaling.

Furthermore, multiple prescribed numbers of OFDM symbols may be defined or configured. Specifically, in a case that the number of OFDM symbols of the second EPDCCH is a first prescribed number or more, $N^{ECCE}_{EREG}$ is 4. In a case that the number of OFDM symbols is a second prescribed number or more and is smaller than the first prescribed number, $N^{ECCE}_{EREG}$ is 8. In a case that the number of OFDM symbols is smaller than the second prescribed number, $N^{ECCE}_{EREG}$ is 16. For example, the second prescribed number is a value smaller than the first prescribed number.

Similar to the first EPDCCH, another example of $N^{ECCE}_{EREG}$ of the second EPDCCHs is determined based on types of a CP and a subframe. However, $N^{ECCE}_{EREG}$ is a value which is twice as the first EPDCCH. More specifically, in a case of a normal CP and a normal subframe (normal downlink subframe) or in a case of the normal CP and a special subframe with special subframe configuration 3, 4 or 8, $N^{ECCE}_{EREG}$ is 8. In a case of the normal CP and a special subframe with special subframe configuration 1, 2, 6, 7 or 9 (i.e., a special subframe in which DWPTS is constituted of six or more and 10 or less OFDM symbols, in a case of an extended CP and the normal subframe, or in a case of the extended CP and a special subframe with special subframe configuration is 1, 2, 3, 5, or 6 (i.e., a special subframe in which DwPTS is constituted of six or more and 10 or less OFDM symbols) $N^{ECCE}_{EREG}$ is 16.

An association between the EPDCCH format and the number of ECCEs (aggregation level) per EPDCCH can be defined. Furthermore, this association can be defined differently for the first EPDCCH and the second EPDCCH.

Multiple cases of a case A and a case B of the association between the EPDCCH format and the number of ECCEs (aggregation level) per EPDCCH in the first EPDCCH can be defined. The case A is used in a case that conditions associated with the case 1 described below are satisfied. The case B is used in the other cases. The aggregation level in the case A is 2, 4, 8, and 16 in the case of the localized transmission, and is 2, 4, 8, 16, and 32 in the case of the distributed transmission. The aggregation level in the case B is 1, 2, 4, and 8 in the case of the localized transmission, and is 1, 2, 4, 8, and 16 in distributed transmission. In other words, the aggregation level of the case A is higher than the aggregation level of the case B. Thus, even in a ease that the number of REs used for each EREG of the EPDCCH is small, it is possible to obtain prescribed reception performance for the EPDCCH by increasing the aggregation level.

In cells other than the LAA cell, $n_{EPDCCH}$ which is a quantity of a specific terminal device is defined as the number of downlink REs satisfying all or part of following references (a1) to (a4) in one PRB pair configured for EPDCCH transmission of the EPDCCH set $X_0$ (the first EPDCCH set of the two EPDCCH sets).

(a1) Part of one of the 16 EREGs of the PRB pair.

(a2) It is assumed not to be used as the CRS by the terminal device. In this regard, as long as the number of CRS antenna ports and frequency shift parameters take other values, these parameters of the serving cell (the number of antenna ports of the same antenna port configuration as the PBCHs, and the frequency shift obtained based on a physical cell identifier) give a CRS position. In contrast, in a case that re-MappingQCL-ConfigID-r11 which is a higher layer parameter configures a parameter set to the terminal device, this parameter is used to determine the CRS position.

(a3) It is assumed not to be used as the CSIRS by the terminal device. Here, a configuration of the zero power CSIRS in the serving cell (in a case that the configuration for the zero power CSIRS does not take another value), and the configuration of the non-zero power CSIRS give the CSIRS position. On the other hand, in a case that re-MappingQCL-ConfigID-r11 which is the higher layer parameter configures the zero power CSIRS to the terminal device, this parameter is used to determine the CSIRS position.

(a4) It is satisfied that the indices 1 in the first slot in the subframe are $l_{EPDCCHStart}$ or more. In other words, indices 1 are mapped onto REs on the OFDM symbols subsequent to $l_{EPDCCHStart}$ in one subframe. In this regard, 1 represents indices assigned to OFDM symbols in the slot, and is assigned from zero in ascending order in the time direction from the head of OFDM symbol in the slot. $l_{EPDCCHStart}$ will be described below.

In the LAA cells, $n_{EPDCCH}$ which is the quantity for the specific terminal device is defined as the number of downlink REs satisfying all or part of following references (a5) and (a6) in addition to above (a1) to (a4) in one PRB pair configured for EPDCCH transmission of a prescribed EPDCCH set (e.g., the first EPDCCH set of multiple EPDCCH sets). Furthermore, in the LAA cell, $n_{EPDCCH}$ which is the quantity for the specific terminal device may be individually defined in each EPDCCH set. Details will be described below.

(a5) It is assumed not to be used for a Discovery Signal (DS) by the terminal device.

(a6) It is assumed not to be used for Discovery Signal (DS) candidates by the terminal device.

An example of the association between the EPDCCH format and the number of ECCEs (aggregation level) per EPDCCH of the second EPDCCH is the same as that of the first EPDCCH.

As another example of the association between the EPDCCH format and the number of ECCEs (aggregation levels) per EPDCCH of the second EPDCCH, one ease is defined in advance. For example, the case A of the association between the EPDCCH format and the number of ECCEs (aggregation level) per EPDCCH of the second EPDCCH is defined in advance.

Multiple cases of the case A, the case B and the case C of another example of the association between the EPDCCH format and the number of ECCEs (aggregation level) per EPDCCH of the second EPDCCHs can be defined. The aggregation level of the case A and the aggregation level of the case B are the same as that of the first EPDCCH. The aggregation level of the case C can be made higher than the aggregation level of the case A. For example, the aggregation level of the case C is 4, 8, 16 and 32 in the case of the localized transmission, and is 4, 8, 16 and 32 in the case of the distributed transmission.

Furthermore, in an example of $n_{EPDCCH}$ which is the quantity for the specific terminal device, $n_{EPDCCH}$ is independent between the first EPDCCH and the second EPDCCH. In the first EPDCCH, $n_{EPDCCH}$ is defined as the number of downlink REs satisfying all of the above references (a1) to (a4) in one PRB pair configured for EPDCCH transmission of the EPDCCH set $X_0$ (the first EPDCCH set among up to two EPDCCH sets) in the first EPDCCH. Furthermore, in the second EPDCCH, $n_{EPDCCH}$ is defined as the number of downlink REs satisfying all or part of the above references (a1) to (a4) in one PRB pair configured for EPDCCH transmission of the EPDCCH set $X_0$ (the first EPDCCH set of one or more EPDCCH sets) in the second EPDCCH.

Furthermore, in an example of $n_{EPDCCH}$ which is the quantity for the specific terminal device, $n_{EPDCCH}$ is common between the first EPDCCH and the second EPDCCH. Specifically, $n_{EPDCCH}$ of the second EPDCCH is the same as $n_{EPDCCH}$ of the first EPDCCH. That is, in the second EPDCCH, $n_{EPDCCH}$ is defined as the number of downlink REs satisfying all of the above references (a1) to (a4) in one PRB pair configured for EPDCCH transmission of the EPDCCH set $X_0$ (the first EPDCCH set among up to two EPDCCH sets) in the first EPDCCH.

$b(0), \ldots, b(M_{bit}-1)$ which is a block of bits transmitted on one EPDCCH in one subframe is scrambled based on $h(i)=(b(i)+c(i)) \bmod 2$, and serves as a block of bits scrambled as $h(0), \ldots, h(M_{bit}-1)$ as a result. In this regard, $M_{bit}$ is the number of bits transmitted on one EPDCCH, and $c(i)$ is a terminal device-specific scrambling sequence initialized by parameter $c_{init}$. In a scrambling sequence generator, $c_{init} = \text{floor}(n_s/2)2^9 + n^{EPDCCH}_{ID,m}$.

m represents an EPDCCH set number. $n_s$ is a slot number of a slot in a radio frame. $n^{EPDCCH}_{ID,m}$ is a DMRS scrambling initialization parameter which can be configured per EPDCCH set by higher layer signaling, and can take one value of 0 to 503.

$h(0), \ldots, h(M_{bit}-1)$ which is a block of scrambled bits is modulated, and serves as a block of complex value modulation symbol blocks, $d(0), \ldots, d(M_{symb}-1)$, as a result. In this regard, $M_{symb}$ represents the number of modulation symbols transmitted on one EPDCCH. An EPDCCH modulation method is Quadrature Phase Shift Keying (QPSK). The block of the complex value modulation symbols is mapped onto a single layer and precoded based on a relational equation $y(i)=d(i)$. In this regard, $i=0, \ldots M_{symb}-1$ is true, and y represents a precoded modulation symbol.

In cells other than the LAA cell, $y(0), \ldots, y(M_{symb}-1)$ which is the block of complex value symbols is mapped in order from $y(0)$ onto REs (REs at positions determined based on k and l) on associated antenna ports satisfying all of following references (m1) to (m4).

(m1) Part of EREGs allocated for EPDCCH transmission.

(m2) It is assumed not to be used as a CRS by the terminal device. In this regard, as long as the number of CRS antenna ports and frequency shift parameters take other values, these parameters of the serving cell (the number of antenna ports of the same antenna port configuration as the PBCHs, and the frequency shift obtained based on a physical cell identifier) give a CRS position. In contrast, in a case that re-MappingQCL-ConfigID-r11 which is a higher layer parameter configures a parameter set to the terminal device, this parameter is used to determine the CRS position.

(m3) It is assumed not to be used as the CSIRS by the terminal device. Here, a configuration of the zero power CSIRS in the serving cell (in a case that the configuration for the zero power CSIRS does not take another value), and the configuration of the non-zero power CSIRS give the CSIRS position. On the other hand, in a case that re-MappingQCL-ConfigID-r11 which is the higher layer parameter configures the zero power CSIRS to the terminal device, this parameter is used to determine the CSIRS position.

(m4) It is satisfied that the indices 1 in the first slot in the subframe are $I_{EPDCCHStart}$ or more. In other words, indices 1 are mapped onto REs on the OFDM symbols subsequent to $I_{EPDCCHStart}$ in one subframe. In this regard, 1 represents indices assigned to OFDM symbols in the slot, and is assigned from zero in ascending order in the time direction from the head of OFDM symbol in the slot. $I_{EPDCCHStart}$ will be described below.

In the LAA cells, $y(0), \ldots, y(M_{symb}-1)$ which is the block of the complex value symbols is mapped in order from $y(0)$ onto REs (REs at positions determined based on k and l) on associated antenna ports satisfying all or part of following references (m5) and (m6) in addition to above (m1) to (m4). Details will be described below.

(m5) It is assumed not to be used for the discovery signal (DS) by the terminal device.

(m6) It is assumed not to be used for discovery signal (DS) candidates by the terminal device.

As for the mapping onto the REs (the REs at the positions determined based on k and l) satisfying the above references at the antenna port P, the index K is mapped first and then the index 1 is mapped in ascending order (a direction in which k and l increase). This mapping starts from the first slot in the subframe and ends at the second slot.

The antenna port P serves as a logical antenna port. One antenna port may be associated with one physical antenna, and a signal for one antenna port may be actually transmitted from multiple physical antennas. Alternatively, signals for multiple antenna port may be actually transmitted from the same physical antenna. Using the same antenna port achieves the same channel performance. In this regard, antenna ports 0 to 3 are antenna ports associated with (used for) CRS transmission. Antenna port 4 is an antenna port associated with (used for) Multimedia Broadcast multicast service Single Frequency Network (MBSFN) reference signal transmission. Antenna ports 5 and 7 to 14 are antenna ports associated with (used for) terminal device-specific reference signal transmission associated with the PDSCH. Antenna ports 107 to 110 are antenna ports associated with (used for) demodulation reference signal transmission associated with the EPDCCH. Antenna port 6 is an antenna port associated with (used for) positioning reference signal transmission. Antenna ports 15 to 22 are antenna ports associated with (used for) CSIRS transmission.

According to the localized transmission, the single antenna port P to be used is given by n' calculated based on $n'=n_{ECCE,\,low} \bmod N^{RB}_{ECCE}+n_{RNTI} \bmod (N^{EPDCCH}_{ECCE} N^{RB}_{ECCE})$, and following (n1) to (n4). In this regard, $n_{ECCE,\,low}$ is a minimum ECCE index used for this EPDCCH transmission of the EPDCCH set, and $n_{RNTI}$ is equal to Cell-RNTI (C-RNTI) which is one of Radio Network Temporary Identifiers (RNTIs). Furthermore, $N^{EPDCCH}_{ECCE}$ is the number of ECCEs used for this EPDCCH. Furthermore, min represents a maximum value function (max function).

(n1) In a case of the normal CP, and a normal subframe or a special subframe with special subframe configuration 3, 4, or 8, n'=0 is associated with P=107. In a case of the normal CP and a special subframe with special subframe configuration 1, 2, 6, 7, or 9, n'=0 is associated with P=107. In a case of the extended CP, for any subframe type, n'=0 is associated with P=107.

(n2) In a case of the normal CP, and the normal subframe or a special subframe with special subframe configuration 3, 4, or 8, n'=1 is associated with P=108. In a case of the normal CP and a special subframe with special subframe configuration 1, 2, 6, 7, or 9, n'=1 is associated with P=109. In a case of the extended CP, for any subframe type, n'=1 is associated with P=108.

(n3) In a case of the normal CP, and the normal subframe or a special subframe with special subframe configuration 3, 4, or 8, n'=2 is associated with P=110.

(n4) In a case of the normal CP, and the normal subframe or a special subframe with special subframe configuration 3, 4, or 8, n'=3 is associated with P=110.

According to the distributed transmission, each RE of one EREG is associated with one of the two antenna ports in order from the antenna port 107 according to a rule of alternate transmission. In this regard, in the case of the normal CP, the two antenna ports are the antenna port 107 and the antenna port 109. In the case of the extended CP, the two antenna ports are the antenna port 107 and the antenna port 108.

In each serving cell, the base station apparatus can configure one or two EPDCCH-PRB sets (a set of PRB pairs in which EPDCCHs can be arranged and which is also referred to as an EPDCCH set) for EPDCCH monitoring to each UE by the higher layer signaling. In addition, multiple PRB pairs (the number of PRB pairs associated with one EPDCCH-PRB set, and which PRB pair this EPDCCH-PRB set is associated with) associated with one EPDCCH-PRB set are also indicated by the higher layer signaling. Each EPDCCH-PRB set is constituted of a set of ECCEs assigned 0 to $N_{ECCE,\,p,\,k-1}$. In this regard, $N_{ECCE,\,p,\,k-1}$ represents the number of ECCEs in an EPDCCH-PRB set p in the subframe k (a p+1-th EPDCCH-PRB set where p is 0 or 1). One of the localized EPDCCH transmission and the distributed EPDCCH transmission can be configured to each EPDCCH-PRB set. In other words, in a case of the EPDCCH-PRB set to which the localized EPDCCH transmission is configured, one EPDCCH is relatively locally arranged in the frequency direction. In a case of the EPDCCH-PRB set to which the distributed EPDCCH transmission is configured, one EPDCCH is arranged in the frequency direction in a relatively distributed manner.

The EPDCCH set can be independently configured for the first EPDCCH and the second EPDCCH. For example, an EPDCCH set for the first EPDCCH, and an EPDCCH set for the second EPDCCH can be configured by using different parameters.

Furthermore, the EPDCCH set for the first EPDCCH and the EPDCCH set for the second EPDCCH may not be simultaneously configured to the terminal in a certain serving cell. For example, the EPDCCH set for the first EPDCCH is configured to serving cells which use the LTE in the related art. The EPDCCH set for the second EPDCCH is configured to the LAA cells. Furthermore, in a case that, for example, in this serving cell, a method (mode) whose one subframe is the time direction unit is configured to the terminal similar to the LTE in the related art, the EPDCCH set for the first EPDCCH is configured. In a case that a method (mode) whose one slot is the time direction unit, the EPDCCH set for the second EPDCCH is configured.

Furthermore, the EPDCCH set for the first EPDCCH and the EPDCCH set for the second EPDCCH may be simultaneously configured to the terminal in a certain serving cell. For example, the LAA cell monitors the first EPDCCH in partial subframes based on the EPDCCH set for the first EPDCCH, and monitors the second EPDCCH in full subframes based on the EPDCCH set for the second EPDCCH.

An example where the EPDCCH set for the first EPDCCH and the EPDCCH set for the second EPDCCH are configured by using the different parameters relates to the number of configurable PRB pairs associated with one EPDCCH set. For example, the number of configurable PRB pairs associated with one EPDCCH set in the EPDCCH set for the first EPDCCH is 2, 4, or 8. The number of configurable PRB pairs associated with one EPDCCH set in the EPDCCH set for the second EPDCCH is 4, 8 or 16 which is twice as the EPDCCH set for the first EPDCCH. Furthermore, the number of PRB pairs associated with one EPDCCH set may be defined to be determined according a start symbol or an end symbol of the assumed second EPDCCH in the EPDCCH set for the second EPDCCH. For example, as the number of OFDM symbols used to transmit the second EPDCCH becomes smaller, the number of PRB pairs associated with one EPDCCH set is defined to become larger.

An example where the EPDCCH set for the first EPDCCH and the EPDCCH set for the second EPDCCH are configured by the different parameters relates to parameters associated with the partial subframes example, the parameters include the start symbol and/or the end symbol of the second EPDCCH or a parameter indicating the start symbol and/or end symbol candidates.

Furthermore, an example of the start symbol of the second EPDCCH is independently or commonly configured per EPDCCH set via the RRC signaling. For example, one of OFDM symbols #0 to 6 of slot 0 and OFDM symbols #0 to 6 of slot 1 is configured as the start symbol of the second EPDCCH. Furthermore, a prescribed number of OFDM symbols #0 to 6 of slot 0 and OFDM symbols #0 to 6 of slot 1 are defined as candidates in advance for the start symbol of the second EPDCCH, and one of these candidates is configured. Furthermore, for example, one of OFDM symbol #0 of slot 0 and OFDM symbol #0 of slot 1 is configured as the start symbol of the second EPDCCH. Furthermore, for example, the start symbol of the second EPDCCH is determined based on an OFDM symbol from which an initial signal is detected. Specifically, the start symbol of the second EPDCCH is the OFDM symbol from which the initial signal is detected or an OFDM symbol which is a prescribed number of symbols after the OFDM symbol from which the initial signal is detected. Furthermore, the start symbol of the second EPDCCH is an OFDM symbol for which multiple candidates are defined or configured, and an immediate OFDM symbol which is subsequent to the OFDM symbol from which the initial signal is detected.

Furthermore, an example of the end symbol of the second EPDCCH is independently or commonly configured per EPDCCH set via the RRC signaling. For example, one of OFDM symbols #0 to 6 of slot 0 and OFDM symbols #0 to 6 of slot 1 is configured as the end symbol of the second EPDCCH. Furthermore, a prescribed number of OFDM symbols #0 to 6 of slot 0 and OFDM symbols #0 to 6 of slot 1 are defined as candidates in advance for the end symbol of the second EPDCCH, and one of these candidates is configured. Furthermore, for example, one of OFDM symbol #6 of slot 0 and OFDM symbol #6 of slot 1 is configured as the end symbol of the second EPDCCH. Furthermore, for example, the end symbol of the second EPDCCH is determined based on the start symbol of the second EPDCCH of the burst. Furthermore, the end symbol of the second EPDCCH is determined based on the start symbol of the second EPDCCHs of the burst and a maximum length of the burst. Furthermore, for example, the end symbol of the second EPDCCH is determined based on control information included in the initial signal of the burst. Specifically, the control information includes information indicating the end symbol of the second EPDCCH. Furthermore, for example, the end symbol of the second EPDCCH is determined based on the control information included in a prescribed channel and/or signal transmitted in the partial subframe.

The terminal device monitors an EPDCCH candidate set in one or more valid serving cells to configure control information due to the higher layer signaling. In this regard, the monitoring (to monitor) implicitly means to try to decode each EPDCCH of the EPDCCH candidate set according to a DCI format to be monitored. UE-specific Search Space (USS) of the EPDCCH defines the EPDCCH candidate set to be monitored. The USS is a logical region configured specifically to terminal device, and a region used to transmit downlink control information. The monitoring is also referred to as blind detection.

Furthermore, the start symbols of the second EPDCCH and/or the end symbol of the second EPDCCH may be blind-detected (monitored) by a terminal from the multiple OFDM symbol candidates. For example, multiple candidates are defined or configured to the start symbol of the second EPDCCH and/or the end symbol of the second EPDCCH, and the terminal monitors the second EPDCCH assumed to be transmitted based on these candidate OFDM symbols. In other words, each of the second EPDCCH of the second EPDCCH candidate set, the assumed start symbol and/or end symbol may be independent (different) from each other.

Subframes whose EPDCCH USS are monitored by the UE are configured to each serving cell by the higher layer. More specifically, during an active time (a period which is not a non-activation timer activation period during discontinuous reception, a period which is not a non-reception period and a total time in which the terminal device is activated), and in the subframe which is not a subframe requested to perform uplink transmission for FDD half duplex terminal devices, and which is not part of a measurement gap, the higher layer configures the EPDCCH monitoring. In this regard, discontinuous reception is an operation during which the terminal devices do not need to be in active (activated state) (may be deactivated) except in part of a period for battery consumption optimization of the terminal devices. The Frequency Division Duplex (FDD) half duplex terminal devices are terminal devices which do not have a function of performing uplink transmission and downlink reception simultaneously (in the same subframe) in an FDD hand. Furthermore, the measurement gap is a period for stopping transmission and/or reception in the serving cells to measure mobility (handover) (measure reception power of cells other than the serving cells). A measurement gap pattern is configured by the RRC.

The terminal device does not monitor the EPDCCH in the following cases (e1) to (e4).

(e1) A special subframe with special subframe configuration 0 and 5 (a special subframe in which the number of OFDM symbols in the DwPTS is smaller than six) in a case of TDD and the normal downlink CP.

(e2) A special subframe with special subframe configuration 0, 4 and 7 (a special subframe in which the number of OFDM symbols in the DwPTS is smaller than six) in a case of TDD and an extended downlink CP.

(e3) A subframe for which decoding of a Physical Multicast CHannel (PMCH) has been instructed by a higher layer.

(e4) A downlink subframe of the secondary cell, in which TDD and different configurations in the primary cell and the secondary cell(s) are configured, the same subframe in the primary cell being a special subframe, and the terminal device not having capability for performing simultaneous transmission and/or reception in the primary cell and the secondary cell(s).

In this regard, the special subframe is a subframe including three regions in order of a region (DwPTS) for performing downlink transmission in one subframe, a guard period (GP) and a region (UpPTS) for performing uplink transmission. Durations of the DwPTS, the GP and the UpPTS are uniquely determined based on the special subframe configuration and the CP length. The PMCH is a channel for providing Multimedia Broadcast/Multicast Service (MBMS) service, and can be arranged only in MBSFN subframes.

Note that any one of the following 10 configurations is configured as the special subframe configuration.

In special subframe configuration 0, the DwPTS corresponds to 6592 samples in a normal downlink CP, and the UpPTS corresponds to 2192 samples in a normal uplink CP while corresponding to 2560 samples in an extended uplink CP. In contrast, the DwPTS corresponds to 7680 samples in an extended downlink CP, and the UpPTS corresponds to 2192 samples in a normal uplink CP while corresponding to 2560 samples in an extended uplink CP. The DwPTS is constituted of three OFDM symbols, and the UpPTS is constituted of one SC-FDMA symbol.

In special subframe configuration 1, the DwPTS corresponds to 19760 samples in a normal downlink CP, and the UpPTS corresponds to 2192 samples in a normal uplink CP while corresponding to 2560 samples in an extended uplink CP. In contrast, the DwPTS corresponds to 20480 samples in an extended downlink CP, and the UpPTS corresponds to 2192 samples in a normal uplink CP while corresponding to 2560 samples in an extended uplink CP. The DwPTS is constituted of nine OFDM symbols in a case of a normal downlink CP while being constituted of eight OFDM symbols in a case of an extended downlink CP, and the UpPTS is constituted of one SC-TDMA symbol.

In special subframe configuration 2, the DwPTS corresponds to 21952 samples in a normal downlink CP, and the UpPTS corresponds to 2192 samples in a normal uplink CP while corresponding to 2560 samples in an extended uplink CP. In contrast, the DwPTS corresponds to 23040 samples in an extended downlink CP, and the UpPTS corresponds to 2192 samples in a normal uplink CP while corresponding to 2560 samples in an extended uplink CP. The DwPTS is constituted of 10 OFDM symbols in a case of a normal downlink CP while being constituted of nine OFDM symbols in a case of an extended downlink CP, and the UpPTS is constituted of one SC-FDMA symbol.

In special subframe configuration 3, the DwPTS corresponds to 24144 samples in a normal downlink CP, and the UpPTS corresponds to 2192 samples in a normal uplink CP while corresponding to 2560 samples in an extended uplink CP. In contrast, the DwPTS corresponds to 25600 samples in an extended downlink CP, and the UpPTS corresponds to 2192 samples in a normal uplink CP while corresponding to 2560 samples in an extended uplink CP. The DwPTS is constituted of 11 OFDM symbols in a case of a normal downlink CP while being constituted of 10 OFDM symbols in a case of an extended downlink CP, and the UpPTS is constituted of one SC-TDMA symbol.

In special subframe configuration 4, the DwPTS corresponds to 26336 samples in a normal downlink CP, and the UpPTS corresponds to 2192 samples in a normal uplink CP while corresponding to 2560 samples in an extended uplink CP. In contrast, the DwPTS corresponds to 7680 samples in an extended downlink CP, and the UpPTS corresponds to 4384 samples in a normal uplink CP while corresponding to 5120 samples in an extended uplink CP. The DwPTS is constituted of 12 OFDM symbols in a case of a normal downlink CP while being constituted of three OFDM symbols in a case of an extended downlink CP, and the UpPTS is constituted of one SC-TDMA symbol in a case of a normal downlink CP while being constituted of two SC-FDMA symbols in a case of an extended downlink CP.

In special subframe configuration 5, the DwPTS corresponds to 6592 samples in a normal downlink CP, and the UpPTS corresponds to 4384 samples in a normal uplink CP while corresponding to 5120 samples in an extended uplink CP. In contrast, the DwPTS corresponds to 20480 samples in an extended downlink CP, and the UpPTS corresponds to 4384 samples in a normal uplink CP while corresponding to 5120 samples in an extended uplink CP. The DwPTS is constituted of three OFDM symbols in a case of a normal downlink CP while being constituted of eight OFDM symbols in a case of an extended downlink CP, and the UpPTS is constituted of two SC-FDMA symbols.

In special subframe configuration 6, the DwPTS corresponds to 19760 samples in a normal downlink CP, and the UpPTS corresponds to 4384 samples in a normal uplink CP while corresponding to 5120 samples in an extended uplink CP. In contrast, the DwPTS corresponds to 23040 samples in an extended downlink CP, and the UpPTS corresponds to 4384 samples in a normal uplink CP while corresponding to 5120 samples in an extended uplink CP. The DwPTS is constituted of nine OFDM symbols, and the UpPTS is constituted of two SC-FDMA symbols.

In special subframe configuration 7, the DwPTS corresponds to 21952 samples in a normal downlink CP, and the UpPTS corresponds to 4384 samples in a normal uplink CP while corresponding to 5120 samples in an extended uplink CP. In contrast, the DwPTS corresponds to 12800 samples in an extended downlink CP, and the UpPTS corresponds to 4384 samples in a normal uplink CP while corresponding to 5120 samples in an extended uplink CP. The DwPTS is constituted of 10 OFDM symbols in a case of a normal downlink CP while being constituted of five OFDM symbols in a case of an extended downlink CP, and the UpPTS is constituted of two SC-FDMA symbols.

In special subframe configuration 8, the DwPTS corresponds to 24144 samples in a normal downlink CP, and the UpPTS corresponds to 4384 samples in a normal uplink CP while corresponding to 5120 samples in an extended uplink CP. The DwPTS is constituted of 11 OFDM symbols in a case of a normal downlink CP, and the UpPTS is constituted of two SC-TDMA symbols.

In special subframe configuration 9, the DwPTS corresponds to 13168 samples in a normal downlink CP, and the UpPTS corresponds to 4384 samples in a normal uplink CP while corresponding to 5120 samples in an extended uplink CP. The DwPTS is constituted of six OFDM symbols in a case of a normal downlink CP, and the UpPTS is constituted of two SC-FDMA symbols.

Here, in a case that the UpPTS is constituted of one SC-FDMA symbol, the terminal device can transmit a Sounding Reference Signal (SRS), which is a reference signal for uplink sounding, by using the one SC-FRMA symbol in response to a request from the base station device. In a case that the UpPTS is constituted of two SC-FDMA symbols, the terminal device can transmit an SRS by using at least one of the two SC-FRMA symbols in response to a request from the base station device.

Here, in a normal CP, a normal downlink subframe is constituted of 14 OFDM symbols, and a normal uplink subframe is constituted of 14 SC-FDMA symbols. In addition, in an extended CP, a normal downlink subframe is constituted of 12 OFDM symbols, and a normal uplink subframe is constituted of 12 SC-FDMA symbols.

Note that any one of the following seven configurations is configured as the UL/DL configuration.

In UL/DL configuration 0, subframe 0 to subframe 9 in one radio frame (10 subframes) are a downlink subframe, a special subframe, an uplink subframe, an uplink subframe, an uplink subframe, a downlink subframe, a special subframe, an uplink subframe, an uplink subframe, and an uplink subframe in this order. The cycle of a transition point from downlink to uplink corresponds to five subframes (five milliseconds).

In UL/DL configuration 1, subframe 0 to subframe 9 in one radio frame are a downlink subframe, a special subframe, an uplink subframe, an uplink subframe, a downlink subframe, a downlink subframe, a special subframe, an uplink subframe, an uplink subframe, and a downlink subframe in this order. The cycle of a transition point from downlink to uplink corresponds to five subframes.

In UL/DL configuration 2, subframe 0 to subframe 9 in one radio frame are a downlink subframe, a special subframe, an uplink subframe, a downlink subframe, a downlink subframe, a downlink subframe, a special subframe, an uplink subframe, a downlink subframe, and a downlink subframe in this order. The cycle of a transition point from downlink to uplink corresponds to five subframes.

In UL/DL configuration 3, subframe 0 to subframe 9 in one radio frame are a downlink subframe, a special subframe, an uplink subframe, an uplink subframe, an uplink subframe, a downlink subframe, a downlink subframe, a downlink subframe, a downlink subframe, and a downlink subframe in this order. The cycle of a transition point from downlink to uplink corresponds to 10 subframes (10 milliseconds).

In UL/DL configuration 4, subframe 0 to subframe 9 in one radio frame are a downlink subframe, a special subframe, an uplink subframe, an uplink subframe, a downlink subframe, a downlink subframe, a downlink subframe, a downlink subframe, a downlink subframe, and a downlink subframe in this order. The cycle of a transition point from downlink to uplink corresponds to 10 subframes.

In UL/DL configuration 5, subframe 0 to subframe 9 in one radio frame are a downlink subframe, a special subframe, an uplink subframe, a downlink subframe, a downlink subframe, a downlink subframe, a downlink subframe, a downlink subframe, a downlink subframe, and a downlink subframe in this order. The cycle of a transition point from downlink to uplink corresponds to 10 subframes.

In UL/DL configuration 6, subframe 0 to subframe 9 in one radio frame are a downlink subframe, a special subframe, an uplink subframe, an uplink subframe, an uplink subframe, a downlink subframe, a special subframe, an uplink subframe, an uplink subframe, and a downlink subframe in this order. The cycle of a transition point from downlink to uplink corresponds to five subframes.

In this regard, in a case that the UL/DL configuration of at least one serving cell is UL/DL configuration 5, more than two serving cells are not configured.

$ES^{(L)}_k$ which is the USS of the EPDCCH at an aggregation level L is defined by the EPDCCH candidate set. Here, L represents one of 1, 2, 4, 8, 16 and 32. An ECCE associated with an EPDCCH candidate m of a search space $ES^{(L)}_k$ for one EPDCCH-PRB set p is given by $L((Y_{p,k}+\text{floor}(mN_{ECCE,p,k}/(LM^{(L)}_p))+b) \mod (\text{floor}(N_{ECCE,p,k}/L)))+i$. Here, i=0, . . . and L−1. Furthermore, in a case that Carrier Indicator Field (CIF) is configured to serving cell in which EPDCCHs are monitored, b represents a CIF value, and b=0 in other cases. Furthermore, m=0, 1, . . . , and $M^{(L)}_p-1$. In a case that the CIF is not configured to the serving cell in which EPDCCHs are monitored, $M^{(L)}_p$ represents the number of EPDCCHs to be monitored at the aggregation level L in the EPDCCH-PRB set p in the serving cell in which EPDCCHs are monitored. In the other eases, $M^{(L)}_p$ represents the number of EPDCCHs to be monitored at the aggregation level L in the EPDCCH-PRB set p in the serving cell indicated by the CIF value. In this regard, the CIF is a field in the DCI format. The CIF value is used to determine which one of PDSCH transmission, PUCCH transmission and random access procedure of the serving cell the DCI format supports, and takes the same value as a serving cell index associated with one of the primary cell or the secondary cell(s).

In a case that an ECCE associated with a certain EPDCCH candidate is mapped onto a PRB pair which overlaps transmission of one of the PBCH, a primary synchronization signal and a secondary synchronization signal in the frequency domain in the same subframe, the terminal device does not monitor this EPDCCH candidate.

In a case that the same value $n^{EPDCCH}_{ID,i}$ is configured to the two EPDCCH-PRB sets in the terminal device, the terminal receives the EPDCCH candidate of the DCI payload size which is associated with the one EPDCCH-PRB set and which is mapped onto a certain RE set, and the terminal device is configured to monitor the EPDCCH candidates of the same DCI payload size which are associated with the other EPDCCH-PRB set and are mapped onto the same RE set, and in a case that the first ECCE number of the received EPDCCH is used to determined PUCCH resources for HARQ-ACK transmission, the first ECCE number is determined based on the EPDCCH PRB set of p=0. In this regard, $n^{EPDCCH}_{ID,i}$ is a parameter used to initialize pseudo-random sequence generation of a Demodulation Reference Signal (DMRS) associated with the EPDCCHs, and is configured by the higher layer. Note that i takes a value of 0 or 1, and indicates which EPDCCH set the EPDCCHs associated with the DMRSs belong to. That is, i is substantially a synonym of p.

$Y_{p,k}$ is defined by $Y_{p,k}=(A_p Y_{p,k-1}) \mod D$. In this regard, $Y_{p,-1}$, is a value of the RNTI which is an identifier configured to the terminal device in the physical layer. $A_0$ is 39827. $A_1$ is 39829. D is 65537. k=floor($n_s/2$). In other words, each subframe is constituted of two slots. Therefore, k indicates a subframe number in a radio frame.

Furthermore, it is possible to define an association between the number of PRBs included in the EPDCCH-PRB set, the aggregation level and the number of EPDCCH candidates to be monitored. The aggregation level which defines the search space and the number of EPDCCH candidates to be monitored is given as follows. In this regard $N^{X_p}_{RB}$ represents the number of PRB pairs which constitutes the EPDCCH-PRB set p.

In this regard, the aggregation level which defines the search space and the number of EPDCCH candidates to be monitored can be independently defined (1) in a case that only one EPDCCH-PRB for the distributed transmission is configured to the terminal device, (2) in a case that only one EPDCCH-PRB for the localized transmission is configured to the terminal device, (3) in a case that two EPDCCH-PRBs for the distributed transmission are configured to the terminal device, (4) in a case that two EPDCCH-PRBs for the localized transmission are configured to the terminal device, and (5) in a case that one EPDCCH-PRB for the distributed transmission and one EPDCCH-PRB for the localized transmission are configured to the terminal device.

Note that in the present embodiment, p1 represents a symbol for identifying a localized EPDCCH-PRB set, p1 represents a symbol for identifying a localized EPDCCH-PRB set. p2 represents a symbol for identifying a distributed EPDCCH-PRB set. In other words, $N^{X_{p1}}{}_{RB}$ represents the number of PRB pairs which constitute the localized EPDCCH-PRB set. $N^{X_{p2}}{}_{RB}$ represents the number of PRB pairs which constitute the distributed EPDCCH PRB set. Furthermore, $M^{(L)}{}_{p1}$ represents the number of EPDCCHs to be monitored at the aggregation level L in the localized EPDCCH PRB set. $M^{(L)}{}_{p2}$ represents the number of EPDCCHs to be monitored at the aggregation level L in the distributed EPDCCH-PRB set.

Case 1 is applied in a case of following (c1) to (c4), case 2 is applied in a case of following (c5) to (c7) and case 3 is applied in a case of (c8) to the association between the number of PRBs included in the EPDCCH-PRB sets, the aggregation level and the number of EPDCCH candidates to be monitored.

(c1) In a case of a normal subframe and a normal downlink CP, one of DCI formats 2, 2A, 2B, 2C and 2D is monitored, and $M^{DL}{}_{RB}$ is 25 or more. In other words, the number of REs which can be used for EPDCCH transmission in one PRB pair is relatively large, and the payload size of the DCI format is very large.

(c2) In a case of a special subframe with special subframe configuration 3, 4, or 8, and the normal downlink CP (i.e., a special subframe constituted of OFDM symbols including 11 or more DwPTSs), one of DCI formats 2, 2A, 2B, 2C and 2D is monitored, and $M^{DL}{}_{RB}$ is 25 or more. In other words, the number of REs which can be used for EPDCCH transmission in one PRB pair is relatively large, and the payload size of the DCI format is very large.

(c3) In a case of a normal subframe and a normal downlink CP, one of DCI formats 1A, 1B, 1D, 1, 2, 2A, 2B, 2C, 2D, 0 and 4 is monitored, and $n_{EPDCCH}$ is smaller than 104. In other words, the number of REs which can be used for EPDCCH transmission in one PRB pair is relatively very small.

(c4) In a case of the special subframe with special subframe configuration 3, 4, or 8, and the normal downlink CP (i.e., a special subframe constituted of OFDM symbols including 11 or more DwPTSs), one of DCI formats 1A, 1B, 1D, 1, 2, 2A, 2B, 2C, 2D, 0 and 4 is monitored, and $n_{EPDCCH}$ is smaller than 104. In other words, the number of REs which can be used for EPDCCH transmission in one PRB pair is relatively very small.

(c5) In a case of a normal subframe and an extended downlink CP, one of DCI formats 1A, 1B, 1D, 1, 2, 2A, 2B, 2C, 2D, 0 and 4 is monitored. In other words, the number of REs which can be used for EPDCCH transmission in one PRB pair is relatively small.

(c6) In a case of the special subframe with special subframe configuration 1, 2, 6, 7, or 9, and the normal downlink CP (i.e., a special subframe constituted of OFDM symbols including 6 or more and 10 or less DwPTSs), and one of DCI formats 1A, 1B, 1D, 1, 2, 2A, 2B, 2C, 2D, 0 and 4 is monitored. In other words, the number of REs which can be used for EPDCCH transmission in one PRB pair is relatively small.

(c7) In a case of the special subframe with special subframe configuration 1, 2, 3, 5, or 6, and an extended downlink CP (i.e., a special subframe constituted of OFDM symbols including six or more and 10 or less DwPTSs), one of DCI formats 1A, 1B, 1D, 1, 2, 2A, 2B, 2C, 2D, 0 and 4 is monitored. In other words, the number of REs which can be used for EPDCCH transmission in one PRB pair is relatively small.

(c8) None of above (c1) to (c7) applies. In other words, the number of REs which can be used for EPDCCH transmission in one PRB pair is relatively large, and the payload size of the DCI format is not so large.

In this regard, in a case that the CIFs are not configured to the terminal device the serving cells in which EPDCCHs are monitored, $M^{DL}{}_{RB}$ is $N^{DL}{}_{RB}$ of the serving cells in which EPDCCHs are monitored. In a case that the CIFs are configured to the terminal device in the serving cells in which EPDCCHs are monitored, $M^{DL}{}_{RB}$ is $N^{DL}{}_{RB}$ of the serving cells indicated by the CIF values. $N^{DL}{}_{RB}$ represents a downlink bandwidth configuration, and is expressed in a multiple unit of resource block sizes in the frequency direction. In other words, $N^{DL}{}_{RB}$ represents the total number of resource blocks in the frequency direction in downlink component carriers in the serving cells. Furthermore, DCI formats 1A, 1B, 2D and 1 are DCI formats used for a transmission mode which can transmit one transport block by using one PDSCH, and are used for PDSCH transmission methods such as transmission diversity, closed loop spatial multiplexing which uses a single port, a multi-user Multiple Input Multiple Output (MIMO) and single antenna port transmission. Furthermore, DCI formats 2, 2A, 2B, 2C and 2D are DCI formats used for a transmission mode which can transmit up to two transport blocks by using one PDSCH, and are used for PDSCH transmission methods such as closed loop spatial multiplexing, large delay Cyclic Delay Diversity (CDD), two-layer transmission, eight-layer or less transmission, eight-layer or less transmission. Furthermore, DCI formats 2, and 2A are also used for the PDSCH transmission method such as the transmission diversity. And DCI formats 2B, 2C and 2D are also used for the PDSCH transmission method such as the single antenna port. Furthermore, DCI formats 0 and 4 are DCI formats used for a transmission mode which can transmit one and up to two transport blocks by using one PUSCH, and are used for the PDSCH transmission methods such as single antenna port transmission and closed loop spatial multiplexing.

Furthermore, the transmission mode is a mode semi-statically configured to the terminal device to receive PDSCH data transmission signaled via the PDCCH or the EPDCCH via the higher layer signaling. One of following transmission mode 1 to transmission mode 10 is configured to the transmission mode.

Transmission mode 1 uses the single antenna port transmission (transmission using antenna port 0) as the PDSCH transmission method, and uses DCI format 1 or 1A.

Transmission mode 2 uses the transmission diversity as the PDSCH transmission method, and uses DCI format 1 or 1A.

Transmission mode 3 uses the large delay CDD or the transmission diversity as the PDSCH transmission method, and uses DCI format 1 or 2A.

Transmission mode 4 uses the closed loop spatial multiplexing or the transmission diversity as the PDSCH transmission method, and uses DCI format 1 or 2.

Transmission mode 5 uses the multi-user MIMO or the transmission diversity as the PDSCH transmission method, and uses DCI format 1 or 1D.

Transmission mode 6 uses the closed loop spatial multiplexing which uses a single port or the transmission diversity as the PDSCH transmission method, and uses DCI format 1 or 1B.

Transmission mode 7 uses the single antenna port transmission (transmission using antenna port 5), the transmission diversity or the single antenna port transmission (transmission using antenna port 0) as the PDSCH transmission method, and uses DCI format 1 or 1.

Transmission mode 8 uses the two-layer transmission (the transmission using antenna port 7 and antenna port 8), the transmission diversity or the single antenna port transmission (transmission using antenna port 0) as the PDSCH transmission method, and uses DCI format 1 or 2B.

Transmission mode 9 uses one of the eight-layer or less transmission (transmission using antenna port 7 to antenna port 14), the transmission diversity and the single antenna port transmission (transmission using antenna port 0) (in this regard, the single antenna port transmission using antenna port 7 in a case of MBSFN subframes) as the PDSCH transmission method, and uses DCI format 1 or 2C.

Transmission mode 10 uses one of the eight-layer or less transmission (transmission using antenna port 7 to antenna port 14), the transmission diversity and the single antenna port transmission (transmission using antenna port 0) (in this regard, the single antenna port transmission using antenna port 7 in a case of MBSFN subframes) as the PDSCH transmission method, and uses DCI format 1 or 2C.

Note that the other transmission modes (e.g., transmission mode 11 defined in the same way as the transmission modes 9 and 10) may be used. For example, transmission mode 11 uses a DCI format used in the LAA cell. Transmission mode 11 uses a processing method, a coding method, a transmission method and/or a reception method of the LAA cell described in the present embodiment.

In a case that the CIF is not configured to the terminal device, the terminal device monitors the USS of one EPDCCH at each aggregation level given by correspondence tables in FIGS. X1 to X10 in each activated serving cell configured to monitor the EPDCCH. In a case that the terminal device is configured to monitor the EPDCCH and the CIF is configured to the terminal device, as is configured by the higher layer signaling, the terminal device monitors the USSs of one or more EPDCCHs at each aggregation level given by the correspondence tables in FIGS. 1X to X10 in the one or more activated serving cells. The terminal device to which the CIF associated with monitoring of the EPDCCH in a serving cell c is configured, monitors the EPDCCH to which CIF is configured and the CRC scrambled by the C-RNTI is added, in the USS of the EPDCCH of the serving cell c. The terminal device to which the CIF associated with monitoring of the EPDCCH in a primary cell is configured, monitors the EPDCCH to which CIF is configured and the CRC scrambled with the Semi Persistent Scheduling-RNTI (SPS-RNTI) is added, in the USS of the EPDCCH of the primary cell. In this regard, the C-RNTI is RNTI used for EPDCCH transmission associated with dynamic PDSCH transmission or PUSCH transmission. The SPS-RNTI is RNTI used for EPDCCH transmission associated with semi-static PDSCH transmission or PUSCH transmission.

In a case that the CIF is not configured to the terminal device in the serving cell in which the EPDCCH is monitored, the terminal device monitors the USS of the EPDCCH for the EPDCCH which do not include the CIF. In a case that the CIF is configured to the terminal device, the terminal device monitors the USS of the EPDCCH for the EPDCCH including the CIF. In other words, whether to decode the EPDCCH assuming that the EPDCCH include the CIF or decode the EPDCCH assuming that the EPDCCH do not include the CIF is determined according to whether the CIF are configured. In a case that the terminal device is configured to monitor the EPDCCH including the CIF associated with the secondary cell(s) in the other serving cells, the terminal device does not monitor the EPDCCH in the secondary cell(s). In the serving cell in which the EPDCCH is monitored, the terminal device monitors the EPDCCH candidate for at least the same serving cell.

The terminal device configured to monitor the EPDCCH candidates which have a certain DCI format size including the CIF and to which CRC scrambled by the C-RNTI are added on a certain serving cell assumes that the EPDCCH candidates of the DCI format size may be transmitted on the serving cell in the USSs of all EPDCCHs associated with all values which the CIF can take in the DCI format size.

In a case that a transmission occasion of a positioning reference signal is configured only in MBSFN subframes for the serving cells in which the EPDCCH is monitored, and a CP length used by subframe 0 is a normal CP, the terminal device is not requested to monitor the EPDCCH in the subframe configured by the higher layer as part of the transmission occasion of the positioning reference signal.

While monitoring the EPDCCH candidates associated with one of antenna port 107 and 108, the terminal device assumes that a value of same $c_{init}$ is used for antenna ports 107 and 108. While monitoring the EPDCCH candidates associated with one of antenna ports 109 and 110, the terminal device assumes that the value of same $c_{init}$ is used for antenna ports 109 and 110.

In a case that the terminal device is configured to receive PDSCH data transmission associated with transmission modes 1 to 9 by the higher layer signaling in a certain serving cell, the terminal device follows (s1) and (s2) below.

(s1) In a case that epdcch-StartSymbol-r11 which is a higher layer parameter is configured to the terminal device, a start OFDM symbol which is given by $I_{EPDCCHStart}$ which is an index in the first slot in one subframe and is used for the EPDCCHs (a first OFDM symbol onto which EPDCCH in one subframe is mapped and is also referred to as an EPDCCH start position) is determined based on this higher layer parameter. In this regard, epdcch-StartSymbol-r11 which is the higher layer parameter is a parameter which can be individually configured per EPDCCH set, and is a parameter for indicating the start OFDM symbol of the EPDCCH (information indicating the start OFDM symbol). epdcch-StartSymbol-r11 which is the higher layer parameter is configured by using an RRC message.

(s2) In the other cases, the start OFDM symbol which is given by $I_{EPDCCHStart}$ which is the index in the first slot in one subframe and is used for the EPDCCH is given by a Control Format Indicator (CFI) value in the subframe of the serving cell in a case that $N^{DL}_{RB}$ is larger than 10, and is given by adding 1 to the CFI value in this subframe of the serving cell in a case that $N^{DL}_{RB}$ is 10 or less. In this regard, the CFI represents the parameter which takes one of 1, 2 and 3 as a value, and is control information transmitted and/or received via the Physical. CFI CHannel (PCFICH). The CFI is information of the number of OFDM symbols used to transmit the PDCCHs in one subframe.

In a case that the terminal device is configured to receive PDSCH data transmission associated with transmission mode 10 via the higher layer signaling in a certain serving cell, the start OFDM symbol for EPDCCH monitoring in the subframe k for each EPDCCH PRB set follows pdsch-Start-r11 which is a higher layer parameter as in following (s3) to (s6). In this regard, pdsch-Start-r11 which is the higher layer parameter is a parameter which can be individually configured for four types of parameter set for the PDSCHs, and is a parameter for indicating the start OFDM symbol of the PDSCHs (information indicating the start OFDM symbol). pdsch-Start-r11 which is the higher layer parameter is configured by using the RRC message.

(s3) In a case that the value of pdsch-Start-r11 belongs to a set of one, two, three or four (the value is one of 1, 2, 3 and 4), l'$_{EPDCCHStart}$ is given by pdsch-Start-r11.

(s4) In the other cases (a case that the value of pdsch-Start-r11 does not belong to the set of 1, 2, 3 and 4), l'$_{EPDCCHStart}$ is given by the CFI value in the subframe k of the serving cell in a case that $N^{DL}_{RB}$ is larger than 10, and l'$_{EPDCCHStart}$ is given by adding 1 to the CFI value in the subframe k of this serving cell in a case that $N^{DL}_{RB}$ is 10 or less.

(s5) In a case that the subframe k is a subframe indicated by mbsfn-SubframeConfigList-r11 which is the higher layer parameter or the subframe k is the subframe 1 or 6 in a TDD subframe configuration, l$_{EPDCCHStart}$ is given by l$_{EPDCCHStart}$=min(2, l'$_{EPDCCHStart}$).

(s6) In the other cases (a case that the subframe k is not a subframe indicated by mbsfn-SubframeConfigList-r11 which is the higher layer parameter or the subframe k is not the subframe 1 or 6 in the TDD subframe configuration), l$_{EPDCCEStart}$ is given by l$_{EPDCCHStart}$=l'$_{EPDCCHStart}$.

In a case that the terminal device is configured to receive PDSCH data transmission associated with transmission modes 1 to 9 by the higher layer signaling in a certain serving cell, and is configured to monitor the EPDCCH, the terminal assumes that antenna ports 0 to 3 and 107 to 110 in serving cell are pseudo-collocated relative to Doppler shift, Doppler spread, average delay and delay spread (receives the data transmission assuming the transmission from the same transmission point or assuming that the data is not transmitted from different transmission points).

In a case that the terminal device is configured to receive PDSCH data transmission associated with transmission mode 10 via the higher layer signaling in a certain serving cell, and is configured to monitor the EPDCCH, following (q1) and (q1) are applied to each EPDCCH-PRB set.

(q1) In a case that the terminal device is configured to decode the PDSCH based on pseudo collocation type A by the higher layer, the terminal device assumes that antenna ports 0 to 3 and 107 to 110 in the serving cell are pseudo-collocated relative to Doppler shift, Doppler spread, average delay and delay spread.

(q2) In a case that the terminal device is configured to decode the PDSCH based on pseudo collocation type B by the higher layer, the terminal device assumes that antenna ports 15 to 22 associated with qcl-CSI-RS-ConfigNZPId-r11 which is the higher layer parameter, and antenna ports 107 to 110 are pseudo-collocated relative to Doppler shift, Doppler spread, average delay and delay spread. In this regard, qcl-CSI-RS-ConfigNZPId-r11, which is a higher layer parameter, is a parameter to be individually configured to four types of parameter sets for PDSCH, and is a parameter for indicating the PDSCH pseudo collocation (information indicating which CSIRS a terminal-specific reference signal associated with the PDSCH is pseudo-collocated with). qel-CSI-RS-ConfigNZPId-r11 which is the higher layer parameter is configured by using the RRC message. In this regard, pseudo collocation type A and pseudo collocation type B are parameters one of which is configured to the terminal device to which transmission mode 10 is configured per serving cell. Type A indicates that antenna ports 7 to 14 are pseudo-collocated with CRS antenna ports 0 to 3 of the serving cell. Type B indicates that antenna ports 7 to 14 are pseudo-collocated with one of CSIRS antenna ports 15 to 22. In other words, in the case that type B is configured, the CSIRS is not necessarily transmitted from the base station device associated with this serving cell, and may be transmitted from another base station device. In this case, the EPDCCH and the PDSCH pseudo-collocated with the CSIRS are generally transmitted from the same transmission point (e.g., a protruding antenna device or another base station device at a remote place connected to the base station device via a backhaul) as the CSIRS.

In a case that the terminal device is configured to receive PDSCH data transmission associated with transmission mode 10 via the higher layer signaling in a certain serving cell, and is configured to monitor the EPDCCH, the terminal device uses the parameter indicated by MappingQCL-ConfigId-r11 which is the higher layer parameter to determine EPDCCH mapping onto REs and antenna port pseudo collocation for each EPDCCH-PRB set. A parameter set includes following parameters (Q1) and (Q6) for determining the EPDCCH mapping onto the REs and the antenna port pseudo collocation.

(Q1) crs-PortsCount-r11. crs-PortsCount-r11 is a parameter indicating the number of CRS ports used to map the PDSCH or the EPDCCH onto the REs.

(Q2) crs-FreqShift-r11. crs-FreqShift-r11 is a parameter indicating a frequency shift of the CRS used to map the PDSCH or the EPDCCH onto the REs.

(Q3) mbsdn-SubframeConfigList-r11, mbsdn-SubframeConfigList-r11 is a parameter indicating a position of the MBSFN subframe used to map the PDSCH and the EPDCCH onto the REs. In subframes configured as the MBSFN subframes by this parameter, it is assumed that there are the CRS only in the OFDM symbols in which the PDCCH can be arranged (there are no CRS in the OFDM symbols in which the PDCCH is not arranged), and the PDSCH and the EPDCCH are mapped.

(Q4) csi-RS-ConfigZPId-r11. csi-RS-ConfigZPId-r11 is a parameter indicating a position of the zero power. CSIRS used to map the PDSCH and the EPDCCH onto the REs.

(Q5) pdsch-Start-r11. pdsch-Start-r11 is a parameter indicating a start OFDM symbol used to map the PDSCH and the EPDCCH onto the REs.

(Q6) qcl-CSI-RS-ConfigNZPId-r11. qcl-CSI-RS-ConfigNZPId-r11 is a parameter indicating which CSIRS a reference signal for demodulating the PDSCH and the EPDCCH is collocated with. This parameter can indicate one of IDs of one or more configured CRIRSs. The reference signal for demodulating the PDSCH and the EPDCCH is pseudo-collocated with the CSIRS whose ID is indicated.

Next, the PDSCH scheduled by the second EPDCCH will be described. An example of the PDSCH scheduled by the second EPDCCH is only PDSCH mapped onto subframes in which the second EPDCCH is detected (mapped).

Another example of the PDSCH scheduled by the second EPDCCH includes PDSCH mapped onto one of subframes in a burst including subframes from which the second EPDCCH are detected (mapped). Information (configuration) on the subframes onto which the PDSCH is mapped may be configured by the RRC or may be announced via the DCI transmitted in the second EPDCCH. Furthermore, the PDSCH scheduled by the second EPDCCH may be one subframe or multiple subframes.

Next, a start symbol and/or an end symbol of a PDSCH in a case that the PDSCH scheduled by the second EPDCCH is mapped onto a partial subframe will be described. For example, the start symbol and/or the end symbol of the PDSCH are determined based on control information included in the DCI of the second EPDCCH to be scheduled. Furthermore, for example, the start symbol and/or the end symbol of the PDSCH are determined based on the start symbol and/or the end symbol of the second EPDCCH to be scheduled. Furthermore, for example, the start symbol and/or the end symbol of the PDSCH are the same as the start symbol and/or the end symbol of the second EPDCCH to be scheduled. Furthermore, for example, the start symbol and/or the end symbol of the PDSCH are OFDM symbols calculated from the start symbol and/or the end symbol of the second EPDCCH to be scheduled. Furthermore, for example, the start symbol and/or the end symbol of the PDSCH are configured by the RRC signaling independently from the start symbol and/or the end symbol of the second EPDCCH to be scheduled. Furthermore, for example, the start symbol and/or the end symbol of the PDSCH are determined based on control information included in a physical channel or a physical signal mapped onto the subframe. Furthermore, a determination method or an announcement method of the start symbol and/or the end symbol of the PDSCH may be different from each other.

Furthermore, a configuration on the subframes in which first EPDCCH of the first EPDCCH set is monitored, and a configuration on subframes in which second EPDCCH of the second EPDCCH set is monitored may be different from each other. For example, the subframes in which the first EPDCCH is monitored are commonly configured in all first EPDCCH sets, and whether each subframe is monitored is configured by information in a bitmap format. An example of the configuration on the subframe in which the second EPDCCH is monitored is the same as the configuration on the subframes in which the first EPDCCH is monitored, but is independently configured. In another example of the configuration on the subframes in which the second EPDCCH is monitored, the terminal monitors the second EPDCCHs in subframes in which burst (downlink burst transmission) in the LAA cell is detected.

Part of the above-described embodiment can be rephrased as follows.

A terminal device in the present embodiment includes: a higher layer processing unit configured to configure a first EPDCCH set for monitoring a first EPDCCH, in a first serving cell, and a second EPDCCH set for monitoring a second EPDCCH, in a second serving cell; and a reception unit configured to monitor the first EPDCCH and the second EPDCCH. The start symbol of the first EPDCCH and the start symbol of the second EPDCCH in a certain subframe are determined independently.

The base station device according to the present embodiment includes: a higher layer processing unit configured to configure, for a terminal device, a first EPDCCH set for monitoring a first EPDCCH, in a first serving cell, and a second EPDCCH set for monitoring a second EPDCCH, in a second serving cell; and a transmission unit configured to transmit the first EPDCCH and the second EPDCCH. The start symbol of the first EPDCCH and the start symbol of the second EPDCCH in a certain subframe are determined independently.

The maximum value that can be configured to the start symbol of the second EPDCCH is larger than the maximum value that can be configured to the start symbol of the first EPDCCH. For example, a value that can be configured to the start symbol of the first EPDCCH is 1, 2, 3, or 4. Values that can be configured to the start symbol of the second EPDCCH include values different from the values that can be configured to the start symbol of the first EPDCCH.

The start symbol of the first EPDCCH is configured based on a higher layer parameter. The start symbol of the second EPDCCH is determined based on a symbol on which an initial signal has been detected. For example, the start symbol of the second EPDCCH is the same as the symbol on which the initial signal has been detected.

The end symbol of the first EPDCCH is the last symbol of a certain subframe.

The end symbol of the second EPDCCH is configured based on a higher layer parameter.

The start symbol and/or the end symbol a PDSCH scheduled by the second EPDCCH is determined based on the start symbol and/or the end symbol of the second EPDCCH.

The start symbol and/or the end symbol of a PDSCH scheduled by the second EPDCCH is determined based on a DCI in the second EPDCCH.

A terminal device in the present embodiment includes: a higher layer processing unit configured to configure a first EPDCCH set for monitoring a first EPDCCH, in a first serving cell, and a second EPDCCH set for monitoring a second EPDCCH, in a second serving cell; and a reception unit configured to monitor the first EPDCCH and the second EPDCCH. For each physical resource block pair, EREGs used for defining mapping of the first EPDCCH and the second EPDCCH onto resource elements are in common to the first EPDCCH and the second EPDCCH. The number of EREGs constituting each of the ECCEs to be used for transmission of the first EPDCCH and the number of EREGs constituting each of the ECCEs to be used for the first EPDCCH are determined independently of each other.

The base station device according to the present embodiment includes: a higher layer processing unit configured to configure, for a terminal device, a first EPDCCH set for monitoring a first EPDCCH, in a first serving cell, and a second EPDCCH set for monitoring a second EPDCCH, in a second serving cell; and a transmission unit configured to transmit the first EPDCCH and the second EPDCCH. For each physical resource block pair, EREGs used for defining mapping of the first EPDCCH and the second EPDCCH onto resource elements are in common to the first EPDCCH and the second EPDCCH. The number of EREGs constituting each of the ECCEs to be used for transmission of the first EPDCCH and the number of EREGs constituting each of the ECCEs to be used for the first EPDCCH are determined independently of each other.

The maximum value of the numbers of EREGs constituting each of the ECCEs to be used for transmission of the second EPDCCH is larger than the maximum value of the numbers of the EREGs constituting each of the ECCEs to be used for transmission of the first EPDCCH. For example, the numbers of EREGs constituting each of the ECCEs to be used for transmission of the first EPDCCH include 4 and 8. The numbers of EREGs constituting each of the ECCEs to be used for transmission of the second EPDCCH include numbers different from the numbers of the EREGs constituting each of the ECCEs to be used for transmission of the first EPDCCH. The numbers of EREGs constituting each of the ECCEs to be used for transmission of the second EPDCCH include 4, 8, and 16.

Resource elements onto which a demodulation reference signal associated with the second EPDCCH is to be mapped, is determined based on the start symbol and/or the end symbol of the second EPDCCH.

The maximum value of the numbers of physical resource block pairs used for the second EPDCCH set is larger than the maximum value of the numbers of physical resource block pairs used for the first EPDCCH set. For example, the numbers of physical resource block pairs used for the first EPDCCH set include 2, 4, and 8. The numbers of the physical resource block pairs used for the second EPDCCH set include numbers different from the numbers of physical resource block pairs used for the first EPDCCH set. The numbers include 2, 4, 8, and 16.

References for defining nEPDCCH, which is a quantity for a specific terminal device, and references for mapping y(0), . . . and (Msymb−1), which serves as a block of complex value symbols in the LAA cell, will be described below in detail. Particularly, the above-described references (a5), (a6), (m5) and (m6) will be described in detail.

Furthermore, in the following description, the DS can include the CRS (part or all of antenna ports 0 to 3), a first synchronization signal (primary synchronization signal), a second synchronization signal (secondary synchronization signal), a third synchronization signal, a non-zero-power CSI-RS, a zero power CSI-RS, a control signal, a control channel and/or a demodulation signal associated with a control channel. Furthermore, the control signal and/or the control channel can include information (e.g., Public Land Mobile Network (PLMN)) for identifying an operator, information of a transmission burst, and/or information of the LAA cell. Furthermore, sequences can be generated for the third synchronization signal by the same method as the second synchronization signal, but can be generated as a signal for performing resource mapping different from the second synchronization signal. Furthermore, the third synchronization signal may be constituted of multiple sequences generated by the same method as the second synchronization signal. In this regard, in the following description, the downlink subframe include the DWPTS in the special subframe.

As already described, the EPDCCH is arranged on prescribed resources (the REs, the EREGs and the ECCEs) meeting the prescribed references. Furthermore, according to prescribed processing, determination or an arithmetic operation, the EPDCCH is assumed to be arranged on prescribed resources meeting the prescribed references.

According to the above references (a5), (a6), (m5), and (m6), the EPDCCH is not arranged on the REs assumed by the terminal device to be used for the DSs or the DS candidates. An example of mapping (arrangement) of the EPDCCH by the terminal device or an example of presumption (assumption) of mapping in a case that the DS and the EPDCCH are arranged in a certain subframe will be described below.

An example of the presumption of EPDCCH mapping in the subframe including DS transmission timing candidates will be described. In this example, the terminal device assumes transmission of the DSs in all downlink subframes in a DMTC duration configured by the base station device. Furthermore, the base station device can transmit the DSs in one of all downlink subframes in the DMTC duration configured to the terminal device. Furthermore, the DMTC duration is also referred to as a discovery signal measurement timing configuration or a DMTC Occasion. The DMTC duration is determined based on the first parameter included in discovery signal configuration information which is the higher layer signaling. The first parameter is information for measuring a discovery signal as described above, and includes, for example, dmtc-Offset and dmtc-Periodicty.

For example, the DSs are likely to be transmitted in all downlink subframes in the DMTC duration. Even in a case that the DS is transmitted in only one downlink subframe, the base station device does not map the EPDCCH onto the REs, on which the DSs may be arranged in all downlink subframes in the DMTC duration. Furthermore, the DSs are likely to be transmitted in all downlink subframes in the DMTC duration. Even in a case that the DS is transmitted in only one downlink subframe, the terminal device assumes not to map the EPDCCH onto the REs, on which the DSs may be arranged by the base station device in all downlink subframes in the DMTC duration. For example, the terminal device decodes the EPDCCHs assuming that the EPDCCH are not arranged on all REs, on which DS signals are likely to be arranged in all downlink subframes in this DMTC duration.

In a case that, for example, the DS configuration the LAA cell is configured, the EPDCCH is not arranged on resource elements assumed by the terminal device to be used to transmit following signals included in the DSs.

(1) The CRSs of antenna port 0 in the DwPTSs of all downlink subframes and/or all special subframes in this DMTC duration.

(2) The first synchronization signals in the DwPTSs in all downlink. subframes and/or all special subframes in this DMTC duration.

(3) The second synchronization signals in the DwPTSs of all downlink subframes and/or all special subframes in this DMTC duration.

(4) The non-zero-power CSI-RSs in zero or more subframes in this DMTC duration. The non-zero-power CSI-RSs which are part of the DSs are configured by the DS configuration.

In this regard, the EPDCCH may not be arranged on the resource elements used for transmission from a CRS antenna port other than CRS antenna port 0 (i.e., the antenna port 1, 2 or 3) in the DwPTSs in all downlink subframes and all special subframes in this DMTC duration. Whether the EPDCCH is arranged on the resource elements is configured by a higher layer (DC configuration). In a case that, for example, measurement which uses resources associated with antenna ports other than CRS antenna port 0 or the number of CRS antenna ports (e.g. two or more antenna ports) is configured, the EPDCCH resources may not be arranged on resources of the associated antenna ports. That is, in a case that use of multiple antennas for the CRS is indicated, the terminal device does not expect an arrangement of the EPDCCHs on the resources associated with the respective antenna ports.

Note that the EPDCCH may not be arranged on a resource element used to transmit the third synchronization signal in the DwPTSs of all downlink subframes and all special subframes within the DMTC duration. Whether the EPDCCH is arranged on the resource elements is configured by a higher layer (DC configuration). In a case that the DS configuration includes configuration on the third synchronization signal or in a case that the DS is defined to include the third synchronization signal, the terminal device does not expect the arrangement of the EPDCCH on the resources on which the third synchronization signal is arranged.

Another example of the presumption of EPDCCH mapping in the subframe including DS transmission timing candidates will be described. In this example, the terminal device assumes transmission of the DSs in prescribed downlink subframes in the DMTC duration configured by the base station device. The prescribed downlink subframes are configured from the base station device to the terminal device via the higher layer signaling. Furthermore, the base station device can transmit the DSs in one of prescribed downlink subframes in the DMTC duration configured to the terminal device. Furthermore, the parameter for configuring the prescribed downlink subframes will be also referred to as a second parameter.

For example, the DSs are likely to be transmitted in the prescribed downlink subframes configured by the higher layer in the DMTC duration. Even in a case that the DS is transmitted in only one of the prescribed downlink subframes, the base station device does not map the EPDCCH onto the REs on which the DSs may be arranged in the prescribed downlink subframes configured by the higher layer in the DMTC duration. Furthermore, the DSs are likely to be transmitted in the prescribed downlink subframes in the DMTC duration. Even in a case that the DS is transmitted in only one downlink subframe, the terminal device assumes not to map the EPDCCH onto the REs on which the DSs may be arranged by the base station device in the prescribed downlink subframes in the DMTC duration. For example, the terminal device decodes the EPDCCH assuming that the EPDCCH is not arranged on all REs on which DS signals are likely to be arranged in the prescribed downlink subframes configured by the higher layer in the DMTC duration.

For example, information of the higher layer which indicates (configures) the downlink subframes in which the DSs are likely to be transmitted may be a bitmap (bit sequence). For example, the length of the bitmap may be six bits (i.e., the same number of bits as the number of subframes in the DMTC duration) or five bits (i.e., the same number of bits as the maximum number of subframes of DS occasion). Furthermore, information indicated by each bit of the bit map may be associated with each subframe in the DMTC. In a case that, for example, a bit value is set to "1", the DS is likely to be transmitted in the associated subframe. In a case that a bit value is set to "0", there is no possibility for the DS to be transmitted in the associated subframe. The terminal device determines a timing to receive the DS, and the downlink subframe based on the bit information.

For example, the information of the higher layer for indicating the downlink subframes in which the DSs are likely to be transmitted may be zero or one as a minimum value, and may be five or six as a maximum value. The downlink subframes in which the DSs are likely to be transmitted are determined based on the value. Specifically, the downlink subframes in which the DSs are likely to be transmitted are subframes from a head subframe in the DMTC duration to a subframe indicated by the value.

In a case that, for example, the DS configuration in the LAA cell configured, the EPDCCH is not arranged on resource elements assumed by the terminal device to be used to transmit following signals included in the DSs. The prescribed downlink subframes and the prescribed special subframes are indicated by the higher layer.

(1) The CRSs of antenna port 0 in the DwPTSs in the prescribed downlink subframes and the prescribed special subframes in this DMTC period.

(2) The first synchronization signals in the DwPTSs in the prescribed downlink subframes and the prescribed special subframes in this DMTC duration.

(3) The second synchronization signals in the DwPTSs in the prescribed downlink subframes and the prescribed special subframes in this DMTC duration.

(4) The non-zero-power CSI-RSs in zero or more subframes in this DMTC duration. The non-zero-power CSI-RSs which are part of the DSs are configured by the DS configuration.

Note that the EPDCCH may not be necessarily arranged on the resource elements used for transmission from a CRS antenna port other than CRS antenna port 0 (i.e., the antenna port 1, 2 or 3) in the DwPTSs in the prescribed downlink subframes and the prescribed special subframes in this DMTC duration. Whether the EPDCCH is arranged on the resource elements is configured by a higher layer (DC configuration).

Note that the EPDCCH may not be necessarily arranged on the resource elements used to transmit the third synchronization signal in the DwPTSs of the prescribed downlink subframes and the prescribed special subframes within the DMTC duration. Whether the EPDCCH is arranged on the resource elements is configured by a higher layer (DC configuration).

Note that the prescribed downlink subframes and the prescribed special subframes may be defined in advance. For example, the prescribed downlink subframes may be defined in advance as the subframes 0, 3, 5 and 8.

Another example of the presumption of EPDCCH mapping in the subframe including DS transmission timing candidates will be described. The terminal device can identify whether the DS is transmitted at each of the DS transmission timing candidates, based on the information included in the DCI of the PDCCH or another EPDCCH. For example, PDCCH and/or EPDCCH signaling in the primary cell or cells other than the LAA cell indicates to the terminal device whether the DS signals are arranged in prescribed subframes in the LAA cell. The terminal device monitors the EPDCCH based on the DCI.

For example, information of whether the DS is transmitted is 1-bit information. In a case that the information of whether the DS is transmitted is 1 (True, Enable), the DS is assumed to be transmitted in this subframe. In a case that the information of whether the DS is transmitted is 0 (False, Disable), the DS is assumed not to be transmitted in this subframe. In a case that a state that the DS is not transmitted in the subframe is announced and the EPDCCH is monitored in the subframe, the EPDCCH is assumed to be arranged on the REs on which the DSs are likely to be arranged. Alternatively, in a case that multiple DS transmission timing candidates or multiple DS configurations are configured or the like, the information of whether the DS is transmitted may be expressed by multiple bits. Note that the information of whether the DS is transmitted may be the same as information of whether a transmission burst is transmitted.

The PDCCH and/or the EPDCCH are arranged on the USS. Note that the PDCCH may be arranged on the CSS.

In other words, the DS configuration in the LAA cell is configured, the EPDCCH is not arranged on resource elements assumed by the terminal device to be used to transmit following signals included in the DSs. The prescribed downlink subframes and the prescribed special subframes are subframes indicated by the DCI.

(1) The CRSs of antenna port 0 in the DwPTSs in the prescribed downlink subframes and the prescribed special subframes in this DMTC period.

(2) The first synchronization signals in the DwPTSs in the prescribed downlink subframes and the prescribed special subframes in this DMTC duration.

(3) The second synchronization signals in the DwPTSs in the prescribed downlink subframes and the prescribed special subframes in this DMTC duration.

(4) The non-zero-power CSI-RSs in zero or more subframes in this DMTC duration. The non-zero-power CSI-RSs which are part of the DSs are configured by the DS configuration.

Note that the EPDCCH may not be necessarily arranged on the resource elements used for transmission from a CRS antenna port other than CRS antenna port 0 (i.e., the antenna port 1, 2 or 3) in the DwPTSs in the prescribed downlink subframes and the prescribed special subframes in this DMTC duration. Whether the EPDCCH is arranged on the resource elements is configured by a higher layer (DC configuration).

Note that the EPDCCH may not be necessarily arranged on the resource elements used to transmit the third synchronization signal in the DwPTSs of the prescribed downlink subframes and the prescribed special subframes within the DMTC duration. Whether the EPDCCH is arranged on the resource elements is configured by a higher layer (DC configuration).

An example of the presumption of EPDCCH mapping in the subframe including DS transmission timing candidates will be described. In a case that a measurement section configured by the DMTC and a transmission burst overlap, the DSs can be transmitted without using LBT for the DS transmission. Therefore, it is not necessary to increase a transmission probability by using multiple transmission timing candidates. In other words, in a case that the terminal device can recognize the transmission burst, and this transmission burst and at least one DS transmission timing candidate overlap in the time domain, the DSs are transmitted at the prescribed DS transmission timing candidates configured or defined in advance. Alternatively, in a case that the terminal device recognizes a certain transmission burst, and this transmission burst and the prescribed DS transmission timing candidate overlap, the terminal device presumes that the DS is transmitted at the prescribed DS transmission timing candidate, and presumes that the DSs are not transmitted at the other DS transmission timing candidates.

The prescribed DS transmission timing candidate is, for example, a first DS transmission timing candidate among DS transmission timing candidates which overlap the transmission burst among all DS transmission timing candidates. Furthermore, the prescribed DS transmission timing candidate is, for example, the DS transmission timing candidate indicated by the higher layer among the DS transmission timing candidates which overlaps the transmission burst.

Note that even in a case that the transmission burst cannot be detected, and in a case that the DS can be detected, it may be presumed that the DSs are not transmitted at the DS transmission timing candidates after the DS.

In other words, in a ease that the DS configuration in the LAA cell is configured, the EPDCCH is not arranged on resource elements assumed by the terminal device to be used to transmit the following signals included in the DSs. The prescribed downlink subframes and the prescribed special subframes are the first subframes among subframes which are indicated by the higher layer and overlap the transmission burst.

(1) The CRSs of antenna port 0 in the DwPTSs in the prescribed downlink subframes and the prescribed special subframes in this DMTC period.

(2) The first synchronization signals in the DwPTSs in the prescribed downlink subframes and the prescribed special subframes in this DMTC duration.

(3) The second synchronization signals in the DwPTSs in the prescribed downlink subframes and the prescribed special subframes in this DMTC duration.

(4) The non-zero-power CSI-RSs in zero or more subframes in this DMTC duration. The non-zero-power CSI-RSs which are part of the DSs are configured by the DS configuration.

Note that the EPDCCH may not be necessarily arranged on the resource elements used for transmission from a CRS antenna port other than CRS antenna port 0 (i.e., the antenna port 1, 2 or 3) in the DwPTSs in the prescribed downlink subframes and the prescribed special subframes in this DMTC duration. Whether the EPDCCH is arranged on the resource elements is configured by a higher layer (DC configuration).

Note that the EPDCCH may not be necessarily arranged on the resource elements used to transmit the third synchronization signal in the DwPTSs of the prescribed downlink subframes and the prescribed special subframes within the DMTC duration. Whether the EPDCCH is arranged on the resource elements is configured by a higher layer (DC configuration).

An example of the presumption of EPDCCH mapping in the subframe including DS transmission timing candidates will be described. Whether the EPDCCH and the DS are multiplexed can be indicated by using field information of information (EPDCCH RE Mapping and Quasi-Co-Location indicator) which is one of fields in the DCI format and indicates an RE allocation for the EPDCCHs and a quasi-identity. Specifically, in a case that the field information is "00", it is recognized that the EPDCCH and the DS are not multiplexed, and the EPDCCH is decoded. In a case that the field information is "01", it is recognized that the EPDCCH and the DS configured by the first parameter set are multiplexed, and the EPDCCH is decoded. In a case that the field information is "10", it is recognized that the EPDCCH and the DS configured by the second parameter set are multiplexed, and the EPDCCH is decoded. In a case that the field information is "11", it is recognized that the EPDCCH and the DS configured by the third parameter set are multiplexed, and the EPDCCH is decoded. The parameter set includes information of the number of CRS ports, information of a zero power CSI-RS, information of a synchronization signal arrangement, and the like.

According to the above example, the terminal device can efficiently and simultaneously receive the DS and the EPDCCH in the prescribed subframes in the LAA cell.

In this regard, depending on an arrangement of synchronization signals, the synchronization signal and specific PDSCH and/or EPDCCH may not be simultaneously arranged in a prescribed resource block of a prescribed subframe. In this case, the terminal device does not expect reception of the specific PDSCH and/or EPDCCH. In this case, the base station device does not transmit the specific PDSCH and/or the EPDCCH. A case that the synchronization signal and the specific PDSCH and/or the EPDCCH cannot be simultaneously arranged will be described below.

A primary synchronization signal and a secondary synchronization signal are arranged on an OFDM symbol (i.e., the sixth or seventh OFDM symbol) on which the URS or the DMRS is arranged. Therefore, the primary synchronization signal and the secondary synchronization signal, and the URS or the DMRS cannot be arranged overlapping on the same position. Furthermore, specific PDSCH for performing reception processing by using the URS cannot be arranged, either. Furthermore, the EPDCCH for performing reception processing by using the DMRS cannot be arranged, either.

In other words, in a case that even one of two PRBs overlaps transmission of the primary synchronization signal or the secondary synchronization signal in the frequency domain in the prescribed subframe, the terminal device does not expect reception of the PDSCH resource block transmitted from antenna port 5, 7, 8, 9, 10, 11, 12, 13 or 14 in the PRB on which a virtual resource block (VRB) pair is arranged. Furthermore, in a case that the PRB pair on which the ECCE associated with the EPDCCH candidate is arranged overlaps the transmission of the primary synchronization signal or the secondary synchronization signal in the frequency domain in the prescribed subframe, the terminal device does not expect to monitor the EPDCCH candidates.

Similarly, in a case that the first or second synchronization signal is arranged on an OFDM symbol on which the URS or the DMRS is arranged, the first or second synchronization signal and the URS or the DMRS cannot be arranged overlapping on the same position. Furthermore, specific PDSCH for performing reception processing by using the URS cannot be arranged, either. Furthermore, the EPDCCH for performing reception processing by using the DMRS cannot be arranged, either.

In other words, in a case that the second DS is configured to the serving cell (the second DS configuration is made at the same frequency (a frequency associated with the serving cell) as the serving cell to which the EPDCCH is configured), the first synchronization signal or the second synchronization signal is arranged on the sixth or seventh OFDM symbol, and even one of the two PRBs overlaps the transmission of the first synchronization signal or the second synchronization signal n the frequency domain in the prescribed subframe, the terminal device does not expect reception of the PDSCH resource block transmitted from antenna port 5, 7, 8, 9, 10, 11, 12, 13 or 14 in the PRB on which the virtual resource block (VRB) pair is arranged. Furthermore, in a case that the PRB pair on which the ECCE associated with the EPDCCH candidate is arranged overlaps the transmission of the first synchronization signal or the second synchronization signal in the frequency domain in the prescribed subframe, the terminal device does not expect to monitor the EPDCCH candidates.

Similarly, in a case that the third synchronization signal is arranged on an OFDM symbol on which the URS or the DMRS is arranged, the third synchronization signal and the URS or the DMRS cannot be arranged overlapping on the same position. Furthermore, specific PDSCH for performing reception processing by using the URS cannot be arranged, either. Furthermore, the EPDCCH for performing reception processing by using the DMRS cannot be arranged, either.

In other words, in a case that the second DS configuration is configured to the serving cell, the third synchronization signal is arranged on the sixth or seventh OFDM symbol, and even one of the two PRBs overlaps the transmission of the third synchronization signal in the frequency domain in the prescribed subframe, the terminal device does not expect reception of the PDSCH resource block transmitted from antenna port 5, 7, 8, 9, 10, 11, 12, 13 or 14 in the PRB on which the virtual resource block (VRB) pair is arranged. Furthermore, in a case that the PRB pair on which the ECCE associated with the EPDCCH candidate is arranged overlaps the transmission of the third synchronization signal in the frequency domain in the prescribed subframe, the terminal device does not expect to monitor the EPDCCH candidates.

In addition, in a case that one or more configurations (LAA-Config) which are necessary for LAA communication for prescribed serving cell are configured to the terminal device 1, the prescribed serving cell may be regarded as the LAA cell. The configurations which are necessary for the LAA communication are, for example, a parameter associated with a reservation signal, a parameter associated with RSSI measurement and a parameter associated with the second DS configuration.

In this regard, in a case that information (EARFCN value) on a center frequency associated with an LAA band for prescribed serving cell is configured to the terminal device 1, the cell of the frequency may be regarded as the LAA cell. The LAA bands (LAA operating band) refer to, for example, bands meeting one or more features of bands whose band numbers are 252 to 255, bands which are neither a TDD band nor an FDD band, bands which are defined by a 5 GHz band, and bands which are defined only by a 20 MHz bandwidth.

Note that the prescribed frequency may be preferably a frequency used by the LAA cell. The prescribed frequency may be preferably a frequency of cells which transmit the DSs based on LBT. The prescribed frequency may be preferably a frequency of cells operated in an unlicensed band. The prescribed frequency may be preferably a frequency of an operating band associated with a prescribed index of the operating hand. The prescribed frequency may be preferably a frequency of an operating band associated with an index of the operating band for LAA. The prescribed frequency may be preferably an operating band associated with a prescribed index of the operating band (E-UTRA operating band). For example, the operating bands may be preferably managed by a table. An associated index is given to each operating band managed by the table. The index is linked to an associated uplink operating band, downlink operating band and a duplex mode. Note that the uplink operating band is an operating band used for reception at the base station device and transmission at the terminal device. The downlink operating band is an operating band used for transmission at the base station device and reception at the terminal device. Each of the uplink operating band and the downlink operating hand may be preferably given by a lower limit frequency and an upper limit frequency (associated frequency band). The duplex mode may be preferably given by TDD or FDD. The duplex mode in the LAA cell may be other than TDD and FDD. For example, the duplex mode in the LAA cell may be a transmission burst to be described below (optionally including at least a downlink burst or an uplink burst).

In a case that, for example, the operating bands are managed by the table, operating bands associated with an index "1" to an index "44" may be preferably licensed bands (bands which are not LAA), and operating bands associated with an index "252" to an index "255" may be preferably unlicensed bands (LAA bands). Note that the uplink operating band may not be preferably applied to the index "252" (n/a, not applicable). The 5150 MHz to 5250 MHz may be preferably applied to the downlink operating band. FDD may be preferably applied to the duplex mode. Furthermore, for the index "253", the uplink operating band may be preferably reserved (reserved to be used in future), and the downlink operating band may be preferably reserved. FDD may be preferably applied to the duplex mode. Furthermore, for the index "254", the uplink operating hand may be preferably reserved (reserved to be used in future), and the downlink operating band may be preferably reserved. FDD may be preferably applied to the duplex mode. Note that the uplink operating band may not be preferably applied to the index "255" (n/a, not applicable). The 5725 MHz to 5850 MHz may be preferably applied to the downlink operating band. FDD may be preferably applied to the duplex mode. Note that 5150 MHz to 5250 MHz and 5725 MHz to 5850 MHz may be preferably unlicensed bands (LAA bands). In other words, the prescribed frequencies described above may be preferably operating bands associated with the index "252" to the index "255".

Part of the content described in the present embodiment is rephrased as follows.

A terminal device for communicating with a base station device includes: a higher layer processing unit configured to configure an EPDCCH set for monitoring an enhanced physical downlink control channel and discovery signal configuration information for measuring a discovery signal; a control channel processing unit configured to monitor a candidate of the enhanced physical downlink control channel, based on the EPDCCH set; and a discovery signal processing unit configured to detect a discovery signal from the candidate of the discovery signal in a prescribed subframe to be determined, based on the discovery signal configuration information. The enhanced physical downlink control channel is mapped onto a resource element different from a resource element corresponding to the candidate of the discovery signal in the prescribed subframe.

A terminal device for communicating with a base station device includes: a higher layer processing unit configured to configure an EPDCCH set for monitoring an enhanced physical downlink control channel and discovery signal configuration information for measuring a discovery signal; a control channel processing unit configured to monitor a candidate of the enhanced physical downlink control channel, based on the EPDCCH set; and a discovery signal processing unit configured to detect a discovery signal from the candidate of the discovery signal in a prescribed subframe to be determined, based on the discovery signal configuration information. The number of candidates of the enhanced physical downlink control channel is determined at least based on a prescribed value. The prescribed value is defined as the number of downlink resource elements in a physical resource block pair configured for EPDCCH transmission of the EPDCCH set. The downlink resource elements includes a resource element different from the resource element corresponding to the candidate of the discovery signal at least in the prescribed subframe.

The prescribed subframe includes subframes indicated by a discovery signal measurement timing configuration determined by a first parameter included in the discovery signal configuration information.

The prescribed subframe includes a subframe corresponding to a discovery signal period determined by a second parameter included in the discovery signal configuration information, among the subframes indicated by a discovery signal measurement timing configuration determined by a first parameter included in the discovery signal configuration information.

A base station device for communicating with a terminal device includes: a higher layer processing unit configured to configure, for the terminal device, an EPDCCH set for monitoring an enhanced physical downlink control channel and discovery signal configuration information for measuring a discovery signal; a control channel processing unit configured to map the enhanced physical downlink control channel onto a candidate of the enhanced physical downlink control channel, based on the EPDCCH set; and a discovery signal processing unit configured to map the discovery signal onto the candidate of the discovery signal in a prescribed subframe to be determined, based on the discovery signal configuration information. The enhanced physical downlink control channel is mapped onto a resource element different from a resource element corresponding to the candidate of the discovery signal in the prescribed subframe.

A base station device for communicating with a terminal device includes: a higher layer processing unit configured to configure, for the terminal device, an EPDCCH set for monitoring an enhanced physical downlink control channel and discovery signal configuration information for measuring a discovery signal; a control channel processing unit configured to map the enhanced physical downlink control channel onto a candidate of the enhanced physical downlink control channel, based on the EPDCCH set; and a discovery signal processing unit configured to map the discovery signal onto the candidate of the discovery signal in a prescribed subframe to be determined, based on the discovery signal configuration information. The number of candidates of the enhanced physical downlink control channel is determined at least based on a prescribed value. The prescribed value is defined as the number of downlink resource elements in a physical resource block pair configured for EPDCCH transmission of the EPDCCH set. The downlink resource elements includes a resource element different from the resource element corresponding to the candidate of the discovery signal at least in the prescribed subframe.

The prescribed subframe(s) correspond to all subframes indicated by a discovery signal measurement timing configuration determined by a first parameter included in the discovery signal configuration information.

The prescribed subframe(s) correspond to a subframe(s) corresponding to a discovery signal period determined by a second parameter included in the discovery signal configuration information, among the subframes indicated by a discovery signal measurement timing configuration determined by a first parameter included in the discovery signal configuration information.

A transmission unit configured to transmit the enhanced physical downlink control channel and/or the discovery signal is included. The transmission unit performs the transmission, based on clear channel evaluation based on prescribed receive power.

A communication method to be used by a terminal device for communicating with a base station device, the communication method including: configuring an EPDCCH set for monitoring an enhanced physical downlink control channel and discovery signal configuration information for measuring a discovery signal; monitoring a candidate of the enhanced physical downlink control channel, based on the EPDCCH set; and detecting a discovery signal from the candidate of the discovery signal in a prescribed subframe to be determined based on the discovery signal configuration information. The enhanced physical downlink control channel is mapped onto a resource element different from a resource element corresponding to the candidate of the discovery signal in the prescribed subframe.

A communication method to be used by a terminal device for communicating with a base station device, the communication method including: configuring an EPDCCH set for monitoring an enhanced physical downlink control channel and discovery signal configuration information for measuring a discovery signal; monitoring a candidate of the enhanced physical downlink control channel, based on the EPDCCH set; and detecting a discovery signal from the candidate of the discovery signal in a prescribed subframe to be determined based on the discovery signal configuration information. The number of candidates of the enhanced physical downlink control channel is determined at least based on a prescribed value. The prescribed value is defined as the number of downlink resource elements in a physical resource block pair configured for EPDCCH transmission of the EPDCCH set. The downlink resource elements includes a resource element different from the resource element corresponding to the candidate of the discovery signal at least in the prescribed subframe.

A communication method to be used by a base station device for communicating with a terminal device includes:

configuring, for the terminal device, an EPDCCH set for monitoring an enhanced physical downlink control channel and discovery signal configuration information for measuring a discovery signal; mapping the enhanced physical downlink control channel onto a candidate of the enhanced physical downlink control channel, based on the EPDCCH set; and mapping a discovery signal onto the candidate of the discovery signal in a prescribed subframe to be determined, based on the discovery signal configuration information. The enhanced physical downlink control channel is mapped onto a resource element different from a resource element corresponding to the candidate of the discovery signal in the prescribed subframe.

A communication method to be used by a base station device for communicating with a terminal device includes: configuring, for the terminal device, an EPDCCH set for monitoring an enhanced physical downlink control channel and discovery signal configuration information for measuring a discovery signal; mapping the enhanced physical downlink control channel onto a candidate of the enhanced physical downlink control channel, based on the EPDCCH set; and mapping a discovery signal onto the candidate of the discovery signal in a prescribed subframe to be determined, based on the discovery signal configuration information. The number of candidates of the enhanced physical downlink control channel is determined at least based on a prescribed value. The prescribed value is defined as the number of downlink resource elements in a physical resource block pair configured for EPDCCH transmission of the EPDCCH set. The downlink resource elements includes a resource element different from the resource element corresponding to the candidate of the discovery signal at least in the prescribed subframe.

Moreover, although the description has been given in each of the above-described embodiments by using the terms "primary cell" and "PS cell", these terms may not be necessarily used. For example, "primary cell" in each of the above-described embodiments may be referred to as "master cell", and "PS cell" in each of the above-described embodiments may be referred to as "primary cell".

A program running on each of the base station device 2 and the terminal device 1 according to the present invention may be a program (a program for causing a computer to operate) that controls a Central Processing Unit (CPU) and the like in such a manner as to realize the functions according to the above-described embodiments of the present invention. The information handled in these devices is temporarily stored in a Random Access Memory (RAM) while being processed. Then, the information is stored in various types of Read Only Memory (ROM) such as a Flash ROM and a Hard Disk Drive (HDD) and is read out by the CPU to be modified or rewritten, when necessary.

Moreover, the terminal device 1 and the base station device 2-1 or the base station device 2-2 according to the above-described embodiments may be partially realized by the computer. This configuration may be achieved by recording a program for enabling such control functionalities on a computer-readable recording medium and causing a computer system to read the program recorded on the recording medium for execution.

Moreover, the "computer system" here is defined as a computer system built into the terminal device 1 or the base station device 2-1 or the base station device 2-2, and the computer system includes an OS and hardware components such as peripheral devices. Furthermore, "computer-readable recording medium" refers to a portable medium, such as a flexible disk, a magneto-optical disk, a ROM, and a CD-ROM, and a storage device, for example, a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system that functions as a server or a client. Furthermore, the program may be configured to enable some of the functionalities described above, and also may be configured to enable the functionalities described above in combination with a program already recorded in the computer system.

Furthermore, the base station device 2-1 or base station device 2-2 according to the above-described embodiments can be realized as an aggregation (a device group) constituted of a plurality of devices. Devices constituting the device group may be each equipped with some or all portions of each function or each functional block of the base station device 2-1 or base station device 2-2 according to the above-described embodiments. It is only required that the device group itself include general functions or general functional blocks of the base station device 2-1 or base station device 2-2. Furthermore, the terminal device 1 according to the above-described embodiment is capable of communicating with the base station device as the aggregation.

Furthermore, the base station device 2-1 or base station device 2-2 according to the above-described embodiments may be an Evolved Universal Terrestrial Radio Access Network (E-UTRAN). Furthermore, the base station device 2-1 or base station device 2-2 according to the above-described embodiments may have some or all portions of a function of a higher node for an eNodeB.

Furthermore, some or all portions of each of the terminal device 1 and the base station device 2-1 or base station device 2-2 according to the above-described embodiments may be typically achieved as a Large-Scale Integration (LSD that is an integrated circuit or may be realized as a chip set. The functional blocks of each of the terminal device 1 and the base station device 2-1 or base station device 2-2 may be individually realized as a chip, or some or all of the functional blocks may be integrated into a chip. Furthermore, the circuit integration technique is not limited to the LSI, and the integrated circuit may be achieved with a dedicated circuit or a general-purpose processor. Furthermore, according to advances in semiconductor technologies, a circuit integration technology that can replace LSI appears, it is also possible to use an integrated circuit based on the technology.

Furthermore, according to the above-described embodiments, the cell War mobile station device is described as one example of a terminal device or a communication device, but the present invention is not limited to this, and can be applied to a fixed-type electronic apparatus installed indoors or outdoors, or a stationary-type electronic apparatus, for example, a terminal device or a communication device, such as an Audio-Video (AV) apparatus, a kitchen apparatus, a cleaning or washing machine, an air-conditioning apparatus, office equipment, a vending machine, and other household apparatuses.

Heretofore, the embodiments of the present invention have been described in detail with reference to the drawings, but the specific configuration is not limited to the embodiments, and includes, for example, design variations that fall within the scope that does not depart from the gist of the present invention. Furthermore, various modifications are possible within the scope defined by claims, and embodiments that are made by suitably combining technical measures disclosed in the different embodiments are also included in the technical scope of the present invention. Furthermore, another configuration is also included such that constituent elements, each of which has been described in the above embodiments and achieve the same advantage, can be replaceable with each other.

Supplement (1) A terminal device, according to an aspect of the present invention, for communicating with a base station device, includes: a higher layer processing unit configured to configure a first configuration for monitoring an Enhanced Physical Downlink Control CHannel (EPDCCH) and a second configuration for measuring a Discovery Signal (DS); a reception processing unit configured to monitor a candidate of the EPDCCH, based on the first configuration; and a detection unit configured to detect the DS in a prescribed subframe to be determined, based on the second configuration. In a case that simultaneous transmissions on the EPDCCH and the DS occur in a Licensed Assisted Access (LAA) cell, the EPDCCH is mapped onto a resource element different from a resource element corresponding to the DS in the prescribed subframe.

(2) Moreover, a base station device, according to an aspect of the present invention, for communicating with a terminal device includes: a higher layer processing unit configured to configure, for the terminal device, a first configuration for monitoring an Enhanced Physical Downlink Control CHannel (EPDCCH) and a second configuration for measuring a Discovery Signal (DS); a control channel processing unit configured to map the EPDCCH onto a candidate of the EPDCCH, based on the first configuration; and a discovery signal processing unit configured to map the DS in a prescribed subframe to be determined, based on the second configuration. In a case that simultaneous transmissions on the EPDCCH and the DS occur in a Licensed Assisted Access (LAA) cell, the EPDCCH is mapped onto a resource element different from a resource element corresponding to the DS in the prescribed subframe.

(3) Moreover, a communication method, according to an aspect of the present invention, to be used by a terminal device for communicating with a base station device includes: configuring a first configuration for monitoring an Enhanced Physical Downlink Control CHannel (EPDCCH) and a second configuration for measuring a Discovery Signal (DS); monitoring a candidate of the EPDCCH, based on the first configuration; and detecting the DS in a prescribed subframe to be determined, based on the second configuration. In a case that simultaneous transmissions on the EPDCCH and the DS occur in a Licensed Assisted Access (LAA) cell, the EPDCCH is mapped onto a resource element different from a resource element corresponding to the DS in the prescribed subframe.

(4) Moreover, a communication method, according to an aspect of the present invention, to be used by a base station device for communicating with a terminal device includes: configuring, for the terminal device, a first configuration for monitoring an. Enhanced Physical Downlink Control CHannel (EPDCCH) and a second configuration for measuring a Discovery Signal (DS); mapping the EPDCCH onto a candidate of the EPDCCH, based on the first configuration; and mapping the DS in a prescribed subframe to be determined, based on the second configuration. In a case that simultaneous transmissions on the EPDCCH and the DS occur in a Licensed Assisted Access (LAA) cell, the EPDCCH is mapped onto a resource element different from a resource element corresponding to the DS in the prescribed subframe.

REFERENCE SIGNS LIST

501 Higher layer
502 Control unit
503 Codeword generation unit
504 Downlink subframe generation unit
505 Downlink reference signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink reference signal extraction unit
605 Transport block extraction unit
606, 1006 Control unit
607, 1007 Higher layer
608 Channel state measurement unit
609, 1009 Uplink subframe generation unit
610 Uplink control information generation unit
611, 612, 1011 SC-FDMA signal transmission unit
613, 614, 1013 Transmit antenna

The invention claimed is:

1. A terminal device for communicating with a base station device, the terminal device comprising:
a higher layer processor which configures a first configuration used for monitoring an Enhanced Physical Downlink Control CHannel (EPDCCH) and a second configuration used for measuring a Discovery Signal (DS);
a reception processor which monitors, in a subframe, a set of candidates of the EPDCCH, based on the first configuration; and
a measurement controller which measures the DS in a subframe within a DS period that is set up based on the second configuration, wherein
in a case that transmissions on the EPDCCH and the DS occur in a same subframe, a time length of which is one (1) millisecond, in a Licensed Assisted Access (LAA) cell, the EPDCCH is not mapped in resource elements used for the DS, the DS including a primary synchronization signal, a secondary synchronization signal and cell-specific reference signals in the subframe,
a position of the cell-specific reference signals is given by a number of antenna ports and frequency shift parameters, the position of the cell-specific reference signals being given by a parameter in a case that re-MappingQCL-ConfigID-r11 which is a higher layer parameter configures the parameter.

2. A base station device for communicating with a terminal device, the base station device comprising:
a higher layer processor which configures, for the terminal device, a first configuration used for monitoring an Enhanced Physical Downlink Control CHannel (EPDCCH) and a second configuration used for measuring a Discovery Signal (DS);
a control channel processor which maps, in a subframe, the EPDCCH onto a candidate of the EPDCCH, based on the first configuration; and a discovery signal processor which maps the DS in a subframe within a DS period that is set up based on the second configuration, wherein in a case that transmissions on the EPDCCH and the DS occur in a same subframe, a time length of which is one (1) millisecond, in a Licensed Assisted Access (LAA) cell, the EPDCCH is not mapped in resource elements used for the DS, the DS including a primary synchronization signal, a secondary synchronization signal and cell-specific reference signals in the subframe, a position of the cell-specific reference signals is given by a number of antenna ports and frequency shift parameters, the position of the cell-specific reference signals being given by a parameter in a case that re-MappingQCL-ConfigID-r11 which is a higher layer parameter configures the parameter.

3. A communication method to be used by a terminal device for communicating with a base station device, the communication method comprising:

configuring a first configuration used for monitoring an Enhanced Physical Downlink Control CHannel (EPDCCH) and a second configuration used for measuring a Discovery Signal (DS);

monitoring, in a subframe, a set of candidates of the EPDCCH, based on the first configuration; and measuring the DS in a subframe within a DS period that is set up based on the second configuration, wherein in a case that transmissions on the EPDCCH and the DS occur in a same subframe, a time length of which is one (1) millisecond, in a Licensed Assisted Access (LAA) cell, the EPDCCH is not mapped in resource elements used for the DS, the DS including a primary synchronization signal, a secondary synchronization signal and cell-specific reference signals in the subframe, a position of the cell-specific reference signals is given by a number of antenna ports and frequency shift parameters, the position of the cell-specific reference signals being given by a parameter in a case that re-MappingQCL-ConfigID-r11 which is a higher layer parameter configures the parameter.

\* \* \* \* \*